United States Patent [19]
Oatman et al.

[11] Patent Number: 5,778,157
[45] Date of Patent: Jul. 7, 1998

[54] SYSTEM AND METHOD FOR EXPERT SYSTEM ANALYSIS USING QUIESCENT AND PARALLEL REASONING AND SET STRUCTURED KNOWLEDGE REPRESENTATION

[75] Inventors: Robert K. Oatman, La Honda; Peter J. Herrera, Sunnyvale; Remy D. Sanouillet, Mountain View; Charles E. Zimmerman, San Carlos, all of Calif.

[73] Assignee: YY Software Corporation, Palo Alto, Calif.

[21] Appl. No.: 666,887

[22] Filed: Jun. 17, 1996

[51] Int. Cl.$^6$ .................................................... G06F 15/18
[52] U.S. Cl. .............................. 395/51; 395/12; 707/5; 707/6; 704/9
[58] Field of Search ............................. 395/51, 54, 10, 395/50, 63, 81, 12, 11, 55; 707/5, 6; 704/9

[56] References Cited

U.S. PATENT DOCUMENTS

| | | | |
|---|---|---|---|
| 4,670,848 | 6/1987 | Schramm | 395/60 |
| 4,905,138 | 2/1990 | Bourne | 395/707 |
| 4,914,590 | 4/1990 | Loatman et al. | 704/8 |
| 4,974,191 | 11/1990 | Amirghodsi et al. | 704/8 |
| 5,083,268 | 1/1992 | Hemphill et al. | 395/12 |
| 5,146,406 | 9/1992 | Jensen | 704/9 |
| 5,197,005 | 3/1993 | Shwartz et al. | 707/2 |
| 5,239,617 | 8/1993 | Gardner et al. | 395/12 |
| 5,282,265 | 1/1994 | Suda et al. | 395/12 |
| 5,321,608 | 6/1994 | Namba et al. | 704/9 |
| 5,369,575 | 11/1994 | Lamberti et al | 704/9 |
| 5,377,103 | 12/1994 | Lamberti et al. | 704/9 |
| 5,379,366 | 1/1995 | Noyes | 395/54 |
| 5,404,506 | 4/1995 | Fujisawa et al. | 707/4 |
| 5,594,837 | 1/1997 | Noyes | 395/63 |
| 5,608,624 | 3/1997 | Luciw | 395/794 |
| 5,630,025 | 5/1997 | Dolby et al. | 395/51 |
| 5,696,885 | 12/1997 | Hekmatpour | 395/54 |
| 5,701,400 | 12/1997 | Amado | 395/76 |

OTHER PUBLICATIONS

Church, K.W. and Rau, L.F., "Commercial Applications of Natural Language Processing", *Communications of the ACM*, vol. 38, No. 11, Nov. 1995, pp. 71–79.

Cordingly, E.S., "Knowledge Elicitation Techniques for Knowledge–Based Systems", in *Knowledge Elicitation: Principles, Techniques and Applications*, D. Diaper, ed., John Wiley & Sons, New York, 1989, pp. 89–175.

Hayes–Roth, F. & Jacobstein, N., "The State of Knowledge–Based Systems", *Communications of the ACM*, vol. 37, No. 3, Mar. 1994, pp. 27–39.

Mahesh, K., "Ontology Development for Machine Translation: Ideology and Methodology", Tech. Report MCCS–96–292, New Mexico State University, Las Cruces, N.M., 1995, pp. 1–79.

(List continued on next page.)

*Primary Examiner*—Allen R. MacDonald
*Assistant Examiner*—Sanjiv Shah
*Attorney, Agent, or Firm*—Fenwick & West LLP

[57] ABSTRACT

An integrated system and method for providing a flexible expert system development and runtime environment with an integrated natural language processor and set-oriented knowledge base. The system and process include an input device, a spreading activation module, a reasoning module, a decision module, and a knowledge base. The system and method may also include a natural language processing module. The spreading activation module utilizes the knowledge base, which is set-oriented with named relationships between concepts to traverse the knowledge base efficiently. The reasoning module executes related, nested logic statements which manipulate the complex facts in the knowledge base. The decision module selects the value or values from a list which are most relevant at the moment the module is called. The knowledge base represents all data in a nested, set-oriented manner. The system and method, in turn, produce an output in response to the input or command into the system.

5 Claims, 39 Drawing Sheets

OTHER PUBLICATIONS

Mahesh, K., "Syntax–Semantics Interaction in Sentence Understanding", Thesis Submitted to the Academic Faculty of Georgia Institute of Technology, Mar. 1995, pp. 1–235.

McNair, A.E. & Weibel, A., "Improving Recognizer Acceptance Through Robust, Natural Speech Repair", *Proceedings of International Conference on Speech and Language Processing*, Yokohama, Japan, 1994, pp. 1299–1302.

Musen, M.A., "An Overview of Knowledge Acquisition", Stanford University Technical Report KSL–92–58, Knowledge Systems Laboratory, Stanford, CA, 1993.

Chung et al., Applying parallel processing to natural–language processing, IEEE Expert, pp. 36–44, Feb. 1994.

Corriveau J–P., On the design of a concurrent object–oriented spreading activation architecture, IEEE proceedings, pp. 73–81, Jan. 7, 1994.

Chung et al., Parallel natural language processing on a semantic network array processor, IEEE Transaction on Knowledge and Data Engineering, pp. 391–405, Jun. 1995.

Chung et al., PASS: A parallel speech understanding system, Proceedings., 9th conference on AI, pp. 136–142, Mar. 5, 1993.

Minghui et al., A knowledge based system for chinese NLP, Proceedings TENCON 93, pp. 1086–1089, Oct. 21, 1993.

Murata, Systems integration aspects of the knowledge base development for natural language processing systems, ICSI 92, pp. 288–292, Jun. 18, 1992.

Chung et al., Memory based parsing with parallel marker–parsing, Proceedings of the tenth conference on AI for applications, pp. 202–207, Mar. 4, 1994.

Lucarella, Uncertainty in information retrieval: an approach based on fuzzy sets, Ninth annual Intl. Phoenix conf. on computers and Communications, pp. 809–814, Mar. 23, 1990.

SYSTEM AND METHOD FOR EXPERT SYSTEM ANALYSIS USING QUIESCENT AND PARALLEL REASONING AND SET STRUCTURED KNOWLEDGE REPRESENTATION

BACKGROUND OF THE INVENTION

1. Field of the Invention

The present invention relates to the field of expert systems and, more specifically, to the field of expert system analysis through structured knowledge representation in single and parallel processing systems including those used for natural language processing.

2. Description of the Related Art

A generalized expert system typically includes a language or system for processing instructions and a representation of the data required for the application domain. A system for understanding natural language input from a user additionally includes specific processing instructions for interpreting natural language input and specific data which describes the user's natural language. All of the above components interact tightly with one another, so that the design or selection of such components significantly affects the resulting system's efficiency, correctness, robustness, and extensibility to advanced hardware platforms.

Natural language systems have processed the disambiguation of user input (e.g. deciding which among many possibly similar and plausible interpretations of the user's input is correct) in numerous methods. An important aspect of each of those methods is to "prune" (e.g. reduce) the total number of candidate interpretations from an initial number which is quite large in a real-world implementation down to a very small number which is practical (e.g. time-efficient) to process. Those methods generally fall into two categories. The first defines criteria which each element of the input sentence must meet, usually by characteristics like number of arguments and in what part of a descriptive hierarchy it must reside (e.g. "x must be some kind of machine"). This method requires continuous and precise, time-consuming maintenance whenever an addition or change is made to the application domain's data. The other method utilizes massive statistical computations on existing text to find other words that are often used with a given word, for example "bank" may be used in one sense with "money" and in another sense with "river". This method is unable to adapt to jargon or highly-specialized application domains while retaining reasonable recognition accuracy. Both of these methods have difficulties such as a decrease in speed of execution when the application domain is large (true for almost every commercial application) and poor success or uncertainty in understanding analogy, metaphor, and user input sentences which do not exactly conform to those expected by the system.

Current implementations for disambiguating natural language input typically are unable to utilize the parallel processing capabilities of multi-processor systems, and therefore create a processing bottleneck on advanced hardware.

The language or system for processing the specific natural language instructions is generally either frame-based, like most expert systems, or a series of sequential statements, often in a specialized language which has special data manipulation facilities like unification and list processing, such as LISP or Prolog.

Current expert systems are typically constructed as a series of "frames" which consist of the equivalent of an "IF" clause, describing the conditions under which this frame is true, and a "THEN" clause that describes the action to take when the "IF" clause is found to be true. Each frame is meant to contain an independent piece of knowledge about the application domain. If a variable, on which any frame depends, changes during execution, the entire frame is automatically placed on the "agenda" (execution list) to fully execute again. This is true whether or not that frame has previously executed. If the frame contains references to external modules written in a procedural language like C, which is usually needed for more complex actions than IF-THEN constructions, those modules are often unable to update the variables which affect the agenda. These expert systems are complex to program, difficult to extend into unique environments, and limited in their ability to combine knowledge from different sources, particularly during runtime.

Specialized languages like CLOS and Prolog do not automatically update any equivalent of an agenda when changing a variable, so that they are unable to have other instructions which depend on that variable updated. Updating is accomplished via such methods as manually-written routines associated with each variable for which this updating is desired. Clearly, this is repetitive and time-consuming.

Certain specialized languages like Prolog have "unification", or pattern-matching capabilities. Although such systems are somewhat flexible they are very slow in execution, so that special commands and programming methodologies need to be utilized to minimize the amount of unification that is actually done. Thus, these languages result in slow response times and are difficult to expand to large applications.

An issue with current implementations of both expert systems and unification-based languages is the need to introduce some level of sequencing of execution for the purposes of efficiency, initialization, grouping of similar procedures, and ease of constructing the data and instructions for the application. Examples of these are knowledge islands and execution priorities in expert systems and Prolog's backtracking. This added-on sequencing defeats or overrides the automatic features described above and creates a requirement for much greater training and expertise for those who build the application knowledge. This requirement for sequencing also makes executing such a language or expert system ineffective on a multiprocessor computer system (utilized for any application, not just natural language), since the frames or unifications are no longer independent time-wise. This sequencing also makes maintenance more difficult and error-prone, since the time dependencies in current implementations are hidden and inconsistent with the model of supposedly independent pieces of knowledge about the application domain.

Many natural language systems use separate storage and processing methods for data describing linguistic properties of words and for data describing the application domain. Frequently, natural language understanding systems utilize completely separate processing steps, where the linguistic analysis produces an output structure describing the sentence which is then used as input by the independent application domain analysis. Both the data separation and the processing separation introduce inefficiencies in processing and reduced accuracy in understanding the natural language command. This separation also makes the creation and updating of the data for an application more complex because information about a single entity in the application domain must be described in two different places with very different methods. This requires a person with significant expertise in linguistics as well as a person with knowledge of the application domain to design and implement the application. Historically, these have been different persons each with specialized training in their area of expertise and this dichotomy continues to be enforced by the development tools provided with current expert systems and natural language systems.

The data required for natural language understanding systems and general expert systems is complex for large commercial projects. This data is typically represented by some combination of lists, structures, and pointers from one data structure to another, with different types of data being represented by different specialized structures. In most systems, data and executable instructions are also represented in very different formats. This proliferation of formats reduces generality and efficiency, limits extensibility, and restricts the access of one type of data while processing another type of data. The proliferation also makes creation of the data more complex, particularly when lists of alternatives and multiple constraints for each alternative are desired.

All of the components of a complex reasoning application such as a natural language understanding system interact so intimately that design decisions in one component have drastic effects on the capabilities, effectiveness, robustness, and extensibility of all of the other components. Therefore, there is a need for a system which is designed in its entirety as a consistent operating whole and there is a need for a system and process that increases overall system efficiency and accuracy in an expert system environment.

SUMMARY OF THE INVENTION

An integrated system is described which provides a flexible expert system development and runtime environment with an integrated natural language processor and set-oriented knowledge base. The reasoning module may operate directly from a user input command as an expert system or be called multiple times from the module which interprets a natural language input from the user. The decision module is called by other modules when a value is required. The integrated design of the multiple components allows parallel execution of many processes. The integration also enables consistent definition of differing kinds of complex and interrelated data.

The spreading activation module utilizes the fact that the knowledge base is set-oriented with named relationships between concepts to traverse the knowledge base efficiently. Multiple spreading activation processes may execute robustly in parallel in a multiprocessor system. Chains of related concepts are created which are relevant to the current command. The chains contain both linguistic and application-domain concepts since both kinds of concepts are stored consistently in the knowledge base. These chains provide a small, computationally-tractable number of concepts for evaluation by other processes such as natural language processing which require large amounts of computing time for each evaluated concept.

The natural language processing module accepts a user's natural language command input one word at a time and adds information to the knowledge base which creates a description of the structure of the entire input sentence. Once this structure is built, the list of concepts produced by the spreading activation module is analyzed to identify those concepts in the knowledge base which most closely match the user's input command.

The reasoning module executes related, nested logic statements which manipulate the complex, hierarchical facts in the knowledge base. When a value is changed by a logic statement, all previously-executed statements which rely upon that value are automatically re-executed to maintain their correctness. This re-execution is accomplished in a manner which allows optimization and enables robust parallel execution of many processes.

The knowledge base consistently represents all data in a nested set-oriented manner. This results in compatible access to different data types, linguistic and application-domain information, permanent and temporary data, and facts and statements. Extensions to the system are accomplished without changes to the existing set representation. The facility to nest sets and have consistent representations is the foundation of the decision module which interprets varying certainty from multiple sources to select the most relevant value from a given list of values.

The decision module selects the value or values from a list which are most relevant at the moment it is called. This selection process takes into account the execution history of the reasoning module, the certainty and verity of different sources of the values, and a complex set of criteria for selecting the value or values. It thus connects the time-dependent and time-independent aspects of the system.

DETAILED DESCRIPTION OF THE PREFERRED EMBODIMENT
SYSTEM INTRODUCTION

Figure 1:
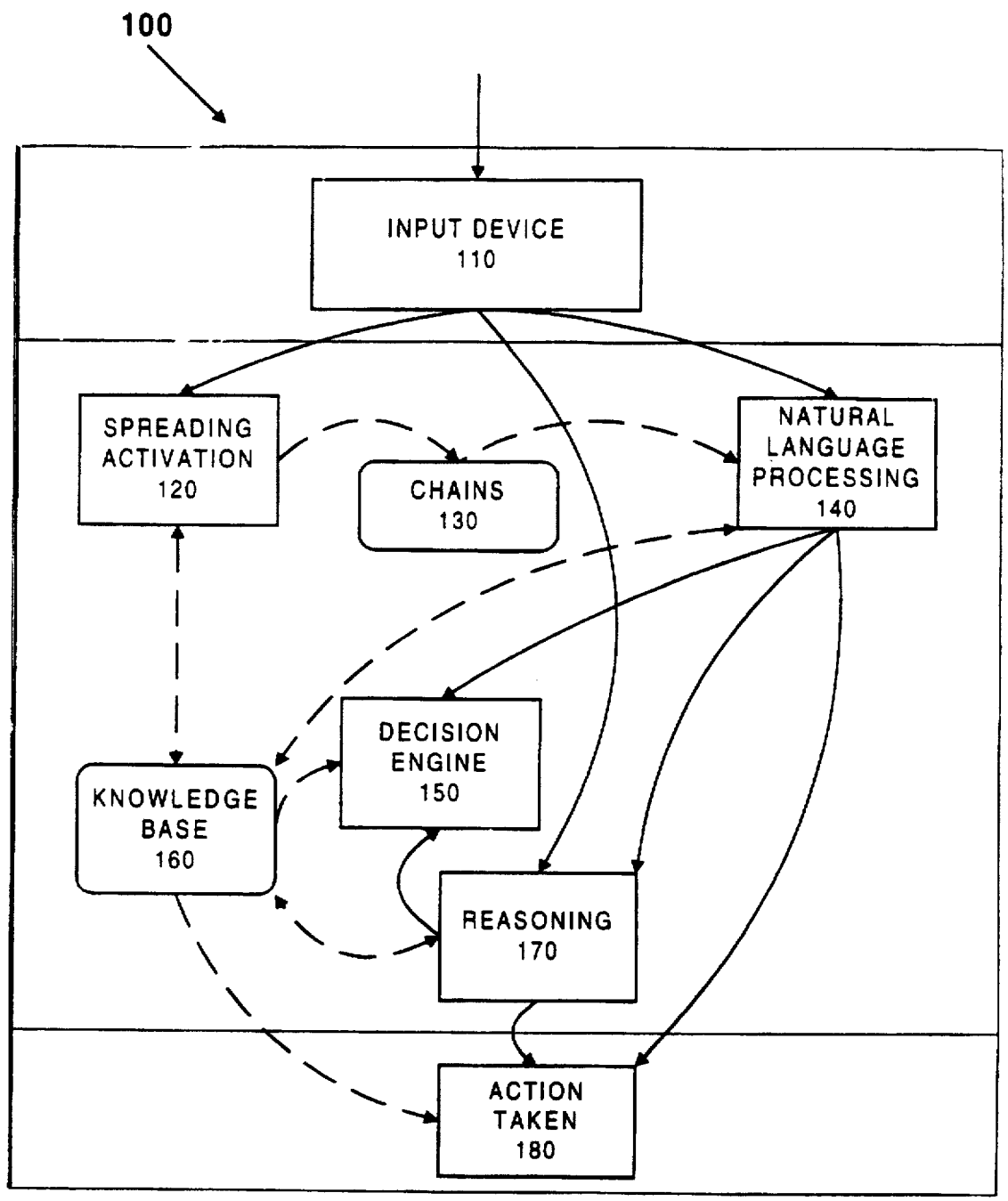
FIG. 1 is a block diagram of the complete system in the present invention.

FIG. 1 is a flow diagram illustrating one embodiment of a system and a process of the present invention. The system and method of the present invention may operate in data processing environments, including a computer hardware software system that includes a processor and a random access memory (RAM). Included in system 100 are an input device 110 of a command which may be in natural language, a spreading activation module 120, a natural language processing module 140, a decision module 150, and a reasoning module 170, and a controlled device 180. Each module includes a system or engine and an associated process. Also included are a chain 130 data structure and a knowledge base 160 data file. The input device 110 initiates the spreading activation module 120, the natural language processing module 140 and the reasoning module 170. The spreading activation module 120 writes into the chains 130 data structure which in turn, is accessed by the natural language processing module 140. The spreading activation module 120 reads and writes the knowledge base 160 data file, as does the reasoning module 170. The decision module 150 reads the knowledge base 160 data file and is utilized during processing by the natural language processing module 140 and the reasoning module 170. The natural language processing module 140 and the reasoning module 170 each may initiate processing of the controlled device 180 module that undertakes an action solicited by a user or commanded by the input. This controlled device 180 also reads the knowledge base 160.

The present invention provides a flexible expert system development and runtime environment with the integrated natural language processor 140 and knowledge base 160. The system of the present invention may be adapted, through the specification of domain-specific facts and statements, further described in FIG. 3, to any of a variety of application areas. In any particular application, the present invention allows a user input of a command which may be a natural language or free text command through an input device 110, which the system will interpret and use to execute an appropriate action using a controlled output device 180 or program. The controlled output device or program may be of a useful type that can be interfaced with and controlled by a computer. The present invention is not limited by the types of output devices or program that may be used, but as a development tool for creating domain-specific natural language and expert systems, may be adapted for use with any variety of output devices or programs.

All of the data which controls the system 100 during all processes is typically kept in a single knowledge base 160. The format of the data is consistent for all types of data so that any process in the system can access or produce data which is produced or accessed by any other process, thereby improving integration. This includes data which is kept permanently on the disk and temporary data which is used only while interpreting a natural language command from the input device 110. The data format is interpreted as: the domain facts 310 which include the user's environment and the application; and logical statements 340 which are executed by a reasoning module 170 in various processes.

The data format for the facts 310 and statements 340 is physically represented in memory by nested sets 930 of low-level, simple blocks of information called subrecords 915.

These various types of sets each contain related information (both facts 310 and statements 340) and are often contained within one another, or nested, an arbitrary number of levels deep. This set 930 representation provides a highly flexible and extensible manner of relating information of many very different types and having fully standard methods of accessing each kind of information. The set 930 representation also allows both natural language processing and classical expert system operation to access exactly the same data.

When the data represents facts 310, the flexibility of the set 930 representation provides the system with advantages over conventional representations, including the ability to extend the system's capabilities without changing existing knowledge, to utilize knowledge from different sources that may even conflict, to easily add new knowledge, to represent application-specific information which is not understood by the system or other applications, allowing facts and statements to transparently read each other's data without new software being written, providing common data to natural language processing and expert system reasoning, and to support advanced and evolving models of decision-making. One aspect of the set 930 representation which further contributes to these advantages is allowing any modifier 460 to be applied to any value 450 in the knowledge base in a standard and consistent manner, without practical limitation as further described in FIG. 4. For example, modifiers 460 which describe the formatting required on output may be added to any value 450. Also, a series of associated modifiers 460 may be grouped together to provide differing descriptions of the value 450 which are used by decision module 150. For example, different people may have different opinions about the color of John Smith's shirt (e.g. the value is blue, green, or teal), and each one will have a different level of certainty about his or her opinion. The owner of the knowledge base 160 may even have opinions about the reliability of each of those persons. These different sources (people) of facts (color) 310, and their reliability, may be encoded as nested and grouped modifiers 460 to facts represented in the knowledge base 160. The modifiers 460 may also represent kinds of information like constraints on the use of the value (e.g. this value is valid only when processing the French language), description of internal programming data (e.g. 4-byte unsigned integer), and others as defined over time. During execution, the decision module 150 evaluates facts 310, including any modifiers to such facts, to determine a particular response to the user input.

The set 930 representation of the knowledge base 160 also allows grouping of values 450 into related patterns. For example, a particular geographical region may be described as both {Silicon, Valley} and {San, Francisco, Bay, area}. Even these groups of values 430 may each have a set of modifiers 460 and these groups may also be nested within other groups of values.

Figure 2:
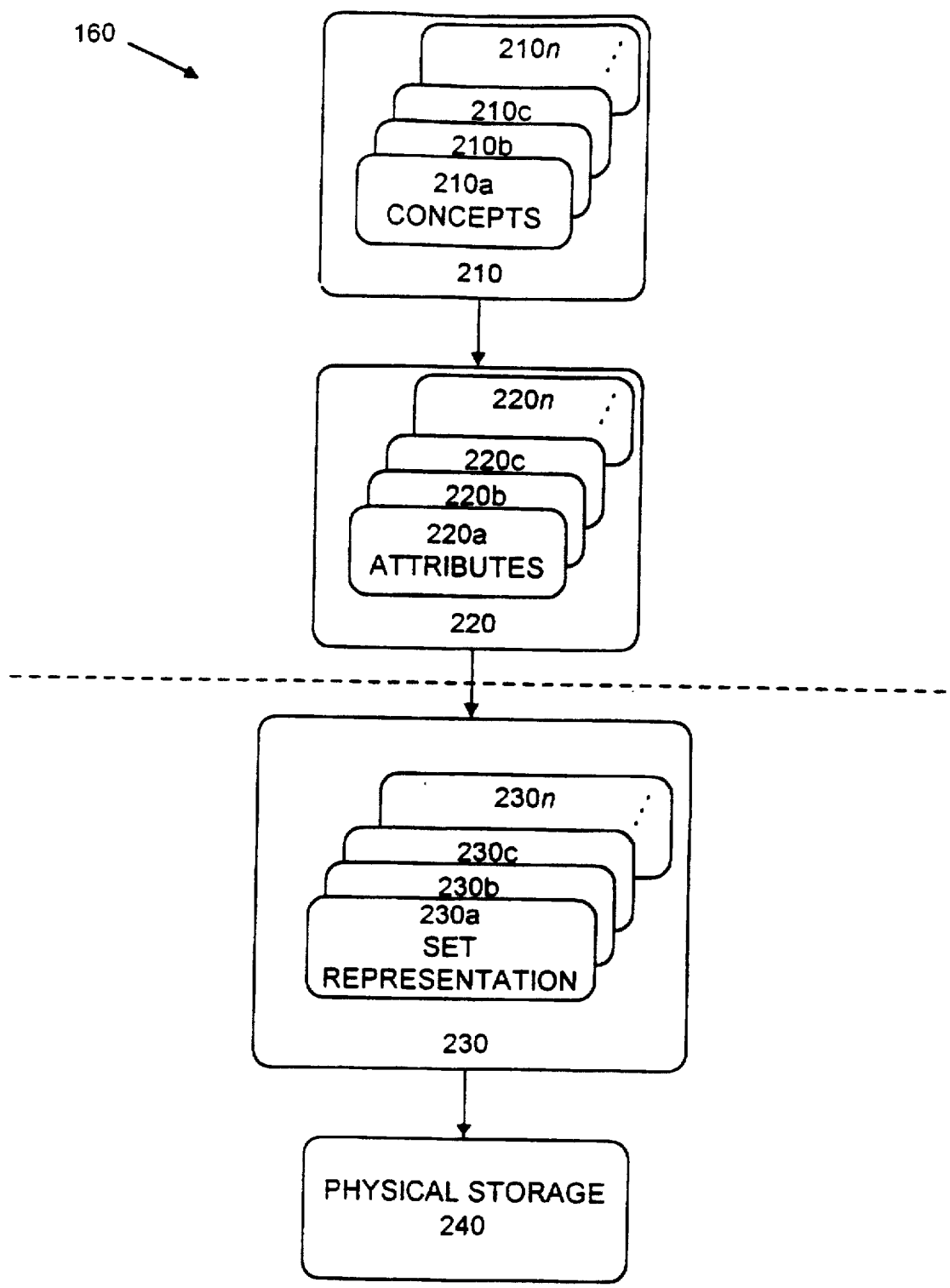
FIG. 2 is a diagram of one embodiment of Knowledge Base layers in the present invention.

At a higher level, concepts 210 contain interesting groups of information which describe a relevant object or action in the user's environment or application, which is further illustrated in FIG. 2. Examples are MarySmith and MarySmithsHouse. These concepts 210 are further related to each other in various manners. For example, MarySmith is a Person (this is the Instance relationship). Also, MarySmith has a Home which is MarySmithsHouse (this is a Generic type of relationship). These relationships are represented in the knowledge base 160 as attributes 220 and values 450 to form a comprehensive description of the part of the user's environment, application domain, and linguistic knowledge that is relevant to the user's current needs. Most parts of the system take advantage of this description of the application and linguistic domains and the different types of relationships to extract information which is both relevant and efficiently processed.

A spreading activation module 120 uses the structured set 930 description in the knowledge base 160 to efficiently find a list of concepts 210 which are relevant for other parts of the system to evaluate. This list of relevant concepts 210 provided by the spreading activation module 120 considerably reduces the amount of information that is processed by the decision module 150 and other components. Limiting the list of relevant concepts 210 increases performance by pruning information which is not appropriate to the current evaluation. For example, there may be thousands of telephones (with their numbers and locations) defined in a given knowledge base 160, and comparing a request for "Anne's phone" to each one of them would be extremely time-consuming. The spreading activation 120 does a pre-scan of the knowledge base 160, simultaneously with each word of the user's entry of his or her command 110, but before the system knows exactly what it's looking for (e.g., a telephone). Numerous rules control where this scan searches outward from a word typed by the user, to ensure that only useful relationships are followed. Eventually, multiple chains 130 are discovered connecting concepts 210 which are relevant in the context of the current user command. Multiple processes may call the spreading activation module 120 simultaneously in a manner which would promote effective execution on multiple processors operating in parallel during (not after) the user's input 110 of his or her command. This parallel execution saves elapsed time until the system executes an appropriate action 180.

The chains 130 which are further described below are utilized by the natural language processing module 140 to define which concepts 210 are considered for evaluation which takes significant computer time for each concept. Because the knowledge base 160 represents linguistic information and application domain-specific information consistently, both kinds of information appear as concepts 210 in the chains 130 for further integrated evaluation. The natural language processing 140 chooses one or more concepts 210 which are the appropriate response to the user's command 110. These concepts 210 may represent facts 310 in the system (e.g. MarySmithsHouse) or may contain logical statements 340 which guide the system to further reasoning 170 to fulfill the user's need; e.g., a diagnostic to fix a personal computer's (PC's) incompatibility problem. The present invention may utilize one or more different natural language processing modules 140 which may be of varying embodiments. Examples of natural language embodiments are heuristic and statistical models, Augmented Transition Networks, Head-driven Phrase Structure Grammar models, and Lexical Functional Grammars.

The reasoning module 170 is utilized by multiple other modules in the system. The natural language processing 140 may use the reasoning module 170 to execute statements 340 which produce an internal representation of the user's input sentence 110. As described above, the reasoning module 170 may also be invoked to take action for the user after the response is determined. In this case, it will execute a complex series of related, nested logic statements 340 which, for example, implement a diagnostic. Such a diagnostic can investigate the status and settings of a nonfunctional device on the user's computer and adjust the configuration to render the device usable. During the execution, the statements 340 access the knowledge base's facts 310 in a manner which heavily utilizes the different types of relationships among concepts 210 and the meaning that those relationships have in the real world.

Statements 340 executed by the reasoning module 170 look very much like classical sequential programming statements in a language like C. For example "A=5" sets the variable A to the value 5, then later "B=A" also sets B to the value 5. In a convention system, if "A=77" is later executed, only A is set to the value 77, while B retains the value 5. In the present invention, when the statement "A=77" is executed in this example, A is set to the value 77 as usual. Additionally, the statement "B=A" is automatically reexecuted 2150 as is further described in FIG. 21, transparent to the currently-executing statements 340, since it depends on the value of A. This results in B also being set to the value 77. Thus, only individual statements 340 are reexecuted 2150 when something that they depend on is later changed. The current thread of execution continues at full speed when such a change is made and reexecution 2150 is accomplished at another time, possibly when system processing reaches quiescence, or in a parallel thread, both of which allow global optimization of multiple reexecutions. This capability of automatically reexecuting 2150 individual statements 340 when needed due to changed data provides significant opportunities for executing multiple blocks of statements in parallel on multiple processors while keeping the data consistent across those separate blocks of statements.

Thus, the present invention provides a system and method to understand a user's natural language input, decide on the most appropriate response, and take action for the user. The present invention accomplishes this in a manner which is more efficient, more integrated, more easily extended, more tolerant of nonstandard user input, and more effective in parallel processing systems than prior systems while allowing the data for an application to be easier to create, able to represent more complex relationships, and capable of allowing multiple opinions and constraints for pieces of data.

KNOWLEDGE BASE REPRESENTATION LAYERS

Referring to FIG. 2, a block diagram illustrating one embodiment of layers composing the knowledge base 160, the knowledge base 160 layers include concepts 210, attributes 220, set representation 230, and physical storage 240. At the highest layer of the knowledge base 160 are one or more concepts 210, which contain an abstract description of objects and actions in the application domain. The concepts 210 are composed one or more attributes 220, which contain either one or more facts 310 or one or more statements 330, both of which are described in FIG. 3. Attributes 220 are represented as sets by use of a data structure called subrecords 915, which is further described in FIG. 9. At the lowest layer, file records 905, which are collections of subrecords 915 representing individual concepts 210, are stored on physical storage 240 in an indexed sequential file 1010.

Concepts

An entity is something that exists either in a physical form, such as a person, or in abstract form, such as an idea. An attribute 220 is a quality or characteristic of an entity; an entity may have numerous attributes 220. The knowledge base 160 is a collection of concepts 210, each of which contains the attributes 220 pertaining to a particular entity. Each concept 210 has a name, which is the name of the entity it represents, and a number, which is assigned by the system when the concept 210 is created. Every attribute 220 also has a name. In addition, each attribute 220 is stored as a separate concept 210 in the knowledge base 160.

Attributes

Figure 3:
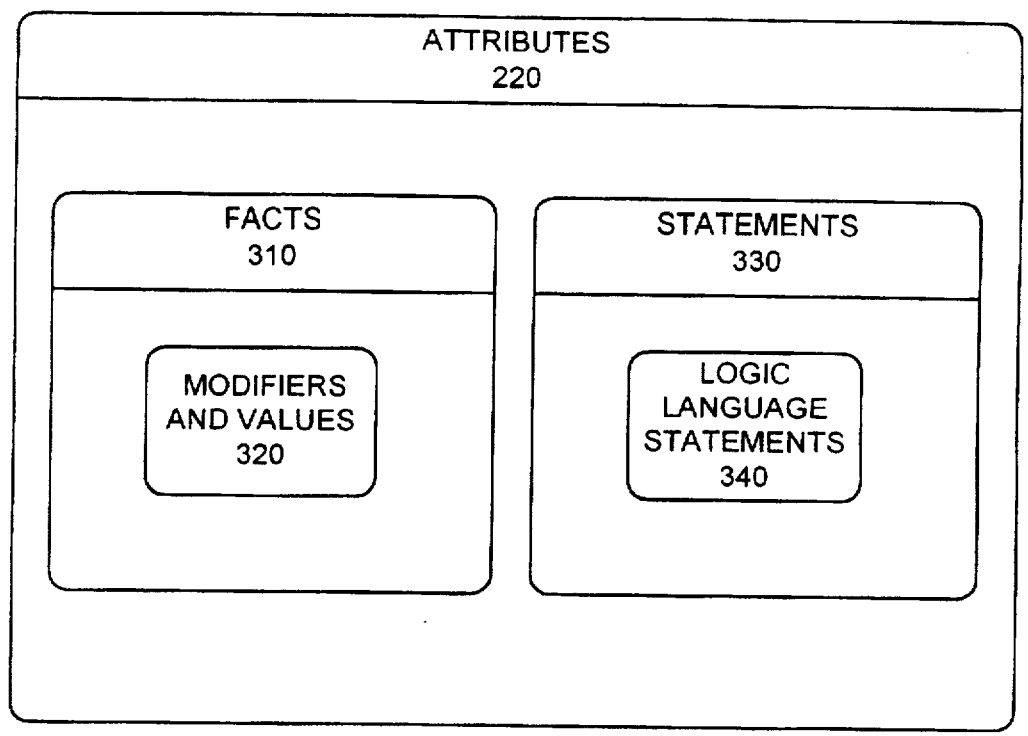
FIG. 3 is a diagram of one embodiment of attributes in the present invention.

Referring now to FIG. 3, there is illustrated two types of attributes 220: fact attributes 310 and statement attributes 330.

Figure 4:
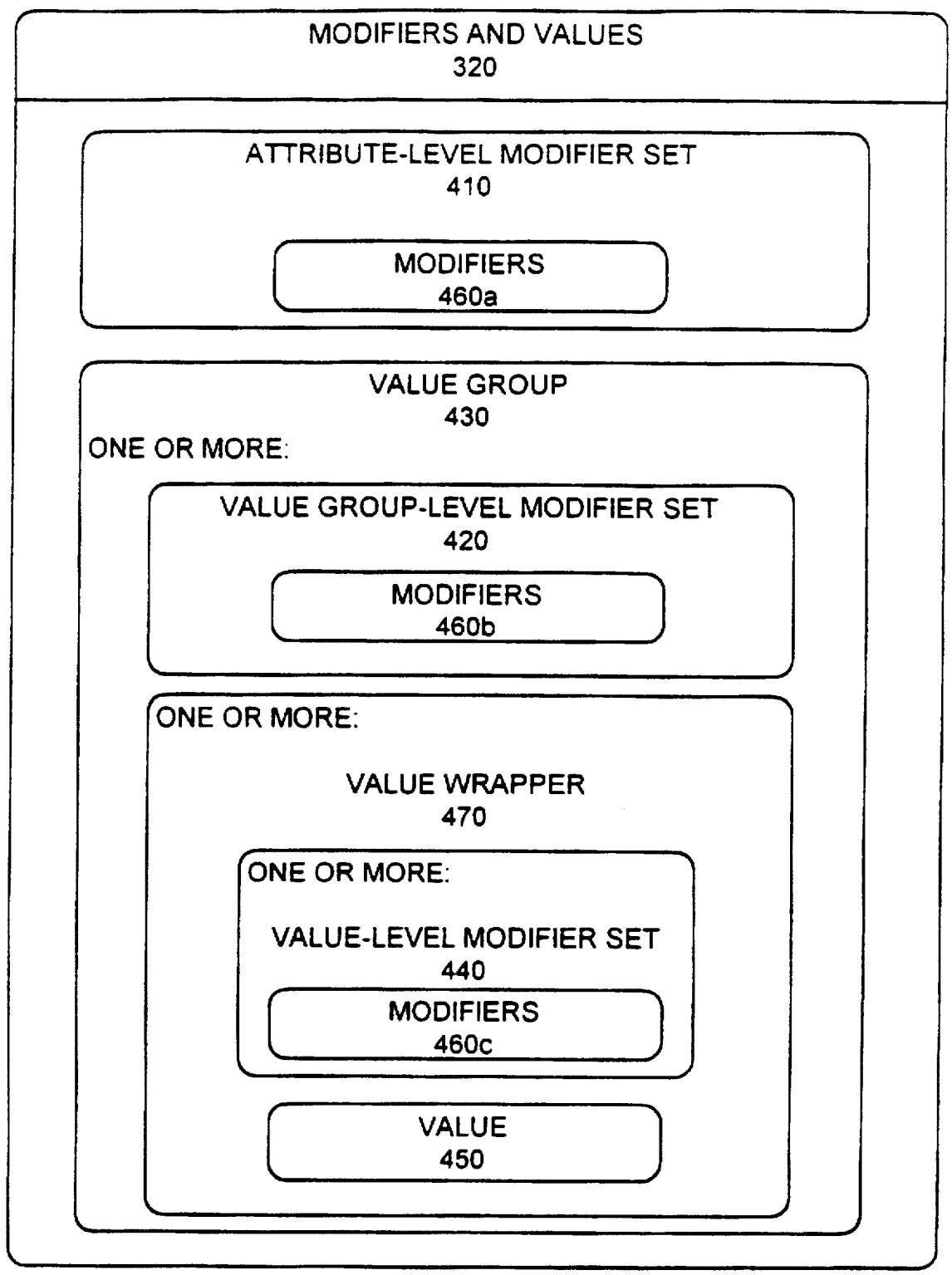
FIG. 4 is a diagram of one embodiment of modifiers and values in the present invention.

Facts 310 about an entity are represented by one or more modifiers and values 320. Statements 330 about an entity are represented by logic language statements 340. FIG. 4 is a block diagram illustrating the modifiers and values 320. The modifiers and values 320 include an optional attribute-level modifier set 410, which contains one or more modifiers 460, and one or more of an optional value group-level modifier set 420, which contains one or more modifiers 460, and a value group 430. Further, the value group 430 contains a value wrapper 470, which contains one or more of an value-level modifier set 440, which contains one or more modifiers 460, and a value 450. A value 450 can be such types as an integer, a text string, a Boolean variable, a concept name, a TreeWalk, a time period, a volume, a geographical location, and others as required. Values 450 are defined within a value group 430, which can contain one or more values 450. For example, an attribute 220 named Colors might have the values {red, green, blue, white}. A fact 310 may have multiple value groups 430 associated with it. Value groups 430 can be nested within other value groups 430.

Modifiers 460 provide additional information about values 450, such as the individual who asserted (wrote) the value, an opinion of the likelihood that the value is true, or formatting information. Modifiers 460 are grouped into modifier 460 sets. There are three kinds of modifier 460 sets defined in the system: a value-level modifier set 440, a value group-level modifier set 420, and an attribute-level modifier set 410. Use of modifier sets is optional and depends on the application domain. Each value 450 has one or more value-level modifier sets 440 associated with it. Each value group 430 may have a value group-level modifier set 420 associated with it; if so, the modifiers 460b in the value group-level modifier set 420 apply to all values 450 within the value group 430. Each attribute 220 may have an attribute-level modifier set 410 associated with it; if so, the modifiers 460a apply to all values 450 within all value groups 430 for that attribute 220.

A preferred embodiment of the syntax, in Backus-Naur Form ("BNF"), for attributes 220 follows. In the form of BNF notation used below, optional entries are enclosed in square brackets ([ ]) and terminal symbols are enclosed in angle brackets (< >). A terminal symbol is one term is not defined in terms of other symbols. The following terminal symbols are used:

- <ConceptName>    The name of a knowledge base 160 concept 210
- <BooleanConstant>    TRUE or FALSE
- <Integer>    An integer constant
- <TextConstant>    A text string
- <Modifiers defined by application domain>    Modifiers, as explained above.
- <FuncParamLabel>    A function parameter declared within an attribute 210, specifically a Statement attribute 330.
- <LocalVariable>    A local variable declared within an attribute 220, specifically a Statement attribute 330.

The syntax, in BNF, of an attribute 220, specifically a fact attribute 310, is:

| | | |
|---|---|---|
| FactAttribute | ::= | AttributeLabel ':' AttributeRightSide |
| AttributeLabel | ::= | <ConceptName> ['Of'] |
| AttributeRightSide | ::= | AttributeGroups |
| | := | [Modifiers] '{' [AttributeGroups] '}' |
| AttributeGroups | ::= | AttributeGroup |
| | ::= | AttributeGroups ';' AttributeGroup |
| AttributeGroup | ::= | ValuePhrases |
| | ::= | [Modifiers] '{' [ValuePhrases] '}' |
| ValuePhrases | ::= | ValuePhrase |
| | ::= | ValuePhrases ',' ValuePhrase |
| ValuePhrase | ::= | Modifiers AttributeValue |
| AttributeValue | ::= | <ConceptName> \| <BooleanConstant> \| <Integer> \| <TextConstant> \| TreeWalk (and others as required) |
| Modifiers | ::= | '[' <Modifiers defined by application domain> ']' |

Statements 330 about an entity are represented by one or more logic language statements 340. Logic language statements 340 implement an executable programming language. The syntax, in BNF, of an attribute, specifically a statement attribute 330, is:

| | | |
|---|---|---|
| StatementAttribute | ::= | LogicLabel ':' |
| | | 'FUNCTION(' FuncParamLabels ')' |
| | | '{' LogicStatements '}' |
| FuncParamLabels | ::= | <FuncParamLabel> |
| | ::= | FuncParamLabels <FuncParamLabel> |
| LogicLabel | ::= | <ConceptName> |
| LogicStatements | | ::= LogicStatement |
| | ::= | LogicStatements LogicStatement |
| LogicStatement | | ::= AssignmentStatement |
| | ::= | IfStatement |
| | ::= | ExecutionStatement |
| | ::= | SwitchStatement |
| | ::= | LocalStatement |
| | ::= | ReturnStatement |

As the above syntax shows, there may be multiple types of logic language statements 340, where one embodiment of the present invention includes at least those shown.

Figure 5:
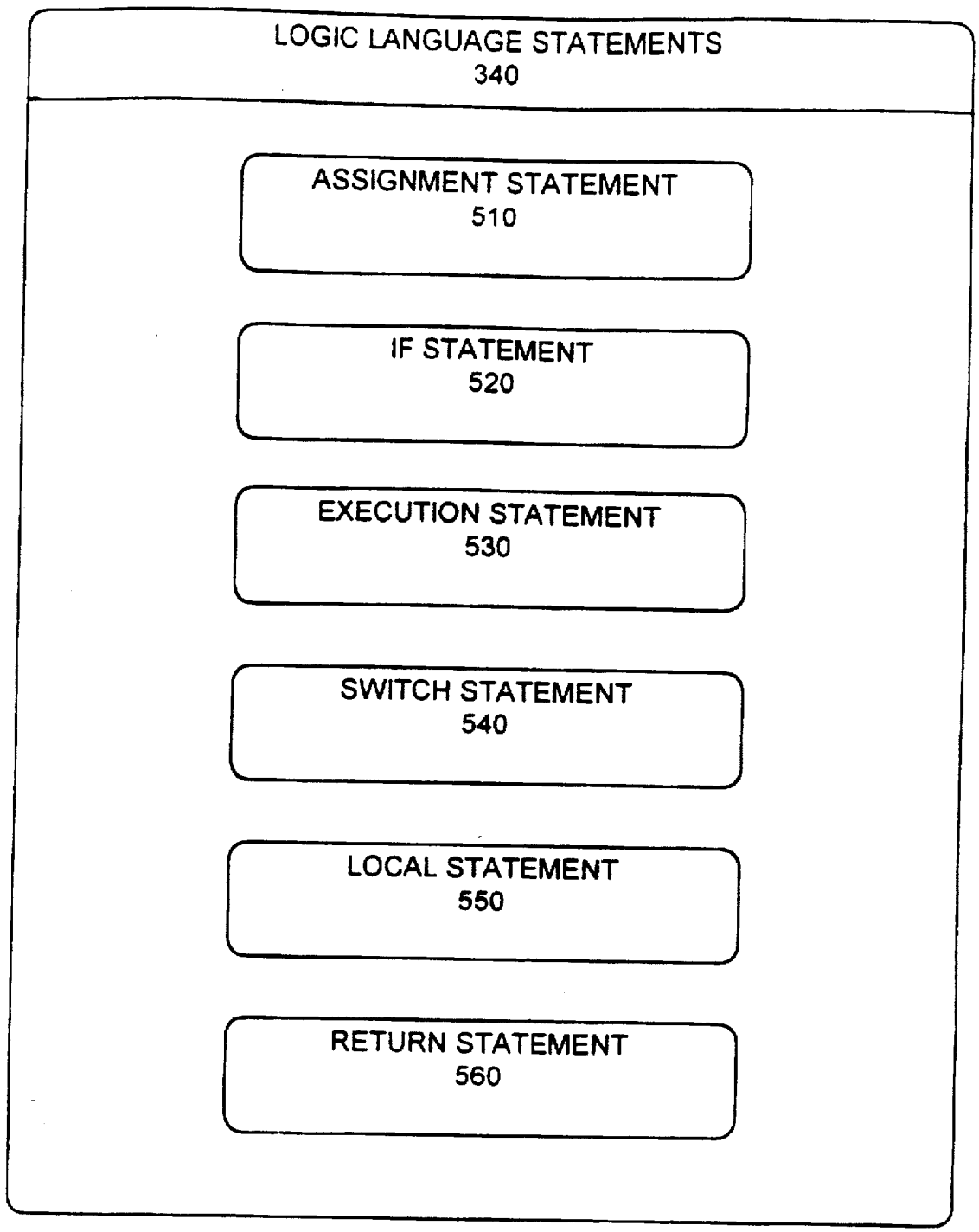
FIG. 5 is a diagram of one embodiment of logic language statements in the present invention.

FIG. 5 is a block diagram illustrating components of the logic language statements 340. The logic language statements 340 include an assignment statement 510, an if statement 520, an execution statement 530, a switch statement 540, a local statement 550, and a return statement 560. The syntax for each type of logic language statement 340 is as follows.

| | | |
|---|---|---|
| AssignmentStatement | ::= | AssignmentLeftSide '=' AssignmentRightSide ';' |
| AssignmentLeftSide | ::= | AssignmentTarget |
| | ::= | [Modifiers] AssignmentTarget |
| AssignmentTarget | ::= | <ConceptName> \| TreeWalk \| <LocalVariable> \| <FuncParamLabel> |
| AssignmentRightSide | ::= | AssignmentValue |
| | ::= | [Modifiers] '(' AssignmentValue ')' |
| AssignmentValue | ::= | ValuePhrase |
| | ::= | TreeWalk |
| | ::= | <LocalVariable> |
| | ::= | <FuncParamLabel> |
| | ::= | SpecialFuncRef |
| TreeWalk | ::= | WalkNode '::' WalkNodes |
| WalkNodes | ::= | WalkNode |
| | ::= | WalkNodes WalkNode |
| WalkNode | ::= | AssignmentRightSide [BranchAlternatives] |
| BranchAlternatives | ::= | BranchAlternative |
| | ::= | BranchAlternatives BranchAlternative |
| BranchAlternative | ::= | [Modifiers] BranchAlternativeVal |
| BranchAlternativeVal | ::= | <ConceptName> \| <FuncParamLabel> \| <LocalVariable> |
| SpecialFuncRef | ::= | "ThisConcept" |
| | ::= | "CallingConcept" |

The syntax, in BNF, for the assignment statement 510 is:

| | |
|---|---|
| ::= | "ExecutingConcept" |
| ::= | "InitialCallingConcept" |
| ::= | "MyInputAtom" |

The syntax, in BNF, for the if statement 520 is:

| | | |
|---|---|---|
| IfStatement | ::= | IfPart ThenPart [ElsePart] 'ENDIF' |
| IfPart | ::= | 'IF' ConditionalExpression |
| | ::= | 'IF' [Modifiers] '(' ConditionalExpression ')' |
| ThenPart | ::= | 'THEN' LogicStatements |
| ElsePart | ::= | 'ELSE' LogicStatements |

| | | |
|---|---|---|
| ConditionalExpression | ::= | ValuePhrase |
| | ::= | TreeWalk |
| | ::= | <LocalVariable> |
| | ::= | <FuncParamLabel> |
| | ::= | SpecialFuncRef |

The syntax, in BNF, for the execution statement 530 is:

| | | |
|---|---|---|
| ExecutionStatement | ::= | ExecutionName '(' ExecParameters ')' ';' |
| | ::= | [Modifiers] '(' ExecutionName ')' '(' ExecParameters ')' ';' |
| ExecutionName | ::= | <ConceptName> |
| | ::= | TreeWalk |
| ExecParameters | ::= | ExecParameter |
| | ::= | ExecParameters ExecParameter |
| ExecParameter | ::= | AssignmentRightSide \| TreeWalk |

The syntax, in BNF, for the switch statement 540 is:

| | | |
|---|---|---|
| SwitchStatement | ::= | SwitchPart CaseParts [ElsePart] 'ENDSWITCH' |
| SwitchPart | ::= | 'SWITCH' SwitchExpression |
| | ::= | 'SWITCH' [Modifiers] '(' SwitchExpression ')' |
| SwitchExpression | ::= | ConditionalExpression |
| CaseParts | ::= | CasePart |
| | ::= | CaseParts CasePart |
| CasePart | ::= | 'CASE' CaseValue ':' LogicStatements |
| CaseValue | ::= | AttributeValue |
| | ::= | Modifiers |
| | ::= | '(' CaseValue ')' |

The syntax for the local statement 550 is:

| | | |
|---|---|---|
| LocalStatement | ::= | 'LOCAL' LocalVariables ';' |
| LocalVariables | ::= | LocalVariable |
| | ::= | LocalVariables ',' <LocalVariable> |

The syntax for the return statement 560 is:

| | | |
|---|---|---|
| ReturnStatement | ::= | 'RETURN' AssignmentRightSide ';' |

Figure 6:
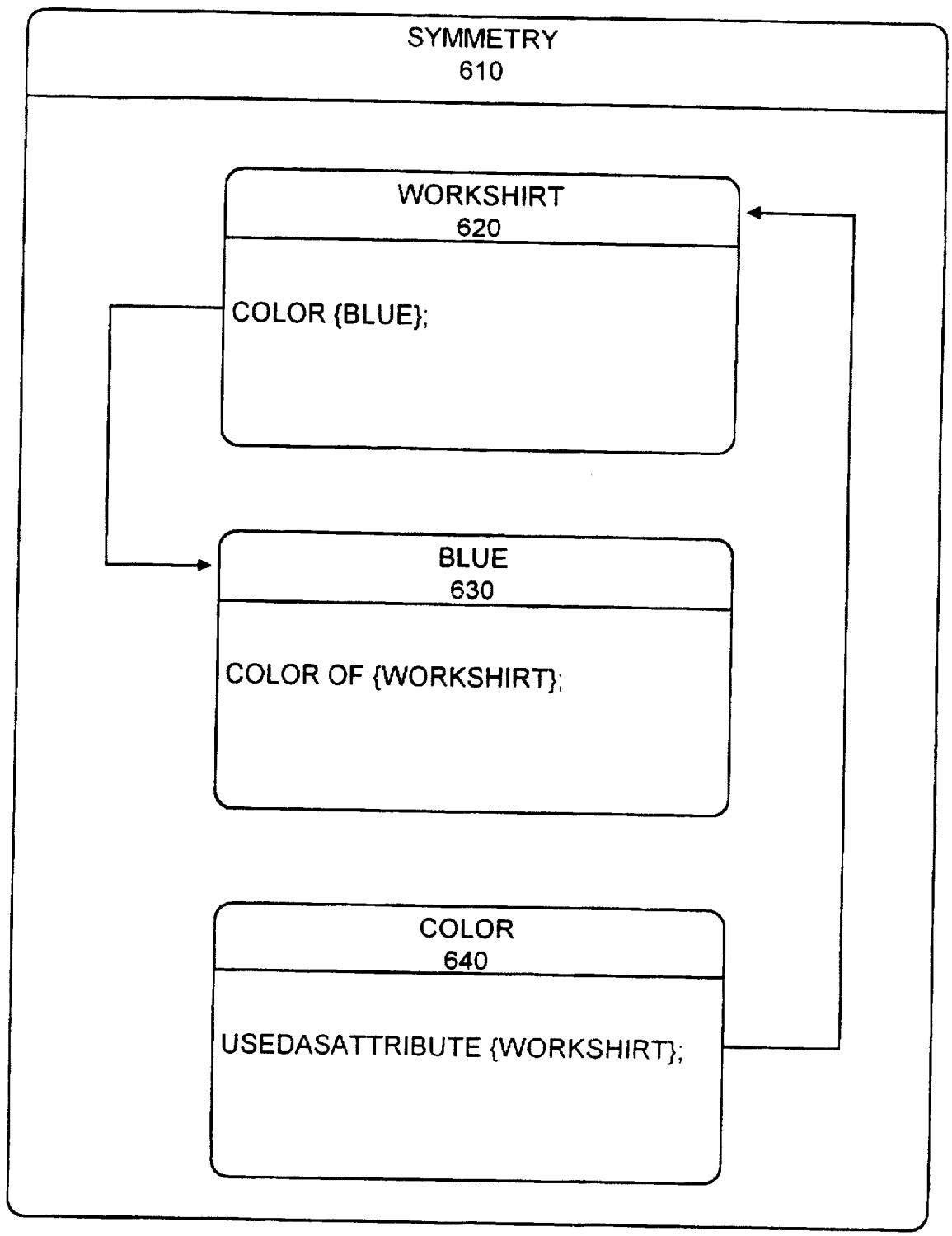
FIG. 6 is a diagram of one embodiment of symmetry in the present invention.

Attributes 220 are used to express relationships among entities, represented in the knowledge base 160 as concepts 210. There are multiple types of relationships used in the system and the relations are symmetric. FIG. 6 is a block diagram illustrating one embodiment of symmetry 610. In this embodiment, the system maintains symmetry 610 by having concepts 210 record the names of other concepts 210 that refer to them. In FIG. 6 the concept 210 named WORKSHIRT 620 contains an attribute 220 named COLOR. The concept 210 named COLOR 640 records that fact that WORKSHIRT 620 uses it as an attribute 220 by having WORKSHIRT 620 appear as a value 450 in its USEDASATTRIBUTE attribute 220. The concept 210 named BLUE 630 records the fact that WORKSHIRT 620 contains it as a value 450 of the COLOR attribute 220 by having WORKSHIRT appear as an value 450 in its COLOR OF attribute 220.

One preferred embodiment of relationships among entities contains at least the relationships in the Table 1 and may include more that express the general way in which entities interact with each other.

TABLE 1

Relationships among entities

Figure 7:
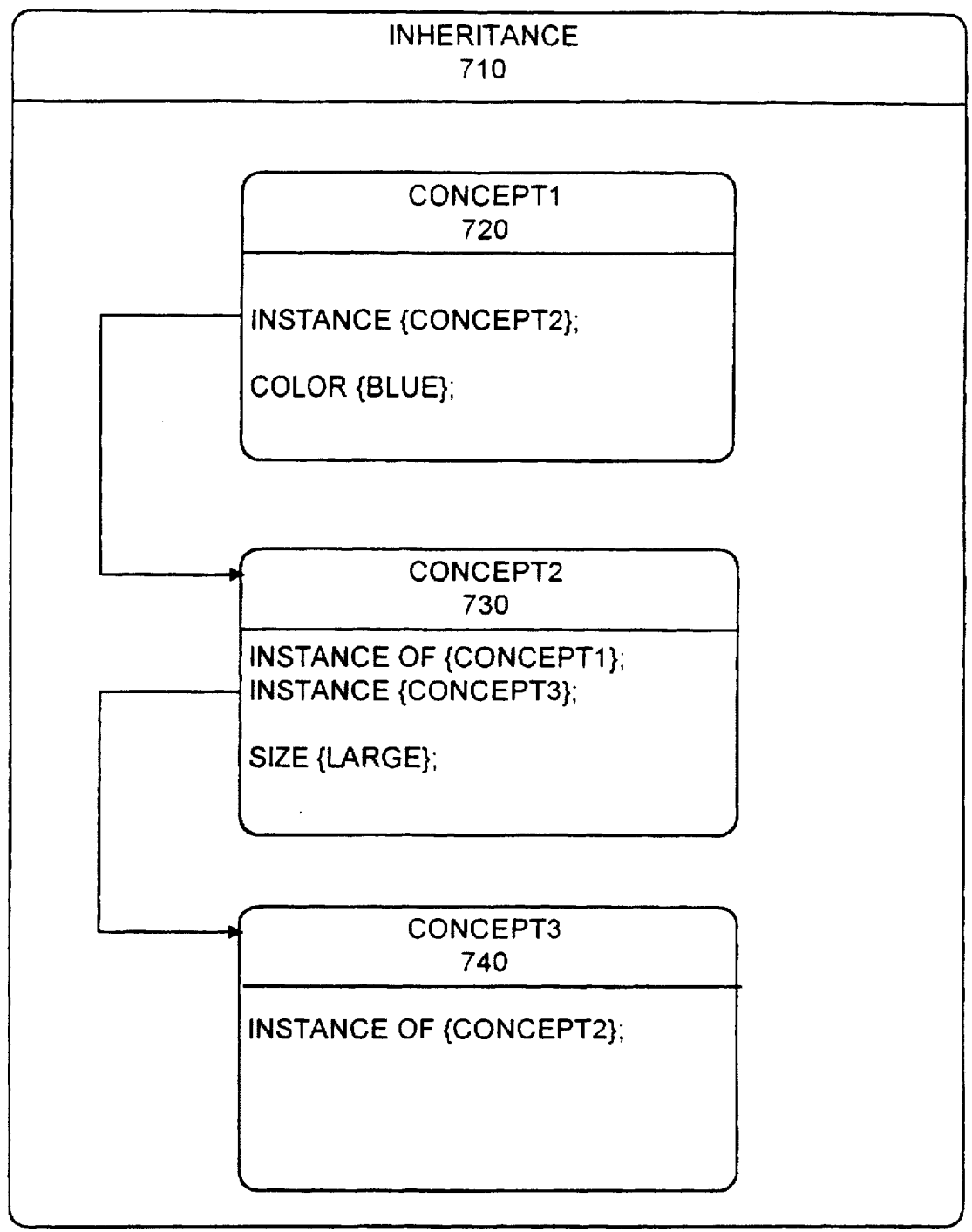
FIG. 7 is a diagram of one embodiment of inheritance in the present invention.
Figure 8:
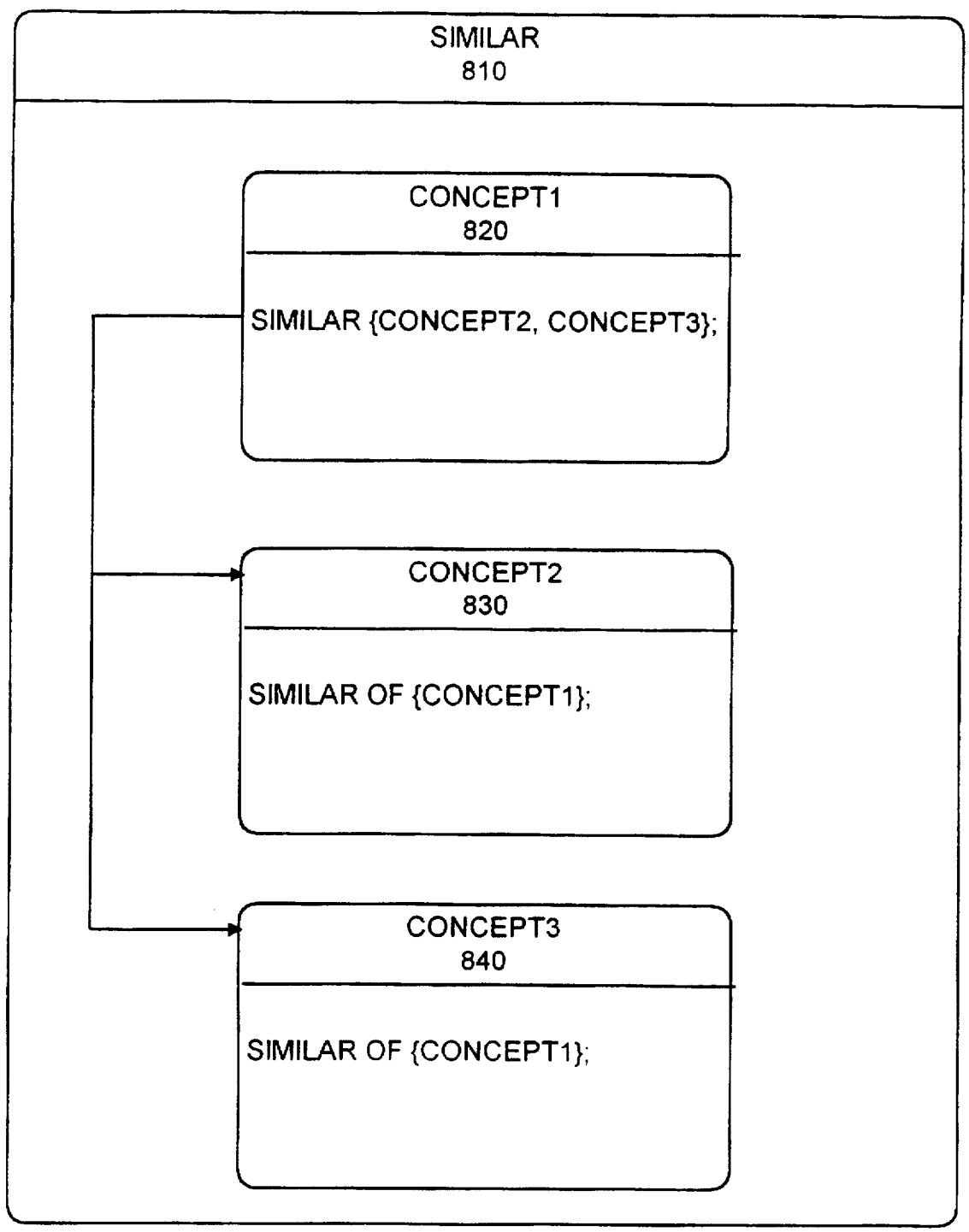
FIG. 8 is a diagram of one embodiment of a similar relationship in the present invention.

| Type of relationship | Explanation |
|---|---|
| Instance | Expresses a parent-child relationship between two entities. The system uses this relationship to implement inheritance 710. FIG. 7 is a block diagram illustrating one embodiment of inheritance 710. In FIG. 7 CONCEPT3 740 is the child of CONCEPT2 730, which is the child of CONCEPT1 720. When the system requests the value of an attribute 220 from CONCEPT3 740, the attribute 220 need not appear in CONCEPT3 740, but instead can be inherited 710 from one of its parents. In this example, the value of the SIZE attribute 220 can be inherited 710 from CONCEPT2 730 and the value of the COLOR attribute 220 can be inherited 710 from CONCEPT1 720. |
| Similar | Declares that two entities result in the same semantic action and can be considered different ways of saying the same thing. FIG. 8 is a block diagram illustrating one embodiment of a similar 810 relationship. In FIG. 8 CONCEPT1 820, CONCEPT2 830 and CONCEPT3 840 all result in the same semantic action. The attribute 220 SIMILAR is declared in CONCEPT1 820. By symmetry 610, CONCEPT2 830 and CONCEPT3 840 contain the SIMILAR OF attribute 220. In this embodiment, it is not relevant which concept 210 contains the SIMILAR attribute 220 and which contain the SIMILAR OF attribute 220. |
| Conceptual part | Expresses a relationship where the child is a subset of the conceptual aspect of the parent, e.g. an idea. |
| Time part | Expresses a relationship where the child exists during only part of the parent's existence. |
| Physical part | Expresses a relationship where the child is a subset of the physical aspect of the parent, e.g. an engine that is part of an automobile. |
| Generic | Any type of relationship that has meaning only in a particular application domain, e.g. COLOR and SIZE in FIG. 7. |

Set Representation

The physical representation in memory of a knowledge base 160 concept 210 is set-oriented:

a concept 210 is composed of a set 930 of attributes 220, specifically fact attributes 310 and/or statement attributes 330.

a an attribute 220, specifically a fact attribute 310, is composed of sets 930 of modifiers and values 320.

an attribute 220, specifically a statement attribute 330, is composed of sets 930 of logic language statements 340.

The above discussion illustrates that sets 930 can be nested. That is, a set 930 can contain other sets 930, which can contain other sets 930, and so on.

Subrecords

Figure 9:
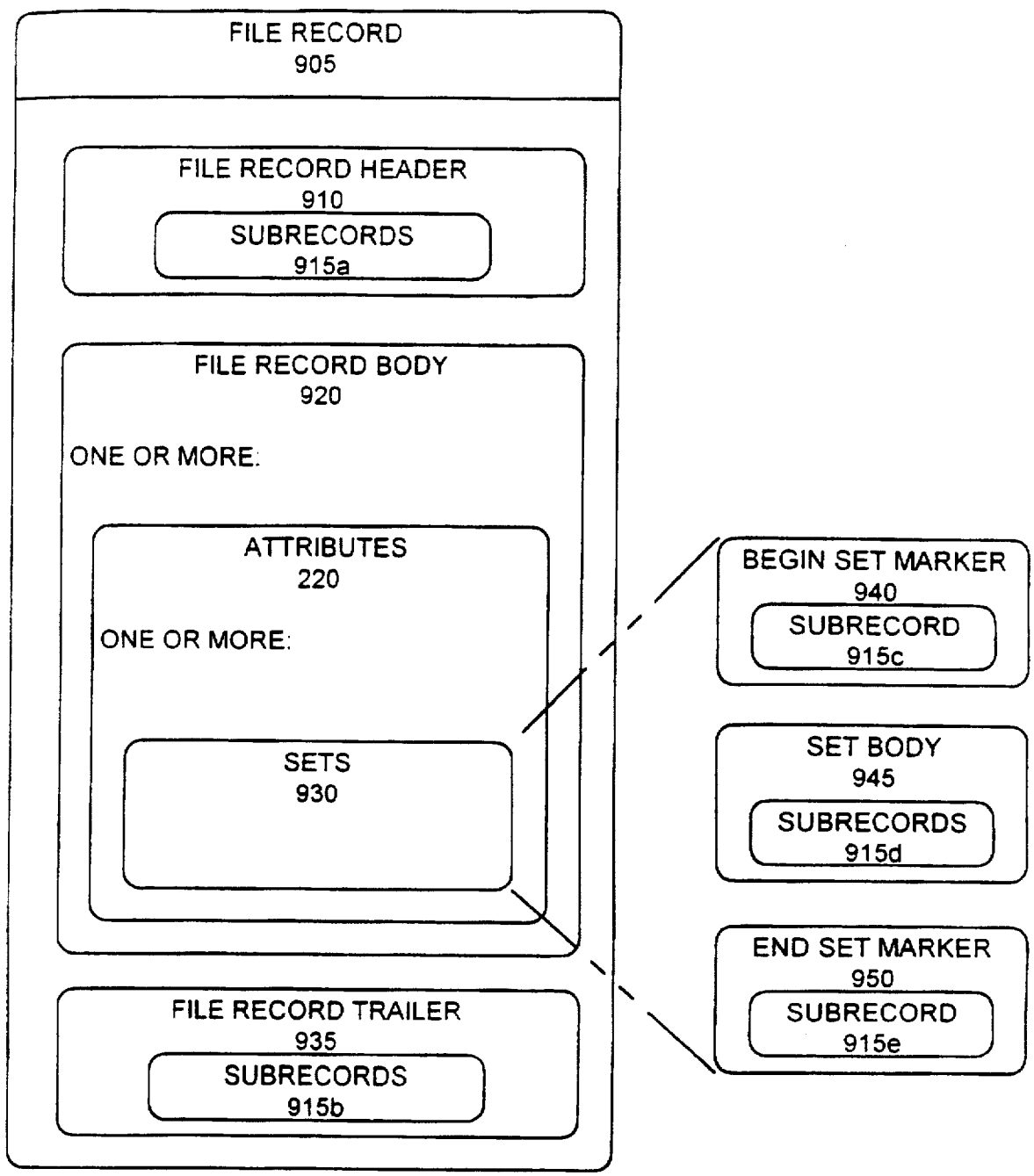
FIG. 9 is a diagram of one embodiment of a file record in the present invention.
Figure 10:
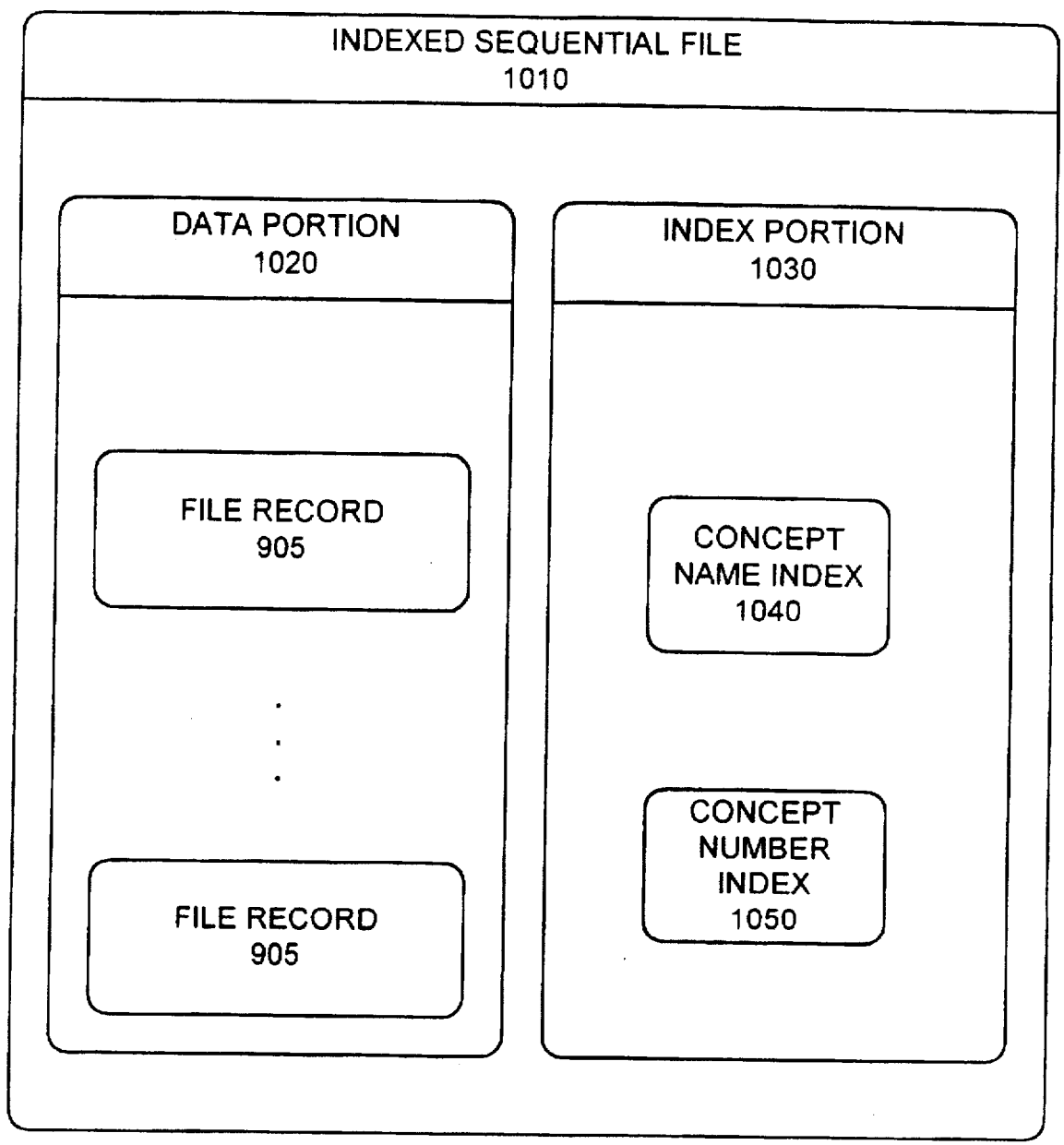
FIG. 10 is a diagram of one embodiment of an indexed sequential file in the present invention.

This set-oriented representation is implemented by use of a low-level data structure called SubRecords 915 ("SR"), further described in FIG. 9. Routines within the system read and interpret the set representation implemented by Sub-Records 915 to form the higher level representations of the knowledge base 160. Each SubRecord 915 includes a series of bytes and has only one type of data in it. Table 2 illustrates the SubRecord 915 format.

TABLE 2

SubRecord Format

| Name of byte | Explanation | Conditions defining presence/absence |
|---|---|---|
| SR Type | Base Type | Always present |
| Short length | Length of SR if less than 128 bytes | Present only if SR Type is variable length, as defined in a static table |
| Long length 1 | First byte of length if SR is 128 bytes or more long | Present only if the high-order bit of Short Length is 1 |
| Long length 2 | Second byte of length if SR is 128 bytes or more long | Present only if the high-order bit of Short Length is 1 |
| SR Type Extended | Further extension of SR Type | Present only if SR Type is marked in a static table as having Type Extended. |
| SR Type Extended2 | Further extension of SR Type Extended | Present only if SR Type is marked in a static table as having Type Extended2. |
| Data bytes ... | Data for the SR | Present only if SR Type is marked in a static table as having data. |

FIG. 9 is a block diagram illustrating one embodiment of the organization of SubRecords 915 on physical storage 240. A file record 905, which contains the data that defines a single concept 210, consists of a file record header 910, a file record body 920, and a file record trailer 935. A file record header 910 includes SubRecords 915a that identify the concept 210. A file record body 920 includes one or more attributes 220. A file record trailer 935, includes a Subrecord 915b that marks the end of the file record. An attribute 220 includes one or more sets 930, each of which is composed of a begin set marker 940, a set body 945, and an end set marker 950. A begin set marker 940 includes a SubRecord 915c that marks the beginning of the set. There is a unique begin set marker 940 for each type of set 930 implemented. A set body includes SubRecords 915d that define the content of the set 930. An end set marker 950 includes a SubRecord 915e that marks the end of the set 930. There is a unique end set marker 940 for each type of set 930 implemented. In one embodiment, the Subrecords 915 are stored and read sequentially within the file record 905; in an alternative embodiment, the SubRecords 915 are stored and read in a hierarchical form. An example of a hierarchical form is a tree-structured representation.

The preferred SubRecord 915 types and data are listed in the Table 3, below. Additional types may be added to implement new system capabilities.

TABLE 3

SubRecord Types and Data

| SubRecord name | SR Type | SR Type Extended | Data type |
|---|---|---|---|
| SRRecName | 1 | 1 | Text string |
| SRTextValue | 1 | 3 | Text string |
| SRComment | 1 | 4 | Text string |
| SRLocalName | 1 | 5 | Text string |
| SRRecNr | 23 | 1 | Concept number (unsigned 4-byte integer) |
| SRCnumList | 23 | 2 | List of concept numbers (unsigned 4-byte integers) |
| SRNextRecNr | 23 | 3 | Concept number |

TABLE 3-continued

SubRecord Types and Data

| SubRecord name | SR Type | SR Type Extended | Data type |
|---|---|---|---|
| SRPrimaryID | 4 | 1 | (unsigned 4-byte integer) Unsigned 1-byte integer |
| SRCount | 4 | 2 | Unsigned 1-byte integer |
| SRVersion | 4 | 3 | Unsigned 1-byte integer |
| SRSubExprOp | 4 | 4 | Unsigned 1-byte integer |
| SRDevMarker | 4 | 5 | Unsigned 1-byte integer |
| SRLocalID | 4 | 6 | Unsigned 1-byte integer |
| SRBSetAttrib | 5 | 11 | None |
| SRBSetInternal | 5 | 12 | None |
| SRBSetConstraint | 5 | 13 | None |
| SRBSetValueGroup | 5 | 15 | None |
| SRBSetValueWrapper | 5 | 16 | None |
| SRBSetTheValue | 5 | 17 | None |
| SRBSetActivation | 5 | 18 | None |
| SRBSetFunction | 5 | 19 | None |
| SRBSetLogic | 5 | 20 | None |
| SRBSetFuncHeader | 5 | 21 | None |
| SRBSetAssign | 5 | 22 | None |
| SRBSetConditional | 5 | 23 | None |
| SRBSetBasePart | 5 | 24 | None |
| SRBSetCasePart | 5 | 25 | None |
| SRBSetElsePart | 5 | 26 | None |
| SRBSetExecute | 5 | 27 | None |
| SRBSetExpression | 5 | 28 | None |
| SRBSetSubExpr | 5 | 29 | None |
| SRBSetLocals | 5 | 30 | None |
| SRBSetArgs | 5 | 31 | None |
| SRBSetReturn | 5 | 32 | None |
| SRBSetLookup | 5 | 33 | None |
| SRESetAttrib | 6 | 11 | None |
| SRESetInternal | 6 | 12 | None |
| SRESetConstraint | 6 | 13 | None |
| SRESetValueGroup | 6 | 15 | None |
| SRESetValueWrapper | 6 | 16 | None |
| SRESetTheValue | 6 | 17 | None |
| SRESetActivation | 6 | 18 | None |
| SRESetFunction | 6 | 19 | None |
| SRESetLogic | 6 | 20 | None |
| SRESetFuncHeader | 6 | 21 | None |
| SRESetAssign | 6 | 22 | None |
| SRESetConditional | 6 | 23 | None |
| SRESetBasePart | 6 | 24 | None |
| SRESetCasePart | 6 | 25 | None |
| SRESetElsePart | 6 | 26 | None |
| SRESetExecute | 6 | 27 | None |
| SRESetExpression | 6 | 28 | None |
| SRESetSubExpr | 6 | 29 | None |
| SRESetLocals | 6 | 30 | None |
| SRESetArgs | 6 | 31 | None |
| SRESetReturn | 6 | 32 | None |
| SRESetLookup | 6 | 33 | None |
| SRLike | 7 | 0 | Signed 1-byte integer |
| SRCnum | 24 | 0 | Concept number (unsigned 4-byte integer) |
| SRDummy | 9 | 0 | None |
| SRExecFuncNr | 10 | 1 | Unsigned 2-byte integer |
| SRRelationFlag | 10 | 2 | Unsigned 2-byte integer |
| SRSysCnumIndex | 10 | 3 | Unsigned 2-byte integer |
| SRModifier | 11 | Different for each type of modifier. | Different for each type of modifier |
| SRSuccess | 13 | 0 | Signed 1-byte integer |
| SRAttribNameCnum | 25 | 1 | Concept number (unsigned 4-byte integer) |
| SRTruth | 16 | 1 | Unsigned 2-byte integer |
| SRStdInt | 17 | 1 | Unsigned 4-byte integer |
| SRValueType | 20 | 1 | Unsigned 2-byte integer |
| SRMarker | 21 | 0 | None |
| SRCnumE | 22 | 0 | Extended CNUM |

Representing attributes 220 as sets 930 by the use of SubRecords 915

Attributes 220 are represented as sets 930. Sets 930 are implemented by Subrecords 915. The following sections illustrate one embodiment of representing attributes 220 as sets 930 by the use of SubRecords 915.

---

Set 930 Representation for Attributes 220

An Attribute 220 is represented as a set 930 as follows:
SRBSetAttrib
    SRRelationFlag
    SRAttribNameCnum
    One of the following, depending on the attribute type:
      {Fact 310 Attribute 220 set 930}
      {Statement 330 Attribute 220 set 930}
SRESetAttrib

---

Set 930 Representation for attributes 220, specifically Fact Attributes 310

A {Fact 320 Attribute 220 set 930} is represented as follows:
    {Modifier 460 set 930}   (Note: this is the attribute-level modifier set 410)
    (Note: the following entry appears once for each value-group 430.)
    {Value Group 430 set 930}
A {Modifier 460 set 930} is represented as follows:
SRBSetConstraint
    SRModifier (Note: number and type as appropriate for the modifiers 460 specified)
SRESetConstraint
A {Value Group 430 set 930} is represented as follows:
BSetValueGroup
    {Modifier 460 set 930}   (Note: this is the value group-level modifier set 420)
    (Note: the following entry appears once for each value 450 in the value group 430)
    {Value wrapper 470 set 930}
ESetValueGroup
Note that value groups 430 can be nested within value groups 430.
A {Value wrapper 470 set 930} is represented as follows:
BSetValueWrapper
    (Note: the following entry appears once for each value-level modifier set 440).)
    {Modifier 460 set 930}
    {Value 450 set 930}
ESetValueWrapper
A {Value 450 set 930} is represented as follows:
BSetTheValue.
    SRValueType
    One of the following, depending on the value type:
      • SRStdInt
      • SRTruth
      • SRTextValue

Set 930 Representation for attributes 220, specifically Fact Attributes 310

- SRCnum
- {TreeWalk set 930}

ESetTheValue  
A {TreeWalk set 930 } is represented as follows:  
SRBSetTheValue  
    SRValueType  
    SRVersion  
    SRCount  
    (Note: the following entry appears once for each branch in the TreeWalk.)  
    {Branch definition}  
SRESetTheValue  
A {Branch definition} is represented as follows:  
{Modifier 460 set 930}  
{Source Expression set 930}  
SRMarker  
(Note: the following two entries appear once for each branch alternative.)  
{Modifier 460 set 930}  
One of the following, depending on the type of branch alternative:
- SRCnumE
- {Local Reference set 930}
- {Source Expression set 930}

SRMarker  
A {Local Reference set 930} is represented as follows:  
SRBSetLookup  
    SRVersion  
    SRCnumList  
    One of the following, depending on the local reference type:
- SRLocalID
- SRSysCnumIndex SRESetLookup

Set Representation for Statement 330 Attributes 220

A {Statement 330 Attribute 220 set 930} is represented as follows:  
SRBSetFunction  
    SRVersion  
    {Function Header set 930}  
    {LogicStatements set 930}  
SRESetFunction  
A {Function Header set 930} is represented as follows:  
SRBSetFuncHeader  
    SRVersion  
    SRBSetLocals  
        SRVersion  
        SRCount  
        (Note: the following three entries appear once for each function parameter.)  
        SRLocalName  
        SRLocalID  
        {Source Expression set 930}  
    SRBSetLocals  
SRESetFuncHeader  
A {LogicStatements set 930} is represented as follows:  
SRBSetLogic  
    (Note: one of the following sets appears for each logic statement in this set.)
- an {Assignment Statement 510 set 930}
- an {If Statement 520 set 930}
- an {Execution Statement 530 set 930}
- a {Switch Statement 540 set 930}
- a {Local Statement 550 set 930}
- a {Return Statement 560 set 930}

SRESetLogic  
An {Assignment Statement 510 set 930} is represented as follows:  
SRBSetAssign  
    SRVersion  
    {Modifier 460 set 930}  
    SRMarker  
    {Modifier 460 set 930}  
    {Target Expression set 930}  
    {Modifier 460 set 930}  
    {Source Expression set 930}  
SRESetAssign  
An {If Statement 520 set 930} is represented as follows:

Set Representation for Statement 330 Attributes 220

SRBSetConditional  
    SRVersion  
    SRPrimaryID  
    SRBSetBasePart  
        {Modifier 460 set 930}  
        {Source Expression set 930}  
    SRESetBasePart  
    SRBSetCasePart  
        {LogicStatements set 930}  
    SRESetCasePart  
    SRBSetElsePart  
        {LogicStatements set 930}  
    SRESetElsePart  
SRESetConditional  
An {Execution Statement 530 set 930} is represented as follows:  
SRBSetExecute  
    SRVersion  
    SRPrimaryID  
    One of the following, depending on the function type:
- {Target Expression set 930}
- SRCnum {Modifier 460 set 930}  
    SRBSetArgs  
        SRVersion  
        SRCount  
        (Note: the following two entries appear once for each function argument.)  
        {Source Expression set 930}  
        SRLocalName  
    SRESetArgs  
SRESetExecute  
A {Switch Statement 540 set 930} is represented as follows:  
SRBSetConditional  
    SRVersion  
    SRPrimaryID  
    SRBSetBasePart  
        {Modifier 460 set 930}  
        {Source Expression set 930}  
    SRESetBasePart  
    SRBSetCasePart  
        {Modifier 460 set 930}  
        {Source Expression set 930}  
        {LogicStatements set 930}  
    SRESetCasePart  
    SRBSetElsePart  
        {LogicStatements set 930 }  
    SRESetElsePart  
SRESetConditional  
A {Local Statement 550 set 930} is represented as follows:  
SRBSetLocals  
    SRVersion  
    SRCount  
    (Note: the following three entries appear once for each local variable.)  
    SRLocalName  
    SRLocalID  
    {Source Expression set 930}  
SRESetLocals  
A {Return Statement 560 set 930} is represented as follows:  
SRBSetReturn  
    SRVersion  
    {Source Expression set 930}  
SRESetReturn  
A {Target Expression set 930} is represented as follows:  
{Expression set 930}  
A {Source Expression set 930} is represented as follows:  
{Expression set 930}  
An {Expression set 930} is represented as follows:  
SRBSetExpression  
    SRVersion  
    {Subexpression set 930}  
SRESetExpression  
A {Subexpression set 930} is represented as follows:  
One of the following, depending on the subexpression type:
- {binary operation set 930}
- {unary operation set 930}
- {Base term operand}

A {binary operation set 930} is represented as follows:

| Set Representation for Statement 330 Attributes 220 |
| --- |
| SRBSetSubExpr<br>  SRSubExprOp<br>  {Modifier 460 set 930}<br>  {Subexpression set 930}<br>  {Subexpression set 930}<br>SRESetSubExpr<br>A {unary operation set 930} is represented as follows:<br>SRBSetSubExpr<br>  SRSubExprOp<br>  {Modifier 460 set 930}<br>  {Subexpression set 930}<br>SRESetSubExpr |

A {Base term operand} is represented as follows
One of the following, depending on the Base term operand type:

| | |
| --- | --- |
| • {Value wrapper 470 set 930} | (note: not allowed in a {Target Expression set 930}) |
| • {Value 450 set 930} | (note: not allowed in a {Target Expression set 930}) |
| • {Local Reference set 930} | |
| • {TreeWalk set 930} | |
| • {Execution Statement set 930} | (note: not allowed in a {Target Expression set 930}) |

Physical Storage

The knowledge base 160 in one embodiment is stored on physical storage 240 as an indexed sequential file 1010, which is a file that can be read either sequentially or randomly, the random access being based on the value of a field within the file record 905. The indexed sequential file 1010 includes two parts: a data portion 1020 and an index portion 1030. The data portion 1020 contains the file records 905 for the concepts 210 making up the knowledge base 160. The index portion 1030 contains the information necessary to locate file records 905 in the data portion 1020 based on the value of a field within the file record 905. The system builds two indexes for the indexed sequential file 1010: a concept name index 1040, which allows each concept 210 to be randomly retrieved by its name, and a concept 210 number index 1050, which allows each concept 210 to be randomly retrieved by the concept 210 number that was assigned by the system when the concept 210 was created.

Introduction to Decision 150

Decision 150 is a facility in the system which is called whenever the best current value of a specific attribute 220 is required. It always operates on the attribute 220 in the concept 210 which is passed to it by its caller (called the current attribute). Decision 150 accepts a number of input parameters 1110 which flexibly define the manner in which values 450 are to be selected and returned. In addition to those parameters, the participation of this attribute 220 in a process by the reasoning module 170 and multiple opinions from multiple sources (expressed by modifiers 460) affect which value or values 450 are actually selected. Decision 150 also marks that current attribute 220 as having had its value 450 requested, so that if later new values or modifiers are written by another process the reasoning engine 170 can re-execute 2150 any statement which is dependent on this attribute's value. This allows the system to implicitly maintain currency of information.

Detailed description of Decision 150

Decision 150 uses the Success modifier (one of the standard modifiers 460 but not shown separately) to assist the selection of values 450. The Success modifier contains:

Information that describes the certainty with which someone or some process believes that a given value 450 is the correct value for the specified attribute 220 (e.g. they "asserted" or wrote the value). This is subsequently referred to as the Success value ("SVAL"). The total range of values for an SVAL in an embodiment is between twenty and two hundred.

The type of entity that asserted the value 450 (the "source type").

Possibly the state of a reality 2310 (FIG. 23) which affects or is affected by that given value. Realities are data structures in the reasoning module 170 which model the historical state of execution flow.

Figure 11:
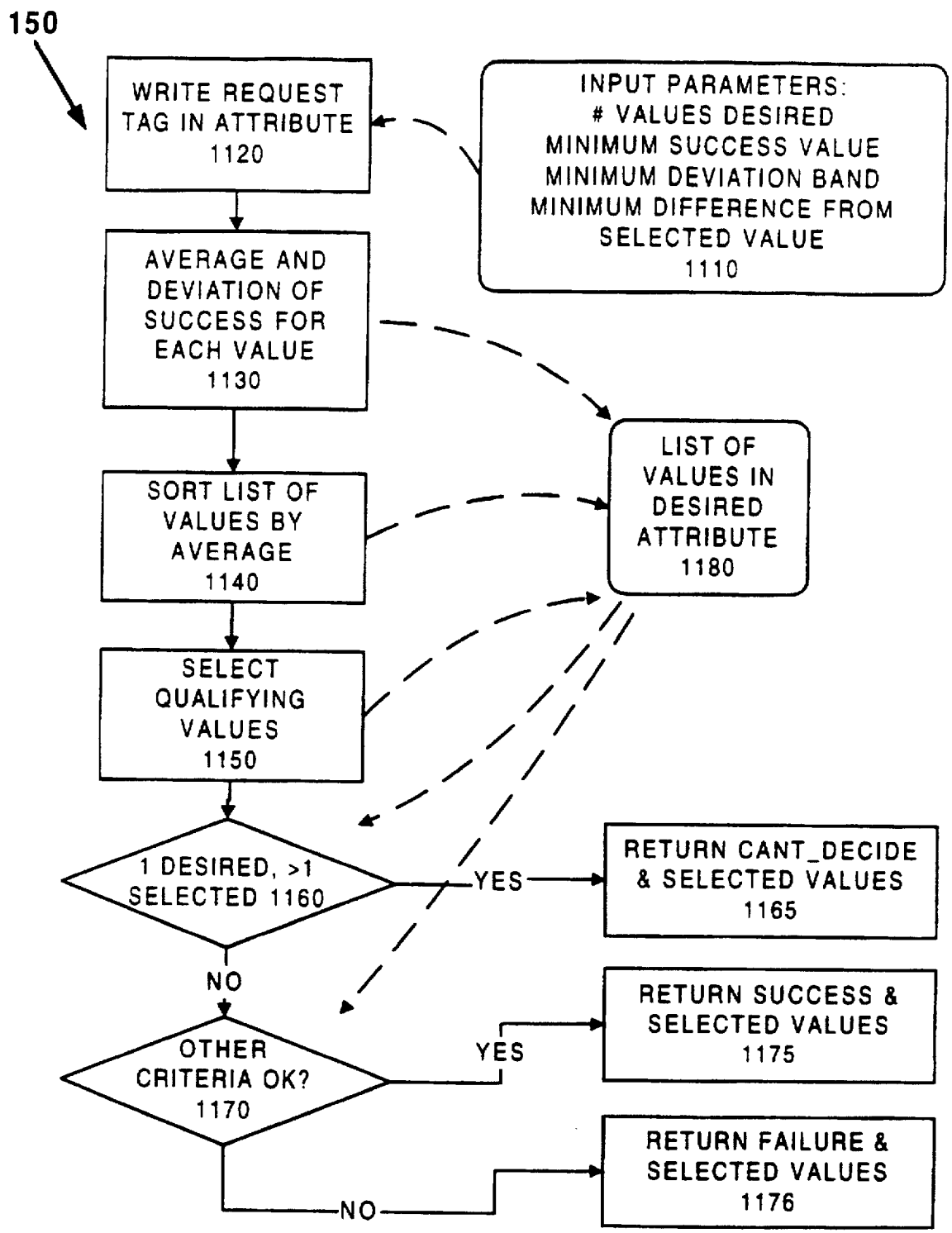
FIG. 11 is a flow diagram of one embodiment of the decision module in the present invention.

Referring to FIG. 11, the input parameters 1110 define the characteristics of the values 450 which are desired by the caller to decision 150. These parameters include such items in a preferred implementation as how many values 450 are desired, what minimum average SVAL is acceptable, the lowest acceptable value of the deviation band of all SVALs for a given value (similar to two standard deviations), and the minimum difference of the SVALs between selected value(s) and non-selected value(s).

The first action, if decision 150 is called by a current process in the reasoning engine 170, is to write 1120 a request tag 2260 in the current attribute 220. This action signals other processes in the system that values 450 have been selected from the current attribute 220 by decision 150, so that if later new values 450 or modifiers 460 are added to the current attribute, the reasoning engine 170 can re-execute 2150 any statement which is dependent on the current attribute's value.

Figure 12:
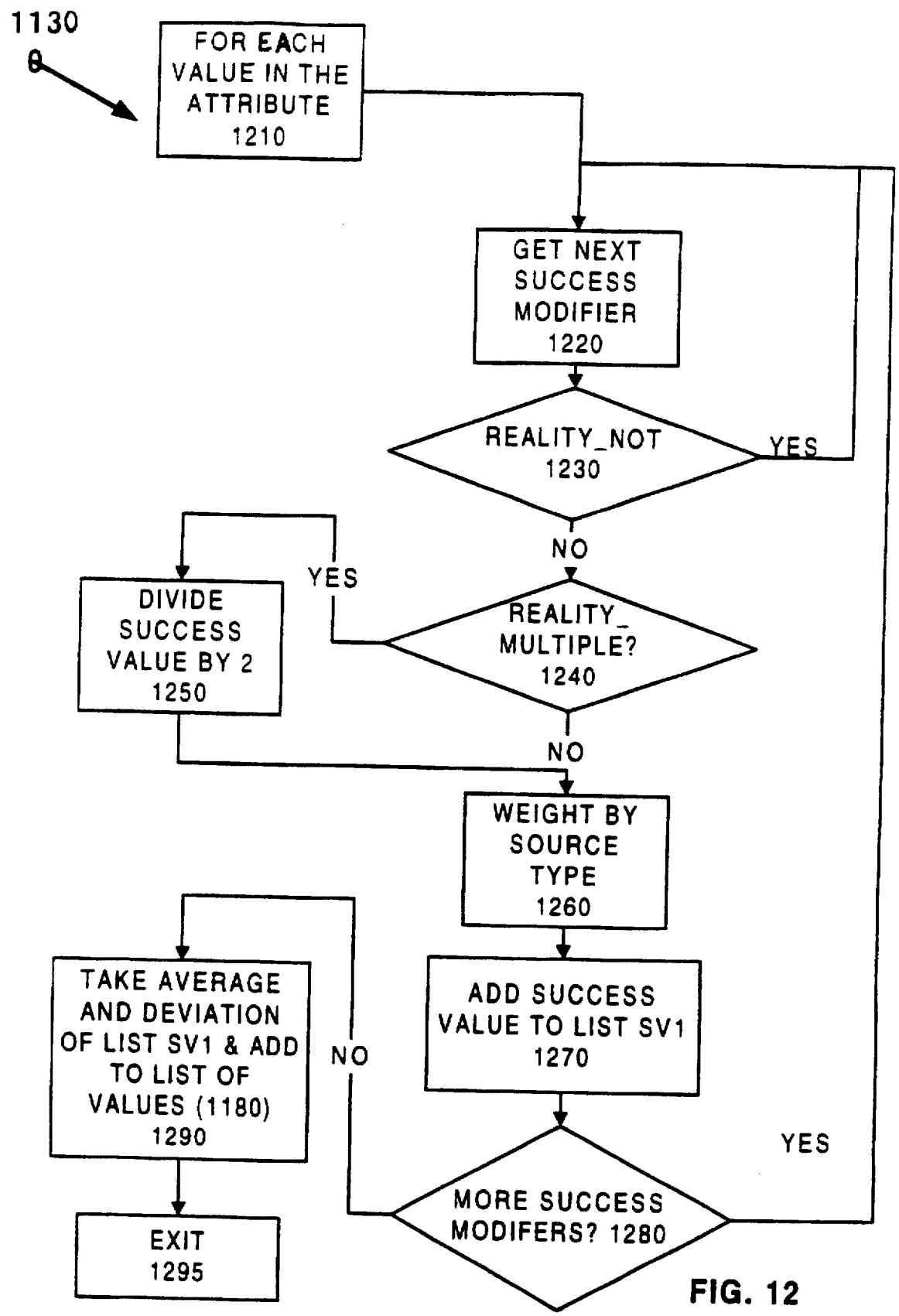
FIG. 12 is a flow diagram of one embodiment of calculating the average and deviation of the Success values in a value in the present invention.

Next, the average and deviation 1130 of the SVALs for each value 450 are taken and placed in the list of values 1180. Referring to FIG. 12, the average and deviation process is accomplished 1210 for each value 450 separately in the current attribute 220. After getting 1220 the next Success modifier for the currently-considered value, that modifier 460 is examined. If the Success modifier is involved in a reality 2310 with a state of REALITY__NOT 1230 due to previous processing by the reasoning engine 170, it is ignored. If the Success modifier is involved in a reality 2310 with a state of REALITY__MULTIPLE 1240, it divides 1250 the SVAL by 2. The SVAL is then weighted by a possible factor related to the source type 1260. Finally, the resulting SVAL is added to the list SV1 1270. The list SV1 is a temporary list for the SVALs of the value 450 under current consideration. Once there are no more Success modifiers 1280, the list SV1 is analyzed by conventional mathematical methods so that the average and deviation of all the SVALs in SV1 is taken 1290 and then appended 1290 to the list of values 1180.

Figure 13:
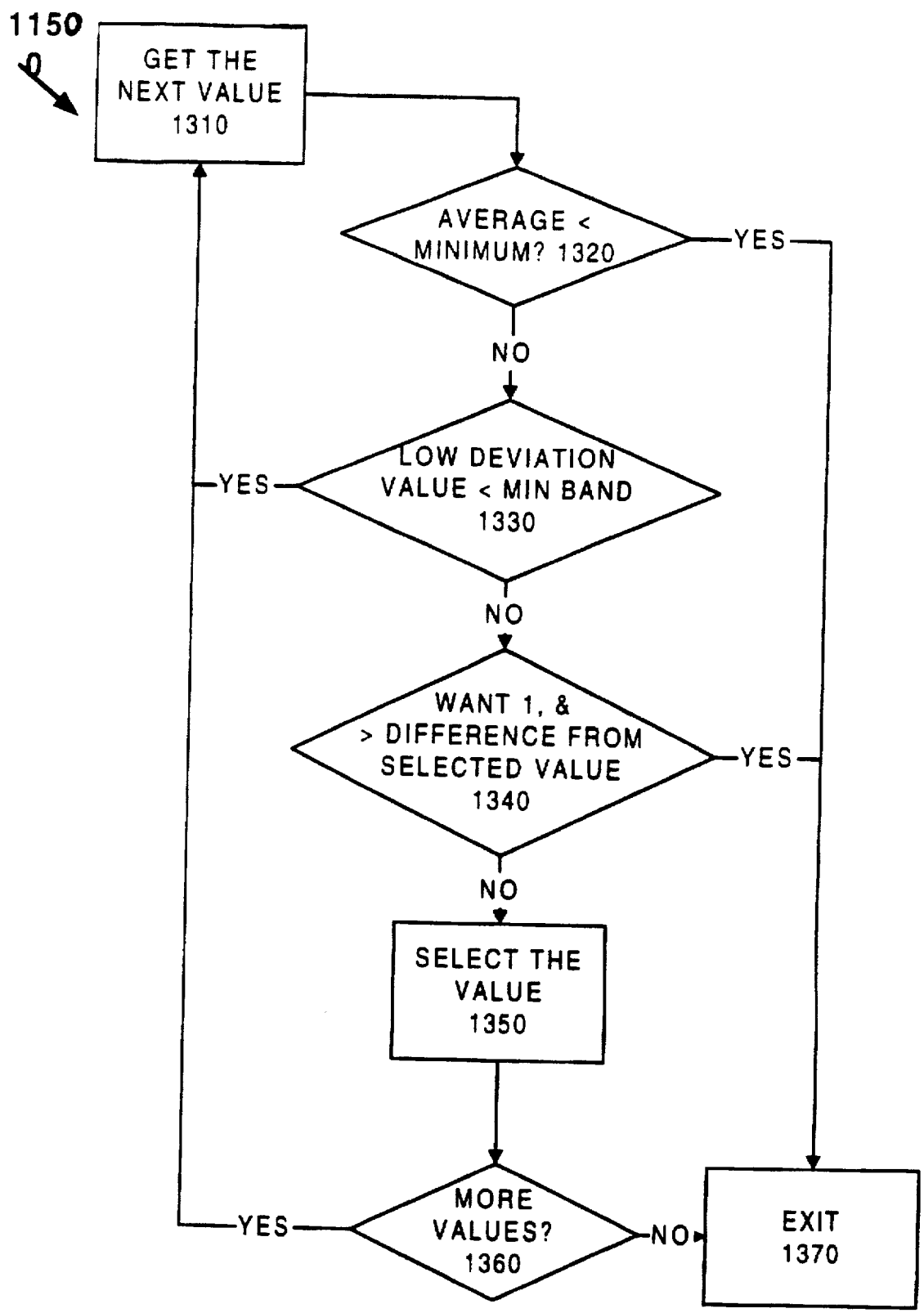
FIG. 13 is a flow diagram of one embodiment of selecting qualifying values in the present invention.

Referring once again to FIG. 11, the list of values 1180 is sorted 1140 by the average for each value 450 just calculated 1130. The qualifying values 450 are selected 1150 from the list of values 1180. FIG. 13 provides a flow diagram describing how each value 450 in the list 1180 is analyzed individually 1310. If the average SVAL is less than the minimum SVAL from input parameters 1110, that value is rejected 1320 and the qualifying process exits 1370, since the list 1180 was sorted by SVAL. If the average minus the deviation of the SVAL is less than the minimum deviation band 1330 from input parameters 1110, that value is rejected and processing continues with the next value. If the number of values 450 desired from input parameters 1110 is one, and the difference between this value's SVAL and the previously-analyzed value's SVAL is greater than the "minimum difference from selected value" 1340 from input parameters 1110, then the qualifying process rejects the current value and exits 1370. The current value 450 is then marked as selected 1350 and processing continues to the next value 1310 if there are more values 1360 in the list of values 1 80.

Returning to FIG. 11, decision 150 determines what to return to the caller. If only one value 450 is requested in input parameters 1110, and multiple values are now selected 1160 in the list of values 1180, then the return value by the decision 150 is CANT_DECIDE 1165 and it passes back all selected values to the calling process.

If all input parameters 1110 are satisfied 1170, then decision 150 returns SUCCESS 1175 and passes back all selected values 450 to the calling process. Otherwise, decision 150 returns FAILURE 1176 and passes back all selected values 450 to the calling process.

In those cases where all of the selected values 450 in list 1180 are returned, that is done because decision 150 could not meet all of the requirements of input parameters 1110, so that it would be misleading to the caller to do anything else. The system assumes that during later processing the reasoning engine 170 will gain more information and thus enable decision 150 to later make a precise decision during re-execution 2150, resulting in a return value of SUCCESS.

Spreading Activation 120

One of the most persistent stumbling blocks to natural language understanding has been the deterioration of performance (response time) as the cognitive capabilities of the system approaches a useful level. Conventional systems usually bog down in their own information.

The spreading activation process 120 of the present invention delineates an area of a knowledge base (KB) 160 which contains information semantically relevant to a set of words 110 that is input by a system user. The relevancy of the delineation to the user's input 110 is a direct result of the KB's 160 structure being a direct representation of the system's real world view. The delineation provides the natural language processing 140 with a starting point and significantly improves its performance by enabling the natural language processing 140 to focus its search on a specific segment of the KB 160. The spreading activation process 120 prunes otherwise tangentially related concepts 210 from the representation of a user input 1 10, to produce the most relevant concepts 210.

In one embodiment of the present invention, the KB 160 can be construed as a large loosely connected graph 2040 with named links. An illustration of a graph 2040 is provided in FIG. 20 along with illustrations of paths 2010, kinks 2020 and loops 2030 which will be further explained below. The nodes of the graph 2040 are concepts 210 and the links are attributes 220 as described in FIG. 2. Other embodiments can be implemented using for example lists, stacks or trees.

The spreading activation process 120 is a hidden Markov model graph traversal technique with a set of constraint rules 1470 being applied in succession in a continuous effort to generate a manageable result.

The final result of the spreading activation process 120 is a list of chains 130. A chain 130 is a list of concepts 210 starting and ending with a lexical item (one of the user's words 1480). If two concepts 210 are adjacent in a chain 130 then there exists a direct link between them in the KB 160 and by extension the concepts 210 have some sort of relationship in the world modeled by the KB 160. A chain 130 is thus a representation of a successful traversal of the KB 160. A chain 130 is also a representation of a real world relationship between two words because of the inherent structure of the KB 160 and how the internal representation of information in the KB 160 is by design an image of the real world. The chain 130 has the previous ubiquitous property because the system uses the same data representation format for lexical items (user words 1480) and application or real-world domain concepts which is typically not the case in conventional systems.

The notion of path 2010 is also introduced, where a path 2010 is a list of connected concepts 210 starting with a lexical item 1480. A chain 130 is constituted of two paths 2010. Because of the inherit design of the KB 160, a path 2010 represents one of the relationships between one of the user's input words 1480 and a concept 210.

The natural language processing engine 140 takes over after the spreading activation process 120 and uses the list of chains 130 as a starting point to determine the concepts 210 that are the most likely to be legitimate interpretations of the user's input 110.

Overview

Figure 14:
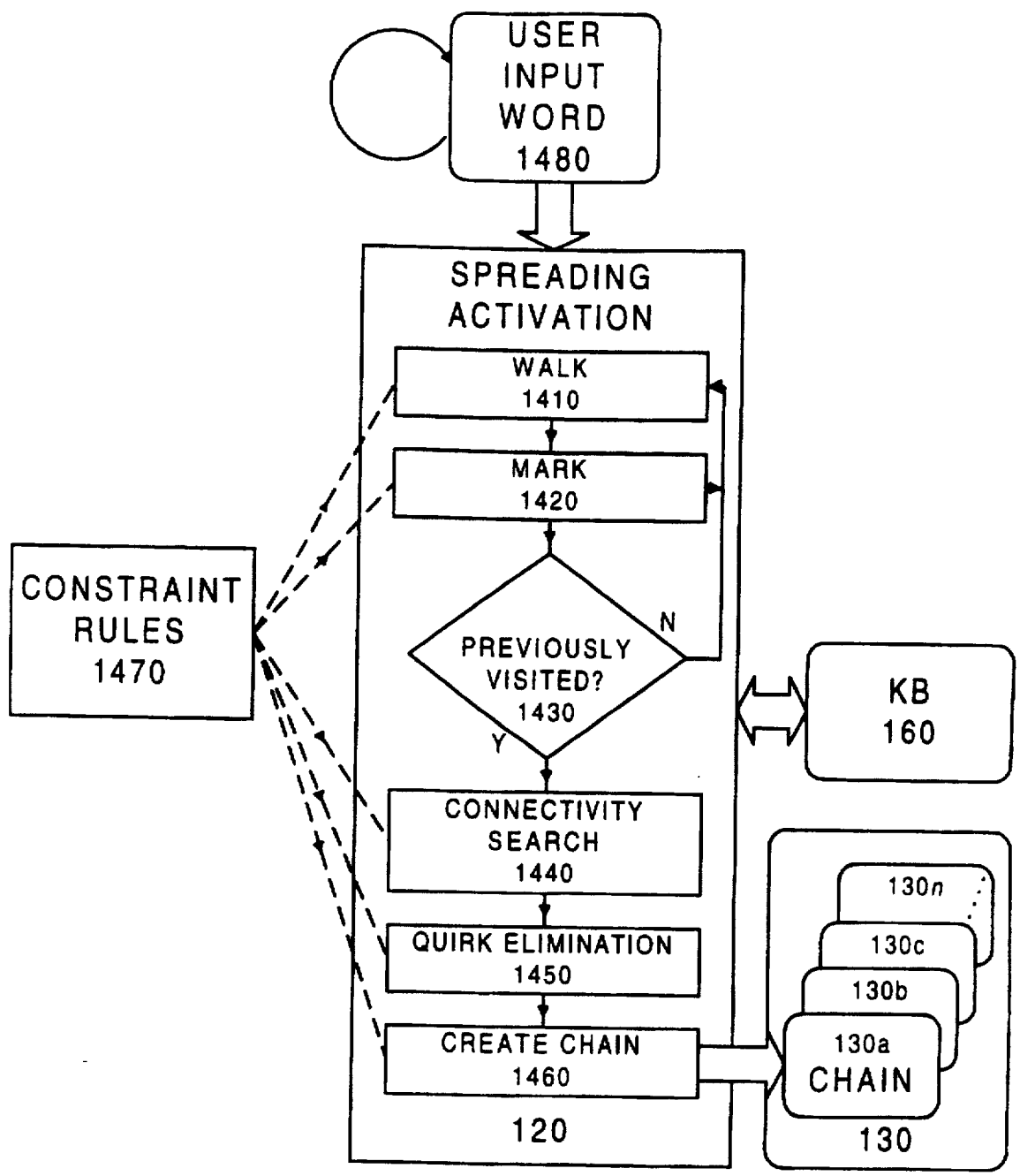
FIG. 14 is a block diagram of one embodiment of a spreading activation process in the present invention.

Referring now to FIG. 14, a block diagram of the spreading activation process 120 is shown. Starting from the concept 210 corresponding to one of the user's input words 1480, the spreading activation process 120 walks 1410 attributes 220 to neighboring concepts 210. The spreading activation process 120 marks 1420 the concept 210$b$ it is visiting with the attribute 220 followed to arrive in this visited concept 210$b$ and with the previous concept 210$a$ it originated from. The spreading activation process 120 then examines the set of marks 1650 to determine if the spreading activation process 120 has previously visited 1430 the concept 210$b$ it is currently in. If not, spreading activation 120 keeps walking to neighboring concepts 210$b$ to 210$n$. If the concept 210$b$ is already marked 1420, potential chains 130 exist. The spreading activation process 120 uses a connectivity search 1440 to generate all the paths 2010 that come to this concept 210, pairs the paths 2010 up into a tentative chain 130 and performs some analysis on the chain 130 to eliminate 1450 quirks or possible pathological cases. If the process is successful, the process creates 1460 a chain 130$a$ and adds this new chain 130$a$ to the list of valid chains 130. In every step of the spreading activation process 120, constraints 1470 are applied to circumscribe the scope of the traversal. These constraints rules 1470 are a set of heuristics, based on the behavior of the spreading activation process 120. The heuristics 1470 are what renders the problem of finding appropriate context to a user's input 110 tractable. If the spreading activation process 120 fails to create a single chain, an implementation of the system can launch a looser instance of the spreading activation process 120 which uses relaxed constraint rules 1470. If all instances of the spreading activation process 120 fail to gather chains 130, the user's input 110 is considered meaningless. Table 3 provides some constraint rules 1470 illustrated in FIG. 14, along with associated examples.

TABLE 3

Constraint Rules and Examples

| Constraint Rules 1470 | Examples |
| --- | --- |
| Pruning uninteresting attributes | Instance attribute, Similar attribute |
| Limiting walking distance | Average is between 4 and 12 concepts |
| Eliminating semantically void concepts | Word position and invalid concepts |
| Pruning paths containing imbedded lexical items | i.e. user words |
| Avoiding backtracking over the | A path with duplicate segments |

TABLE 3-continued

Constraint Rules and Examples

Figure 20:
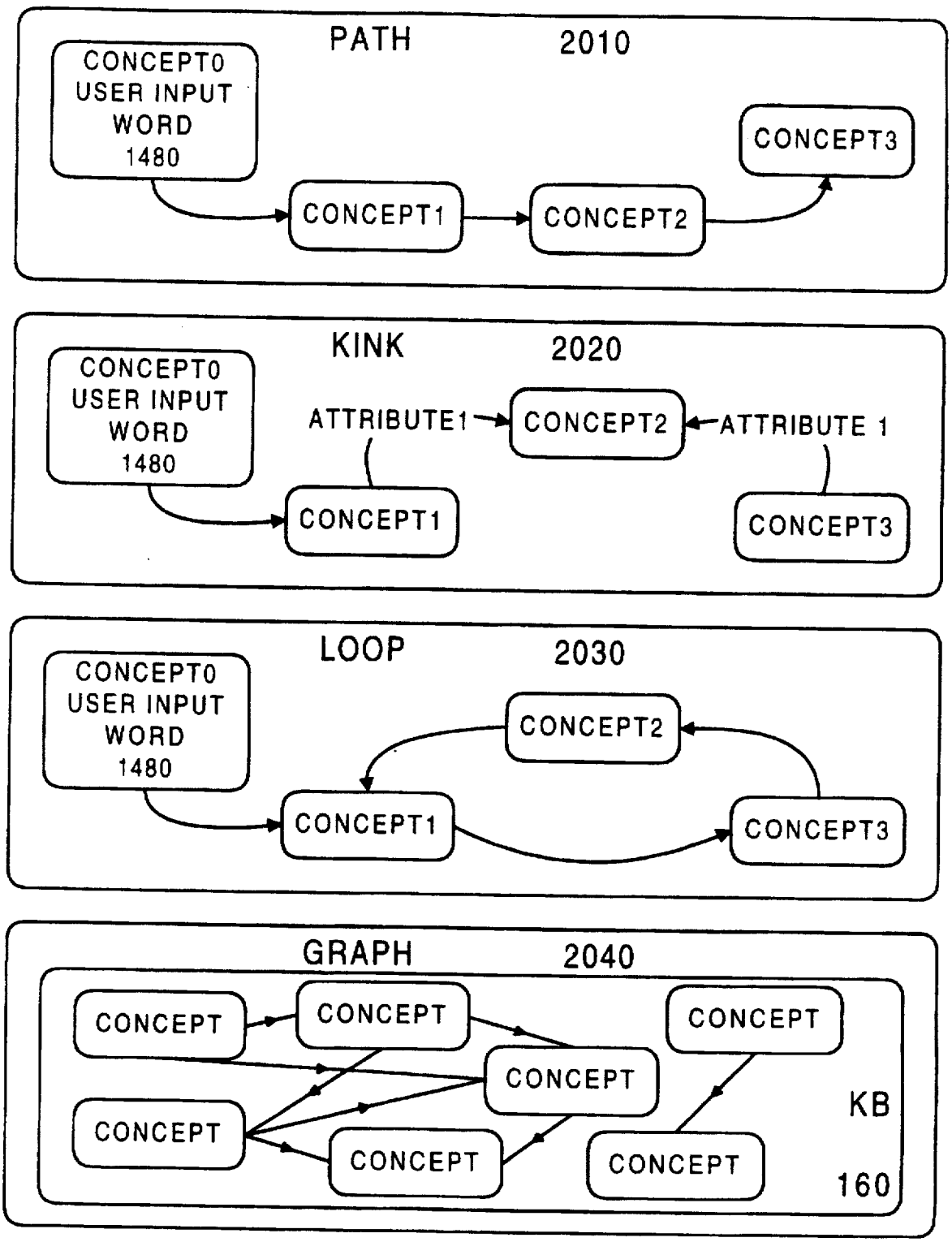
FIG. 20 is an illustration of one embodiment of a graph, a path, a kink and a loops in the present invention.

| Constraint Rules 1470 | Examples |
|---|---|
| incoming path | |
| Pruning duplicate paths | Identical paths |
| Eliminating kinks in paths | See FIG. 20, Kink 2020 |
| Eliminating loops in paths | See FIG. 20, Loop 2020 |
| Eliminating ontological idiosyncrasies | Noun that is both subject and object of a sentence |
| Eliminating long chains | Over 6 to 20 concepts long |
| Eliminating duplicate chains | Identical chains in list 130 |
| Eliminating chains with reversed elements | C1→C2→C3→C4 and C1→C3→C2→C4 |
| Eliminating kinks in chains | See FIG. 20, Kink 2020 |

FIG. 15 through FIG. 19 further detail the steps shown in FIG. 14.

Walk 1410

Figure 15:
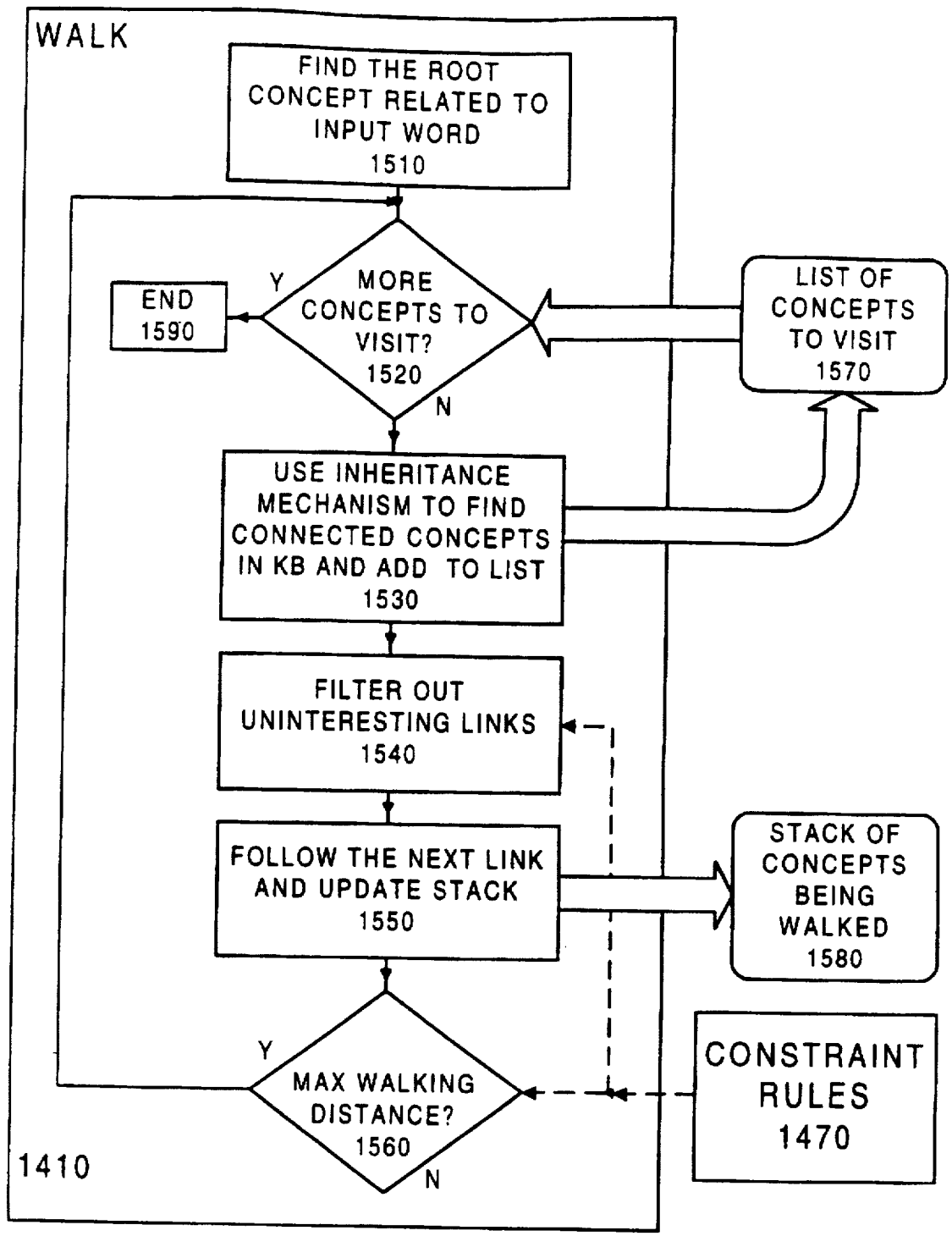
FIG. 15 is a flow diagram of one embodiment of a walk mechanism in the present invention.

Referring to FIG. 15, the walk mechanism 1410 is illustrated which is responsible for finding and choosing which attributes 220a-n are desirable to be followed. Initially, the walk mechanism 1410 finds 1510 the root concept 210a related to the user's input word 1480 and initializes the list of concepts 210 that need to be visited 1570 with the concept 210a. Walk 1410 does not need to finish processing one word 1480, to work on another of the user's input words 1480.

The system 100 determines 1520 from the list 1570, if there are more concepts 210 to visit. If the list of concepts to visit 1570 is exhausted, walk 1410 ends 1490 and returns control to the natural language processing engine 140. As long as the list of concepts 210 that need to be visited is not empty, the walk mechanism 1410 picks a concept 210 out of the concepts to visit list 1570. Using the same mechanism that the system 100 uses to traverse the inheritance 710 hierarchy, the system 100 uses the inheritance mechanism to find connected concepts in KB 160 and adds 1530 the concepts to the list of concepts to visit 1570.

The system 100 then applies the first set of constraint rules 1470. Of the attributes 220 that lead from the current concept 210a to any neighboring concept 210b, some are considered uninteresting. An uninteresting attribute 220 is defined as an attribute linking two concepts 210a and 210b but that does not provide any semantic information as to the relation between concept 210a and concept 210b. An example of an uninteresting attribute 220 is the attribute 220 similar relationship 810 described in FIG. 8. A similar relationship 810 is uninteresting because all the interesting potential is already contained in either one of the concepts, the current concept 210a or the neighbor concept 210b. Hence the constraint rule 1470 filters 1540 uninteresting attributes from the walk mechanism 1410. The walk mechanism 1410 follows 1550 the first interesting attribute 220 to the next concept 210b and adds the previous concept 210a to the stack 1580 that represents the path 2010 walked up to this point.

Another constraint rule 1470 is then applied to the stack 1580. In one embodiment, because the knowledge base (KB) 160 representation is hierarchical, a path 2010 encompassing several concepts 210 is considered less relevant than a path 2010 containing fewer concepts 210 because the relationship between the two chain 130 extremities is more remote. For example, if two concepts 210 are spread apart hierarchically, the concept in higher hierarchical order is considered over-generalized and these concepts will be considered less relevant. If two concepts 210 are spread apart breath-wise, they have little probability of correlating, so that these two concepts will be considered less relevant. The constraint rule 1470 prevents the walk mechanism 1410 from walking any further, if the system determines 1560 that the maximum walking distance has been reached. In one embodiment, the system 100 determines 1560 that a good walking distance is usually between four and twelve concepts 210 long.

When the walk mechanism 1410 runs out of attributes 220 to follow, it pops a concept 210 from the stack 1580 and follows the next attribute 220 from this concept 210. If the stack is empty, the walk mechanism 1410 grabs a new concept 210 from the list of concepts to visit 1570.

Therefore, using the process described, the walk mechanism 1410 has efficiently visited concepts 210 that are associated with the user's input word 1480 while eliminating concepts that would be wasteful to process because certain concepts would be less relevant to other concepts. Since the walk mechanism 1410 has no assumption on the word order of the user input 110 and because the set of marks 1650 representing the travel behavior of walk 1410 is held directly in the concepts 210, an implementation of the spreading activation process 120 on a multiprocessor or highly parallel computer is straightforwardly done by assigning one spreading activation process 120 to each of the user's input word 1480 and results in significant performance improvements, as opposed to current natural language systems which are generally not parallelizable.

Mark 1420

Figure 16:
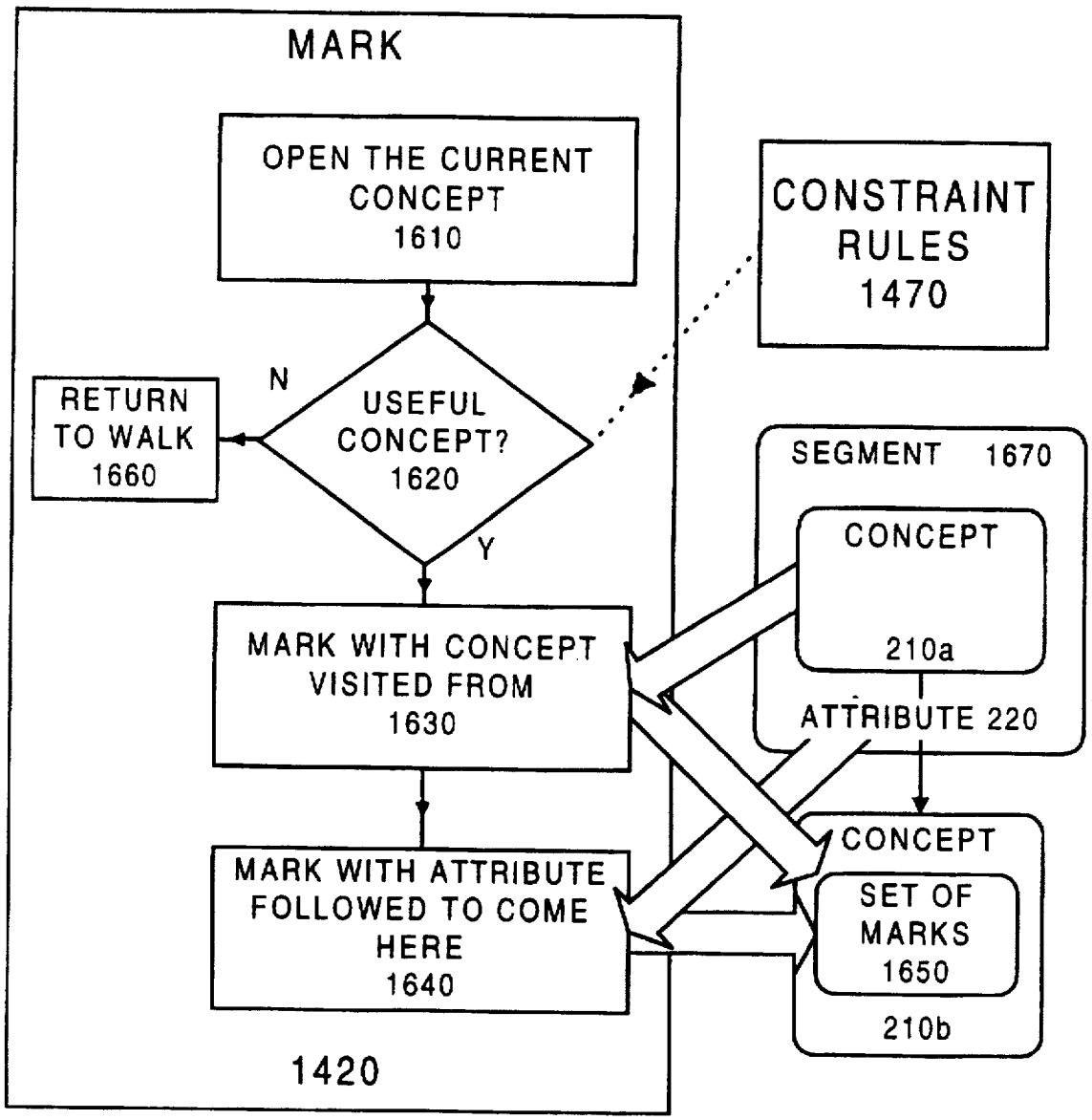
FIG. 16 is a flow diagram of one embodiment of a process for marking a concept as visited in the present invention.

Referring now to FIG. 16, the process of marking 1420 a concept 210 as visited is shown. When walk 1410 first arrives into a concept 210, the concept is opened 1610 and another set of constraint rules 1470 is applied to determine 1620 if the concept 210 is useful. A concept 210 is considered not useful if it is a child of a specific class which in one embodiment is called DefaultBehaviorObject. A useless concept is defined as a concept 210 that does not contain any semantic representation. Typical useless concepts 210 are, for example, concepts 210 that determine the position of the word 1480 in the user's phrase 110. Another example of a useless concept is the concept 210 that refers to the default output value for a user activity 180. Any concept 210 that is visited frequently and doesn't add semantic information can and should be added to the DefaultBehaviorObject class. Invalid concepts 210, that is concepts 210 that contain corrupt information in some form or another are also considered not useful. If the system 100 determines 1620 that the concept 210 is not useful, control returns 1660 to the walk mechanism 1420 which determines 1520 another concept to visit. If the system 100 determines 1620 that the concept 210 is useful, the mark mechanism 1420 adds 1630 one part of the mark to the set of marks 1650 contained in concept 210 and then adds 1640 the other part of the mark to the same set of marks 1650 contained in concept 210.

The SubRecord 915 representation of the set of marks 1650 is as follows:

| | |
|---|---|
| SRBSetActivation | // begin set marker 940 |
| SRCnumList | // segment 1670 |
| ... | // ... |
| SRCnumList | // segment 1670 |
| SRESetActivation | // end set marker 950 |

The mark contains a segment 1670 that the walk mechanism 1410 used to arrive into the current concept 210b. The segment 1670 is composed of a pair of datum: the previous concept 210a and the attribute 220 that walk 1410 used to enter into the current concept 210b. The system 100 first marks 1630 the current concept 210b with the previous concept 210a. The system 100 then marks 1640 the current concept 210b with the attribute 220 used to arrive in the current concept 210b.

If the mark mechanism 1420 determines 1430 that the set of marks 1650 already contains some segment 1670 entries, it notifies the spreading activation process 120 that the current concept 210b has already been visited. In this case, the spreading activation process 120 launches a connectivity search 1440.

Therefore, using the process described, the mark mechanism 1420 stamps the current concept 210b with a mark indicating the current concept 210b has been visited and from what segment 1670 the visit came from, while also reducing the entropy of the graph 2040 traversal by eliminating useless concepts 210. By using KB 160 mechanisms to store the mark 1650 directly in the concepts 210, the mark mechanism 1420 provides a guarantee that a parallel implementation of the system 100 will not deadlock, unlike conventional systems that are not implemented to run in parallel.

Connectivity Search 1440

Figure 17:
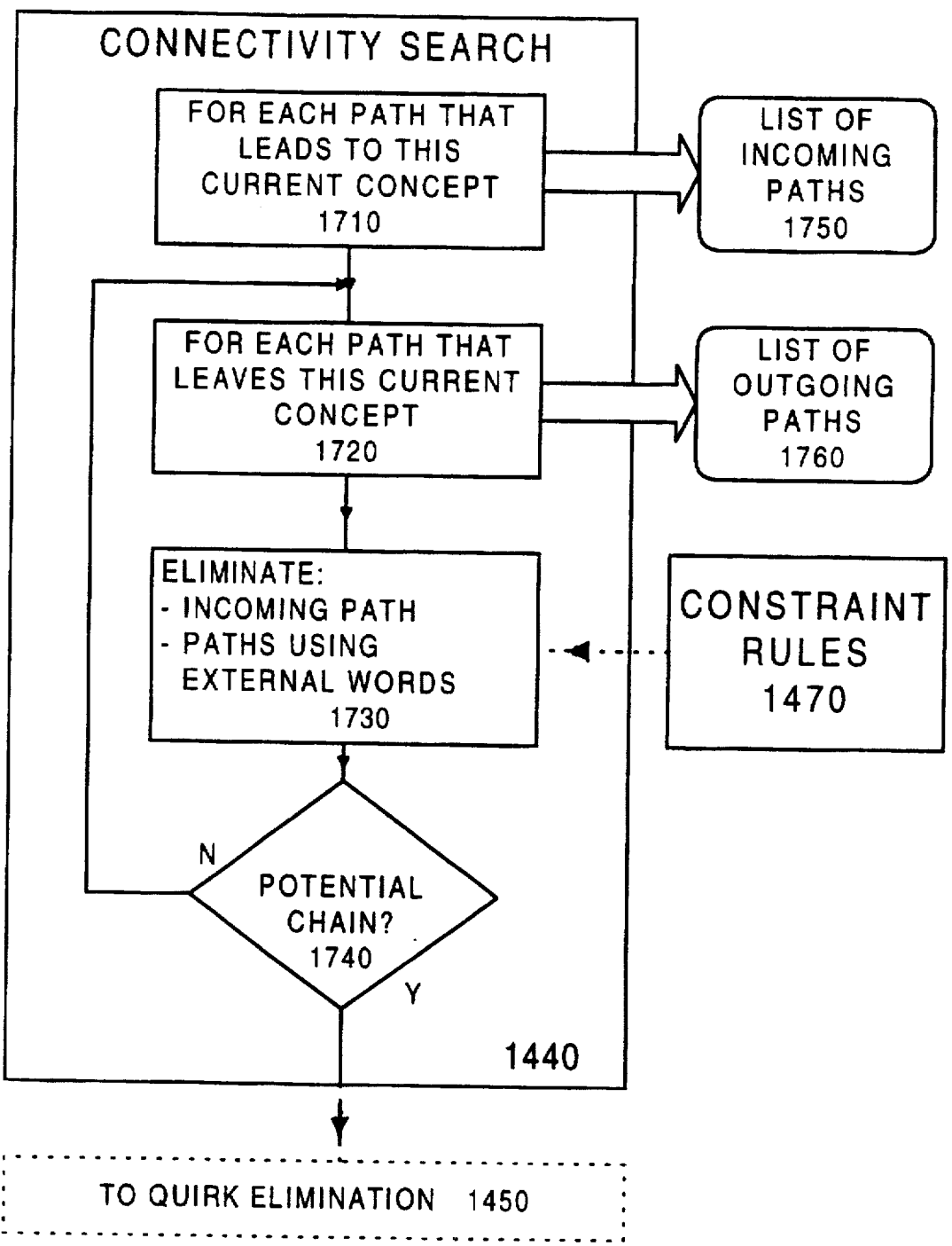
FIG. 17 is a flow diagram of one embodiment of a connectivity search process in the present invention.

Referring to FIG. 17, a flow diagram illustrates an embodiment of a connectivity search process 1440. The goal of the connectivity search process 1440 is to attempt to construct a chain 130 from the path 2010 walk used to arrive to the current concept 210b with the path 2010 whose end was discovered 1430 in the current concept 210b. The process 1440 searches 1710 each path 2010 that could be used to arrive to the current concept 210b and adds the path 2010 to a list of incoming paths 1750. The connectivity search process 1440 then searches 1720 for any path 2010 that could lead to this current concept 210b by using the marks 1650 as a backtracking mechanism. The connectivity search process 1440 then adds each path 2010 found to a list of outgoing paths 1760. The connectivity search process 1440 applies yet another set of constraint rules 1470 to the lists of incoming paths 1750 and the list of outgoing paths 1760 in order to eliminate 1730 paths 2010 that are pathological. A pathological path is a path 2010 that contains an external word 1480 in a place other than at its root (i.e. first element). Also the case where the outgoing path exits the current concept 210b using the same segment as the incoming path is considered pathological. In embodiments of the KB 160 containing large bodies of lexical information (i.e. where the user's choice of input words 1480 can be made from a vast vocabulary), the occurrence of pathological paths is frequent and result in irrelevant chains being selected. If the incoming path 2010 is pathological or the outgoing path 2010 is pathological, the connectivity search process 1440 determines 1740 that a potential chain does not exist and returns to 1720 to retrieve the next outgoing path 1760. If a potential chain exists, the connectivity search 1440 submits the incoming path and the outgoing path to quirk elimination 1450.

At this point, the connectivity search 1440 has discovered one of many potential chains 130 that establishes a relationship between the user input word 1480 currently being examined and another user input word 1480. The potential chain 130 encompasses the concept 210 currently in focus. In the process, the connectivity search process 1440 has filtered out additional uninteresting paths 2010. Also, the connectivity search process 1440 does not use any domain knowledge to establish connectivity unlike conventional knowledge base systems. Therefore, the system 100 does not require the exhaustive hand-tuned pairing up of relationships between concepts that is typically found in conventional systems.

Quirk Elimination 1450

Figure 18:
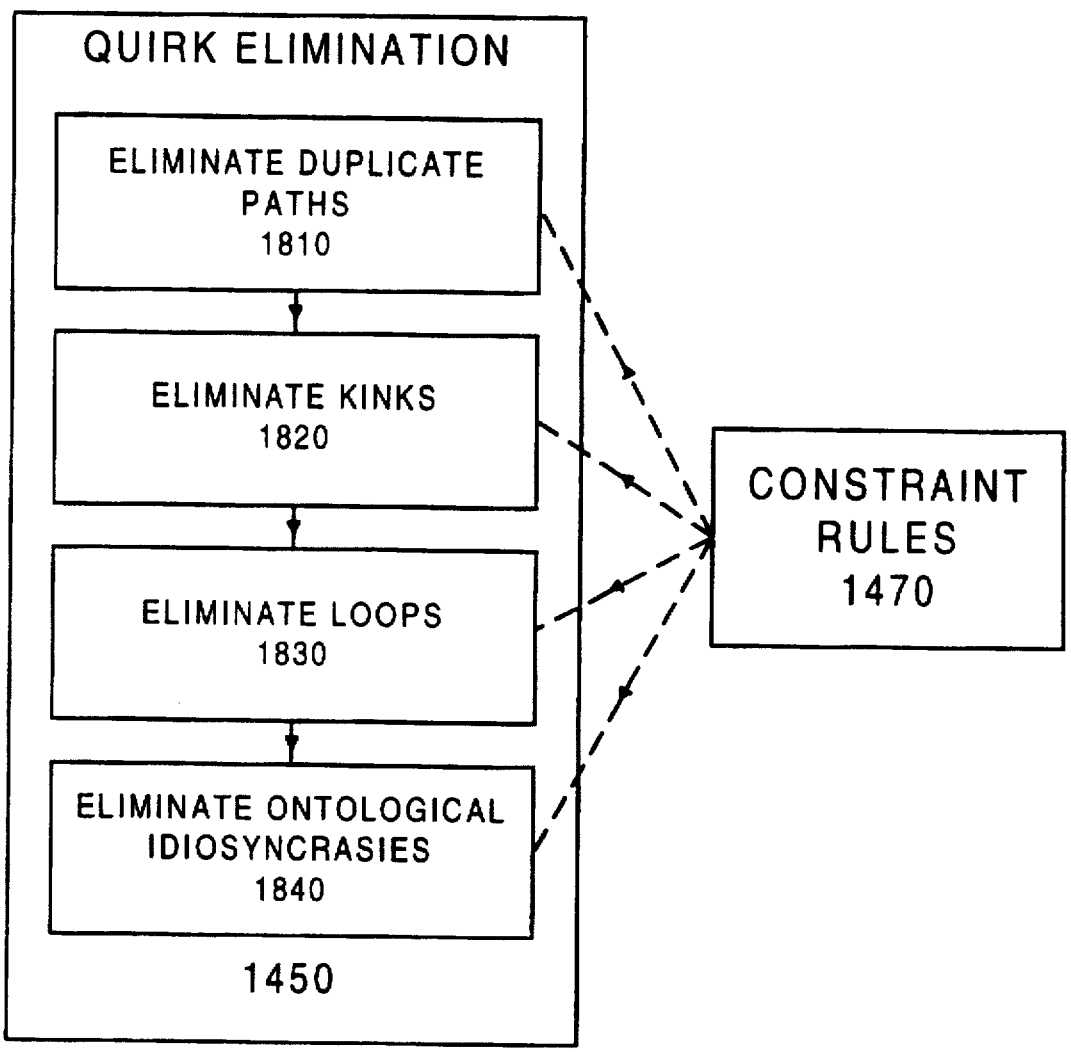
FIG. 18 is a flow diagram of one embodiment of a quirk elimination filter in the present invention.

Referring to FIG. 18, the quirk elimination filter 1450 is shown. One embodiment of quirk elimination 1450 applies four sets of constraint rules 1470 in succession. Additional constraint rules 1470 could be added in other implementations of the system 100.

The first constraint rule 1470 includes eliminating duplicate paths 1810. Quirk elimination 1450 checks that the submitted paths 2010 do not already exist.

The next constraint rule checks 1820 that the submitted paths do not contain kinks 2020 and eliminates 1820 any paths 2010 containing kinks 2020 that are found. A kink 2020 occurs when two peer concepts 210a, 210b (i.e. two concepts 210 that are children of the same class) are connected to the same concept 210c using the same attribute 220a. If a kink 2020 is found in a path 2010, the path 2010 is thrown away because the path would hold no common sense. For example, apple and orange are both fruit. They also both have a color, but there is no cognitive representation that can usefully talk about the color of an apple relating to the color of an orange.

The next constraint rule 1470 checks 1830 for loops 2030 in the submitted paths 2010. Loops 2030 in a path 2010 are not desirable because a loop indicates that there exists a shorter (i.e. more relevant) path 2010 that can accomplish the same result.

The last set of constraint rules 1470 that quirk elimination 1450 applies, results in the elimination of paths 2010 that contain ontological idiosyncrasies. These ontological idiosyncrasies are particular geometrical patterns that paths 2010 carve in the graph 2040 that carry no meaningful information but usually result in high connectivity. The high connectivity (i.e. spaghetti paths) results in large numbers of unrelated concepts 220 being linked together and biasing the list of chains 130 with irrelevant concepts 210. A typical example is a concept 210 representing a noun that is linked via the subject attribute and the object attribute. Since a noun can never be at the same time a subject and an object in a sentence, the path 2010 that contains such a connection is always discarded.

At this point, the incoming path and the outgoing path are considered legitimate paths, and are handed over to create chain 1460. Therefore, quirk elimination 1450, has weeded out paths 2010 would ordinarily cause inordinate amounts of unnecessary computation in a traditional implementation. Moreover, since the constraint rules need not be applied sequentially, one embodiment of the system 100 on a multiprocessor or parallel processing machine could trivially assign a task to each constraint rule 1470 thereby significantly improving the response time to a user's input command 110.

Create Chain 1460

Figure 19:
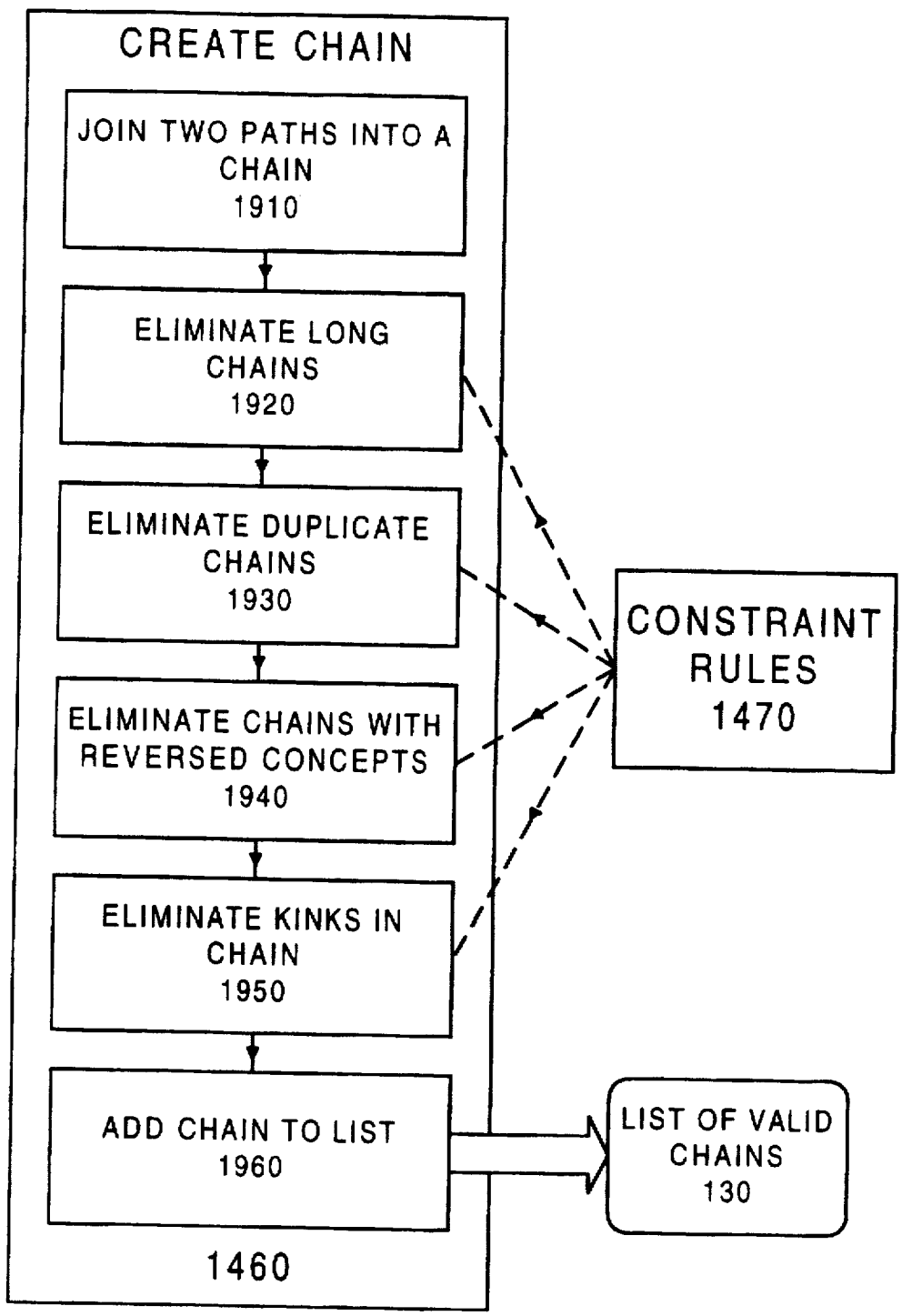
FIG. 19 is a flow diagram of one embodiment of a process for filtering chains in the present invention.

Referring to FIG. 19, the final process of filtering chains 1460 is illustrated. The initial step for create chain 1460, is to assemble or join 1910 the two submitted paths 2010 by their common end concept 210 into a tentative chain 130. Create chain 1460 then applies another set of four constraint rules 1470 to the tentative chain 130 in a filtering process.

The first constraint rule 1470 eliminates 1920 chains 130 that are too long. A long chain 130 is thought to represent a relationship that is too convoluted. The maximum permissible length for a chain 130 is usually between six and twenty-five concepts depending on the performance of the computer.

The second constraint rule 1470 eliminates 1930 duplicate chains 130 in the same way that quirk elimination 1450 eliminates paths 2010 that are duplicated as described in FIG. 18.

The third constraint rule 1470 eliminates 1940 chains 130 with reversed concepts 210. Two chains 130 that are identical but for two swapped concepts 210 are deemed to represent the same information and are considered redundant.

The last constraint rule 1470 eliminates 1950 kinks 2020 in the chain 130 that might have been introduced when the two paths 2010 were spliced. The process 1950 is similar to the kink filter 1820 of quirk elimination 1450 described in FIG. 18.

If the chain passes the previous tests, it is considered a valid chain and is added 1960 to the list that collects the chains 130 relevant to the user's input 110.

The filtering process described above possesses the same advantages of focus and parallelization as the quirk elimination process 1450.

Once the spreading activation process 120 is completed, the total number of chains 130 relevant to the user's input are reduced by at least one order of magnitude.

Summary

The present invention provides the advantages of supplying a natural language processing module 140 with a small relevant subset of a potentially large and complex knowledge base (KB) 160 that is highly correlated to a user's input command 110 by increasingly and iteratively applying an extendable set of well-tuned heuristics contained in constraint rules 1470. The nature of the process makes it extremely conducive to implementation on multiprocessor or parallel-process devices. Unlike conventional systems, the two factors provide the system 100 with a solution to the problem of responding to a user's natural language input with a correct reaction within a reasonable response time when the domain of the user's input is large.

Introduction

Logic statement 340 reexecution 2150 extends the reasoning engine's 170 capabilities by automatically reexecuting logic statements as required. Only the statements 340 requiring reexecution 2150 are reexecuted.

An example of reexecution 2150: An IfStatement's 520 execution is dependent upon evaluation of its conditional expression. The conditional expression, in turn, may be dependent upon knowledge base facts 310. As other statements 340 execute (subsequent to the IfStatement 520), they may alter these facts 310. If so, the IfStatement 520 will require reexecution 2150.

Reexecution 2150 of a statement 340 may, of course, cascade into reexecutions of additional statements.

The logic language interpreter 2100 manages all of these reexecutions 2150 until no more reexecutions are required. The interpreter 2100 interprets raw subrecords 915 as logic language statements 340.

Overview of Statement Execution

Figure 21:
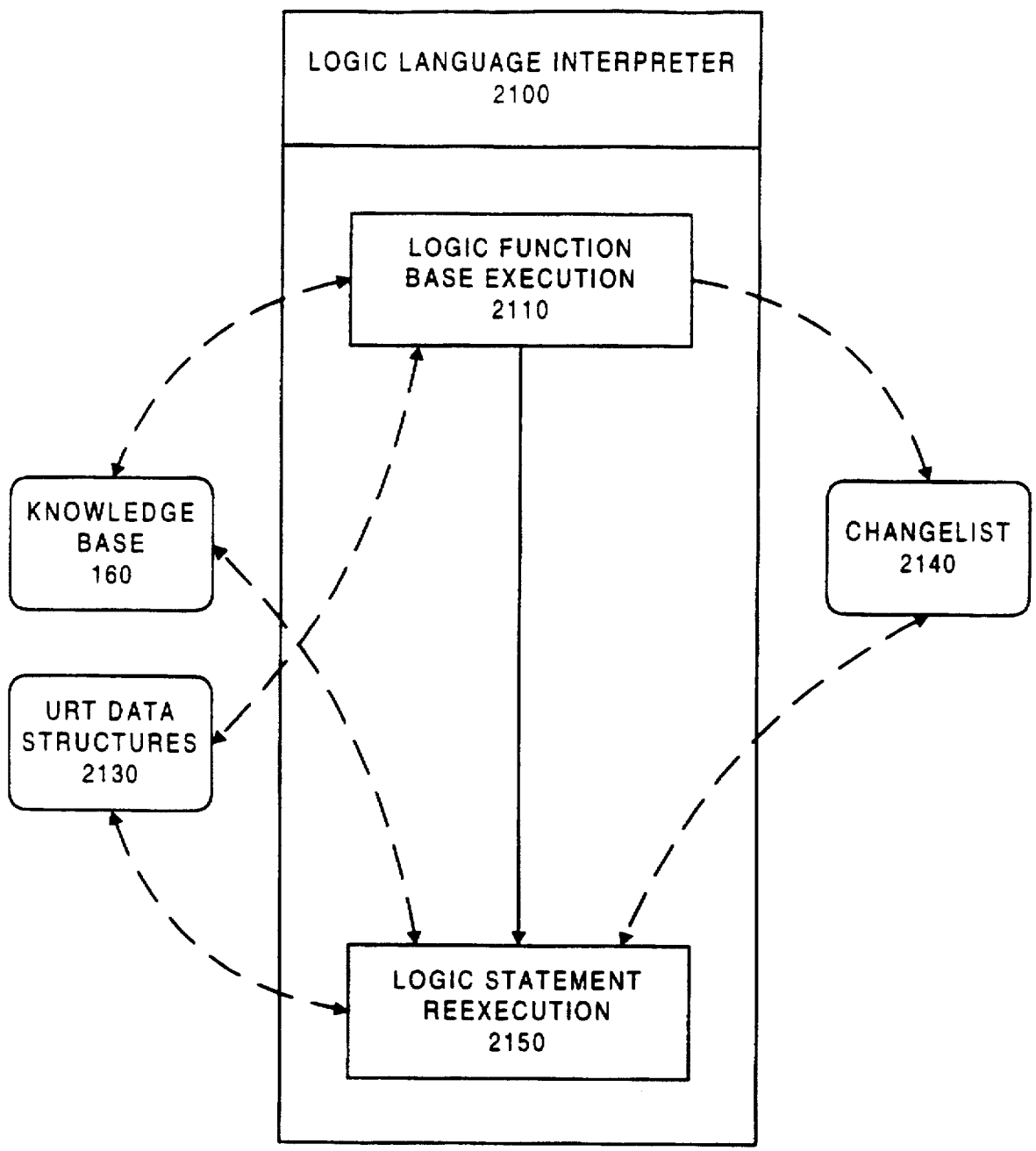
FIG. 21 is an overview diagram of one embodiment of logic statement execution in the present invention.

FIG. 21 illustrates overall process flow for statement 340 execution 2110 and reexecution 2150. The major process components include the logic language interpreter 2100, logic function base execution 2110 and logic statement reexecution 2150. These components reference three data resources: the knowledge base 160, the Universe-Reality-TagSet (URT) data structures 2130 and the ChangeList 2140.

First, the interpreter 2100 performs logic function base execution 2110. The function's statements 340 are executed one by one and, as these statements invoke other logic functions, their statements are also executed. The nesting can proceed to any depth and is limited only by System resources.

At the completion of logic function base execution 2110, the interpreter 2100 has saved results within three interrelated data resources:

The knowledge base 160 reflects changes to attributes 320 and values 470.

The URT data structures 2130 correlate knowledge base 160 changes to the logic statements 340 causing and affected by those changes.

The ChangeList 2140 itemizes changed attributes 320 having statement 340 dependencies.

The interpreter 2100 next drives logic statement reexecution 2150. It does so by processing the contents of the ChangeList 2140.

In the course of reexecuting a statement 340, the interpreter 2100 may make further changes to the knowledge base 160 and the URT data structures 2130. These, in turn, may result in the posting of additional items to the ChangeList 2140. Thus, a given statement reexecution 2150 may cascade into the reexecution of other statements 340. And a given statement 340 may be itself reexecuted several times.

The interpreter 2100 continues to reexecute statements 340 until it has exhausted the ChangeList 2140 items. At this point, logic reexecution 2150 terminates and returns control to its caller. The results of the base execution 2110 and reexecution(s) 2150 are reflected in the knowledge base 160 attributes 320 and values 470. The System frees the ChangeList 2140 and URT 3130 resources because they are no longer needed.

Data Flow Description

FIGS. 22–25 are concerned with the data flow amongst the various data resources.

Data Flow for the Knowledge Base 160 Attributes 320 and Values 470

Figure 22:
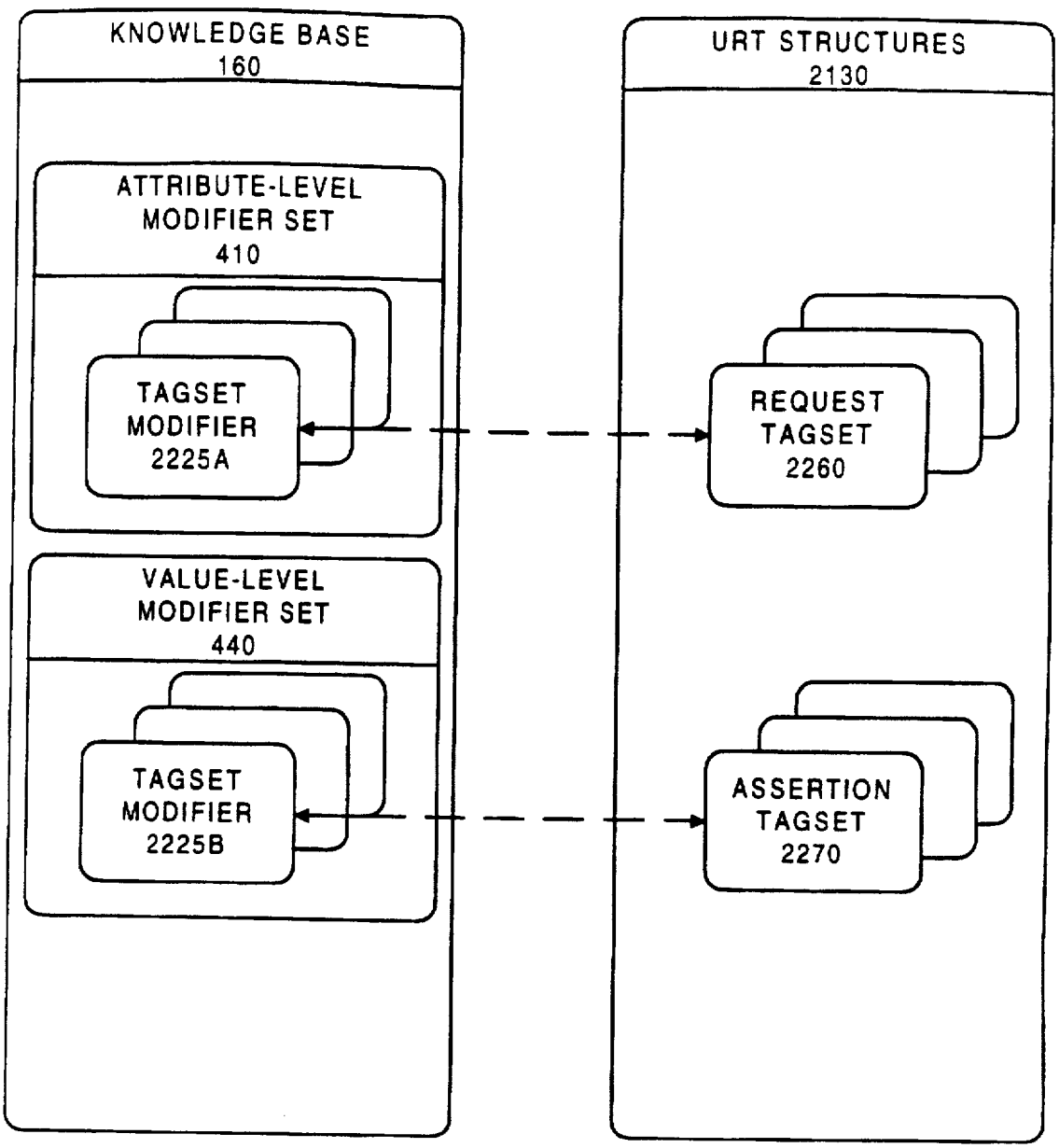
FIG. 22 is a block diagram of one embodiment of knowledge base and URT relationships in the present invention.

FIG. 22 illustrates one embodiment of the data flow between two data resources: the knowledge base 160 and the URT data structures 2130.

Within the knowledge base 160, an attribute 320 can contain an attribute-level modifier set 410. The modifier set 410 includes zero or more TagSet modifiers 2225A (special types of modifier 46) which tie the modifier set to request TagSets 2260 within the URT structures. These TagSets 2260 help identify logic statements 340 that are dependent upon the attribute 320. An attribute's 320 TagSet modifiers 2225A are written when the Decision process 150 reviews the attribute's values 470.

Within the knowledge base 160, a value 470 can be associated with one or more value-level modifier sets 440. Each modifier set 440 includes zero or more TagSet modifiers 2225B which tie the modifier set to assertion TagSets 2270 within the URT structures. These TagSets 2270 help identify the logical context (e.g., function, ThenClause, ElseClause) for the value's 470 assertion. A value's 470 TagSet modifiers 2225B are written when logic statements 340 write values to an attribute 320.

Data Flow for URT Structures 2130

Figure 23:
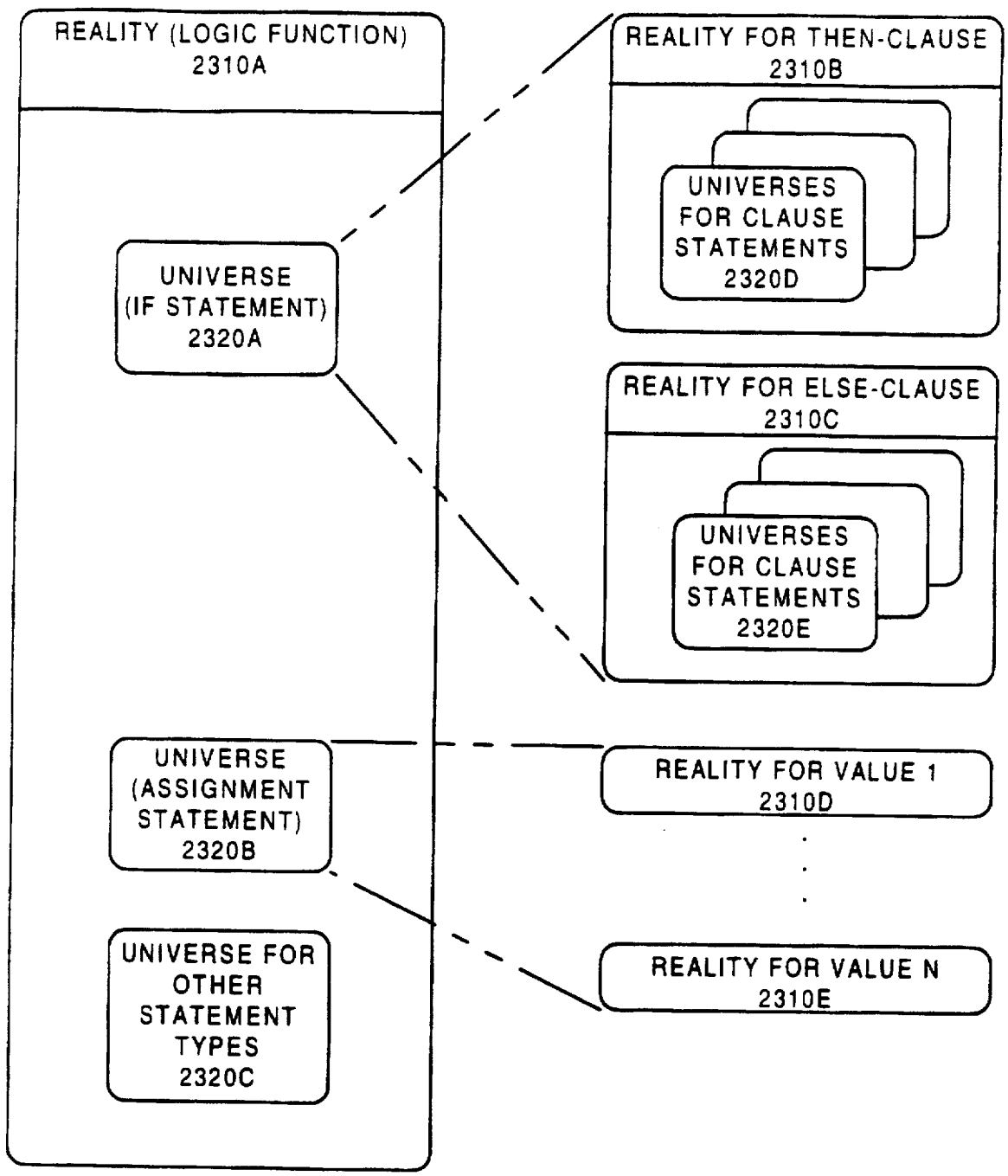
FIG. 23 is a block diagram of one embodiment of URT and logic statement relationships in the present invention.

FIGS. 23 and 23 illustrate data flow for the URT data structures 2130 from two perspectives:

1. FIG. 23 shows how the URT structures 2130 are associated with logic statements 340.

A Reality 2310A is associated with a logic function. The Reality 2310A includes zero or more Universes 2320— one for each statement 340 executed by the logic function. For simple statements 340—e.g., Local Statements 550, the statement Universe 2320C is empty. But for more complex statements 340, the statement Universe 2320 may in turn include Realities 2310 which may in turn include more Universes and so forth.

For example, an IfStatement 520 Universe 2320A includes two Realities 2310: one for the statement's ThenClause 2310B and another for the statement's ElseClause 2310C. Each of these Realities 2310 includes Universes (2320D and 2320E)—one for each of their constituent logic statements 340.

As another example, an AssignmentStatement 510 Universe 2320B includes multiple Realities 2310—one for each source-expression value (2310D and 2310E). These Realities 2310 do not generally include any constituent Universes 2320.

Figure 24:
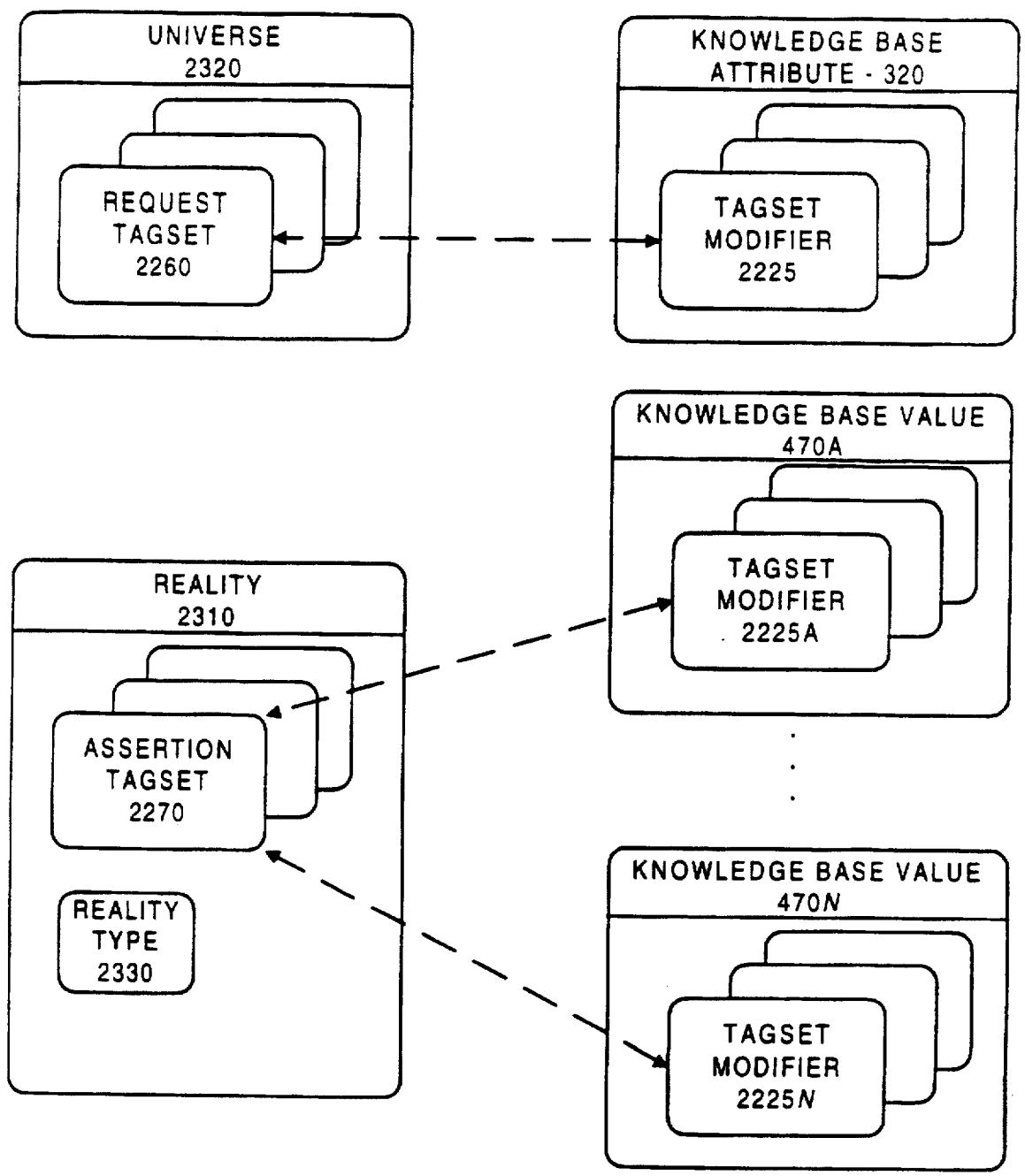
FIG. 24 is a block diagram of one embodiment of URT and knowledge base relationships in the present invention.

2. FIG. 24 shows how the URT structures 2130 are associated with the knowledge base 160.

A Universe 2320 includes zero or more request TagSets 2260. Each of these is associated with a knowledge base 160 attribute 320 TagSet modifier 2225 and implicitly defines a logic statement 340 dependant on that knowledge base 160 attribute 320.

A Reality 2310 includes zero or more assertion TagSets 2270. Each of these is associated with one or more knowledge base value TagSet modifiers (2225A and 2225N) and implicitly defines a logic statement 340 context responsible for that value's (470A or 470N) assertion.

A Reality 2310 also has a RealityType 2330. RealityTypes 2330 are further described below.

Taken together, the two perspectives illustrate the following characteristics about Universes 2320:

They contain zero or more Realities 2310 as children.

They specify zero or more request TagSets 2260.

Taken together, the two perspectives illustrate the following characteristics about Realities 2310:

They contain zero or more Universes 2320 as children.

They specify zero or more assertion TagSets 2270.

They possess a RealityType 2330.

Taken together, the two perspectives illustrate the following characteristics about TagSets (2260 and 2270):

There are two types of TagSets: request TagSets 2260 and assertion TagSets 2270.

Request TagSets 2260 are associated with TagSet modifiers 2225 within knowledge base 160 attribute-level modifier sets 410.

Assertion TagSets 2270 are associated with TagSet modifiers (2225A and 2225N) within knowledge base 160 value-level modifier sets 440.

RealityTypes 2330

In addition to their other characteristics, Realities 2310 are also associated with a RealityType 2330 including: TRUE, MULTIPLE or NOT:

RealityType 2330 TRUE designates a Reality 2310 resulting from a successful Decision 150 and which, for now, is considered to accurately reflect the state of the encompassing Universe 2320. Statements 340 executing within the context of a TRUE Reality 2310 assert values 470 with greater Decision 150 "standing" than those executing in other types of Realities. That is, these values 470 will be ranked higher by the Decision process 150 than are values (of a comparable Success rating) associated with other RealityTypes 2330.

RealityType 2330 MULTIPLE designates a Reality 2310 resulting from an unsuccessful Decision 150 and which, for now, is considered only to possibly reflect the state of the encompassing Universe 2320. Statements 340 executing within the context of a MULTIPLE Reality 2310 assert values 470 with lesser Decision 150 standing than those (of a comparable Success rating) in TRUE Realities but greater standing than those in NOT Realities.

RealityType 2330 NOT designates a formerly TRUE or MULTIPLE Reality 2310 which is now thought to be invalid. Statements 340 executing within the context of a NOT Reality 2310 assert values 470 with no Decision process 150 standing. That is, these values 470 win be ignored by the Decision process 150.

Whatever a Reality's 2310 current RealityType 2330, the type can change due to subsequent statement 340 execution.

Data Flow for the ChangeList 2140

Figure 25:
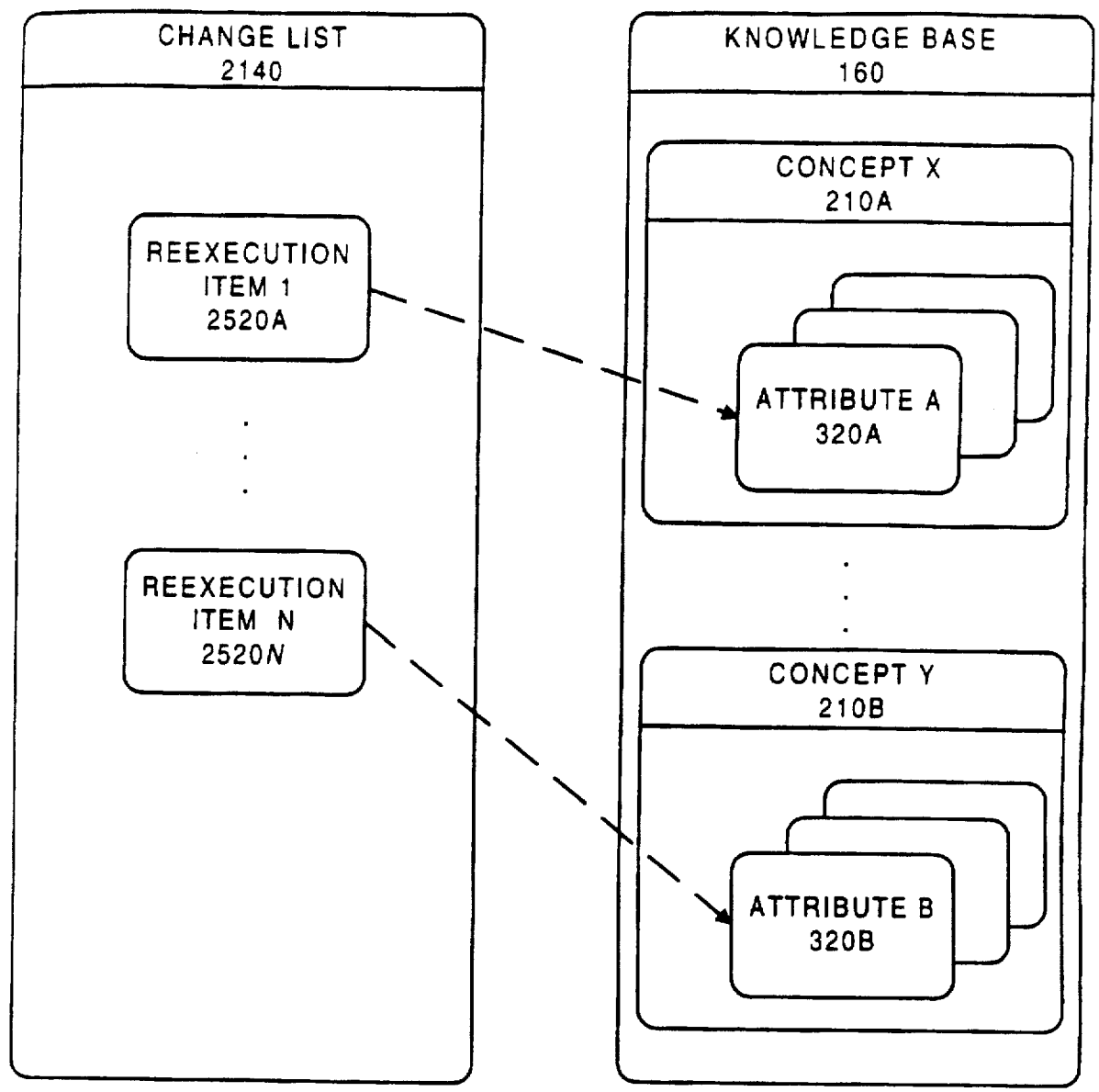
FIG. 25 is a block diagram of one embodiment of ChangeList and knowledge base relationships in the present invention.

FIG. 25 illustrates the data flow between two data resources: the ChangeList 2140 and the knowledge base 160.

The ChangeList 2140 itemizes knowledge base 160 attributes 320 which have changed and which are known to affect logic statement 340 execution. The ChangeList 2140 items (e.g., reexecution items 2520A, 2520N) also reflect the knowledge base 160 concepts (210A and 210B) owning the attributes 320.

ChangeList 2140 items (e.g., reexecution item 2520A) are posted by the System when attributes 320 are changed.

Figure 26:
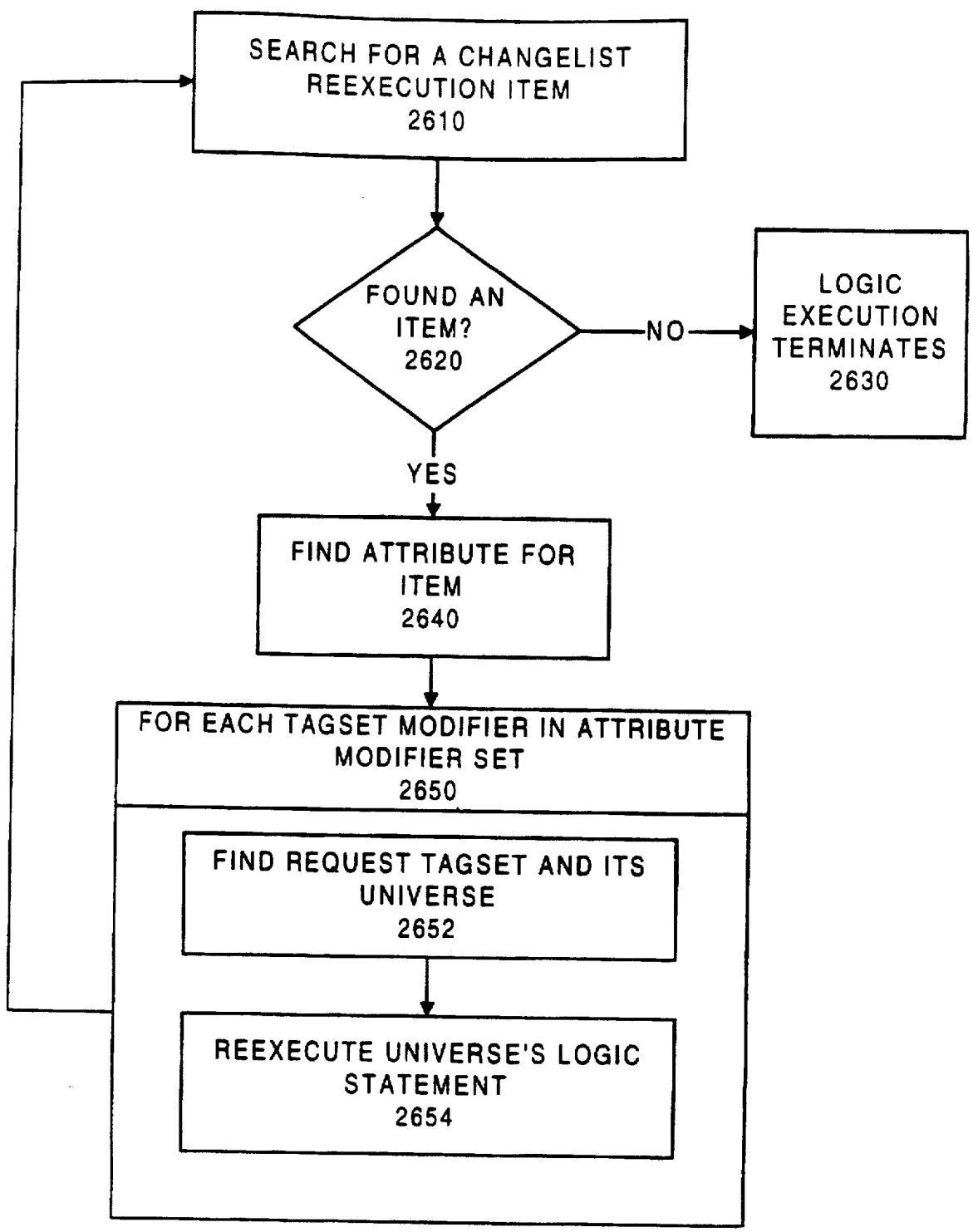
FIG. 26 is a flow diagram of one embodiment of driving logic statement reexecution in the present invention.

The ChangeList 2140 is further described in FIG. 26.

Process Flow Description

FIGS. 26–39 are concerned with the process flow for logic function base execution 2110 and logic statement 340 reexecution 2150.

Process Flow for Driving Logic Statement ReExecution 2150

FIG. 26 illustrates the process flow when the interpreter 2100 determines which statements 340 require reexecution 2150 and then reexecutes those statements accordingly.

By now, logic function base execution 2110 has completed. The interpreter 2100 searches 2610 the ChangeList 2140 for a reexecution item 2520.

The System determines 2620 whether a reexecution item 2520 is found. If no reexecution item 2520 is found, the logic execution terminates 2630. If a reexecution item is found, the interpreter 2100 finds 2640 the knowledge base 160 attribute 320 associated with the item 2520.

For each TagSet modifier within the attribute's modifier set 2650, the interpreter 2100 finds 2652 the associated request TagSet 2260 and then that TagSet's Universe 2320. The interpreter 2100 then reexecutes 2654 the logic statement 340 associated with that Universe 2320. FIGS. 22, 23 and 24 further describe how to derive the logic statement 340 from the attribute's 320 TagSet modifier 2225. As a result of statement 340 reexecution 2150, more changes may be made to the knowledge base 160 and to the URT data structures 2130; and additional items 2520 may be posted to the ChangeList 2140.

After reexecuting statements 340 for all of the attribute's 320 TagSet modifiers 2225, the interpreter 2100 again searches 2610 the ChangeList 2140 for another reexecution item 2520. If another reexecution item 2520 is found, the previous steps are repeated for that item 2520; otherwise, logic execution terminates 2630.

In the current embodiment of the reasoning engine 170, the reexecution process is triggered when the reasoning engine reaches a quiescent state. In a future embodiment, this process could be scheduled within an independant thread of execution—thus allowing for parallel processing.

Process Flow for Logic Function Base Execution 2110

Figure 27:
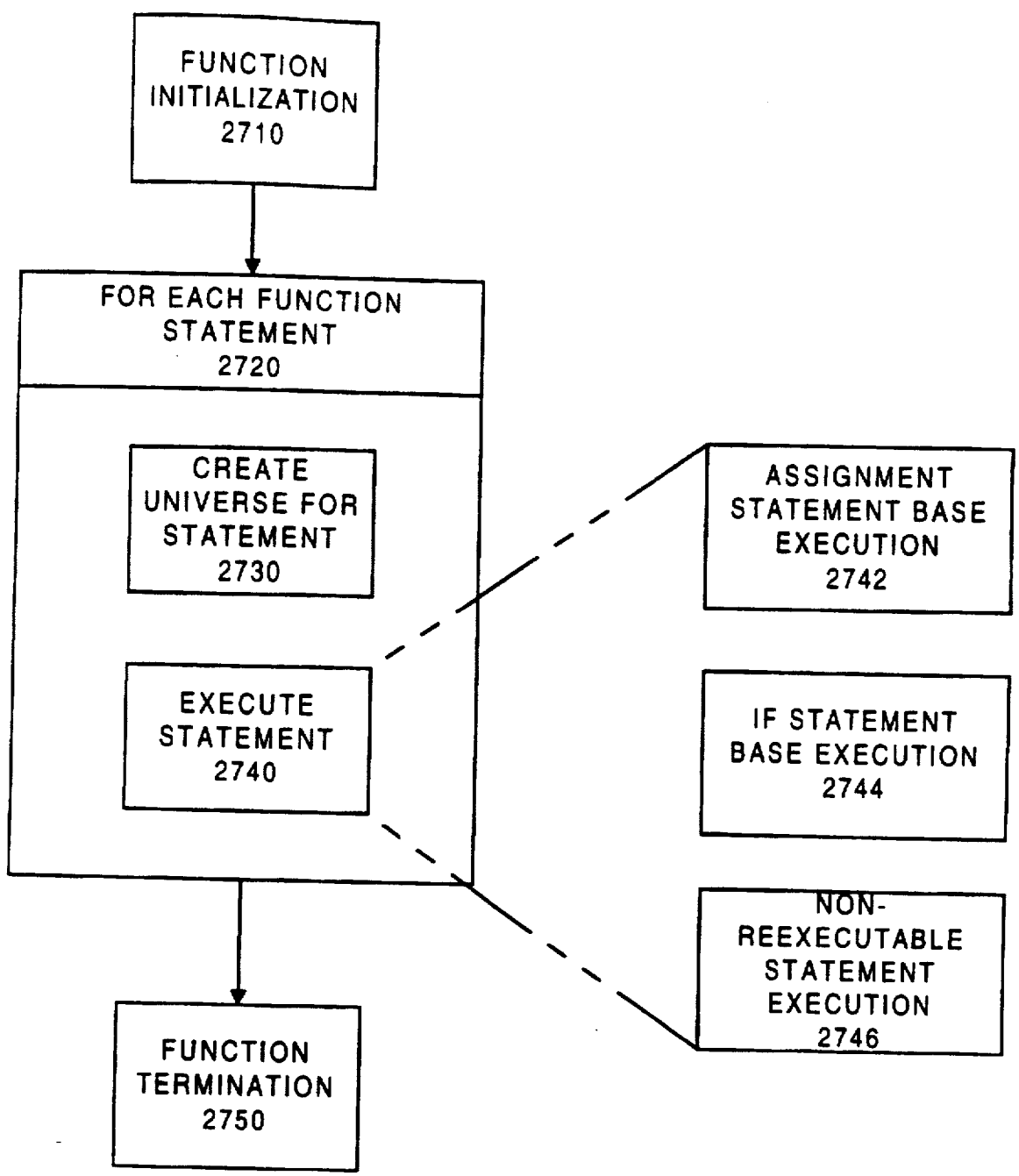
FIG. 27 is a flow diagram of one embodiment of logic function base execution in the present invention.

FIG. 27 illustrates the process flow when the interpreter 2100 performs base execution 2110 for a logic function's statements 340. The interpreter 2100 first initializes 2710 function execution.

For each function statement 2720, the interpreter 2100 creates 2730 a Universe 2320 for the statement 340 and then executes 2740 the statement. After all statements 340 have completed execution, the interpreter 2100 terminates 2750 base execution 2110.

Statement 340 execution itself is, of course, heavily dependant on the statement's semantics. Some statements 2746 (e.g., Break Statements 560) have no reexecution 2150 significance. Whereas other statements, such as Assignment-Statements 2742 and IfStatements 2744 have a lot of reexecution 2150 significance.

Process Flow for AssignmentStatement 510 Base Execution 2742

Figure 28:
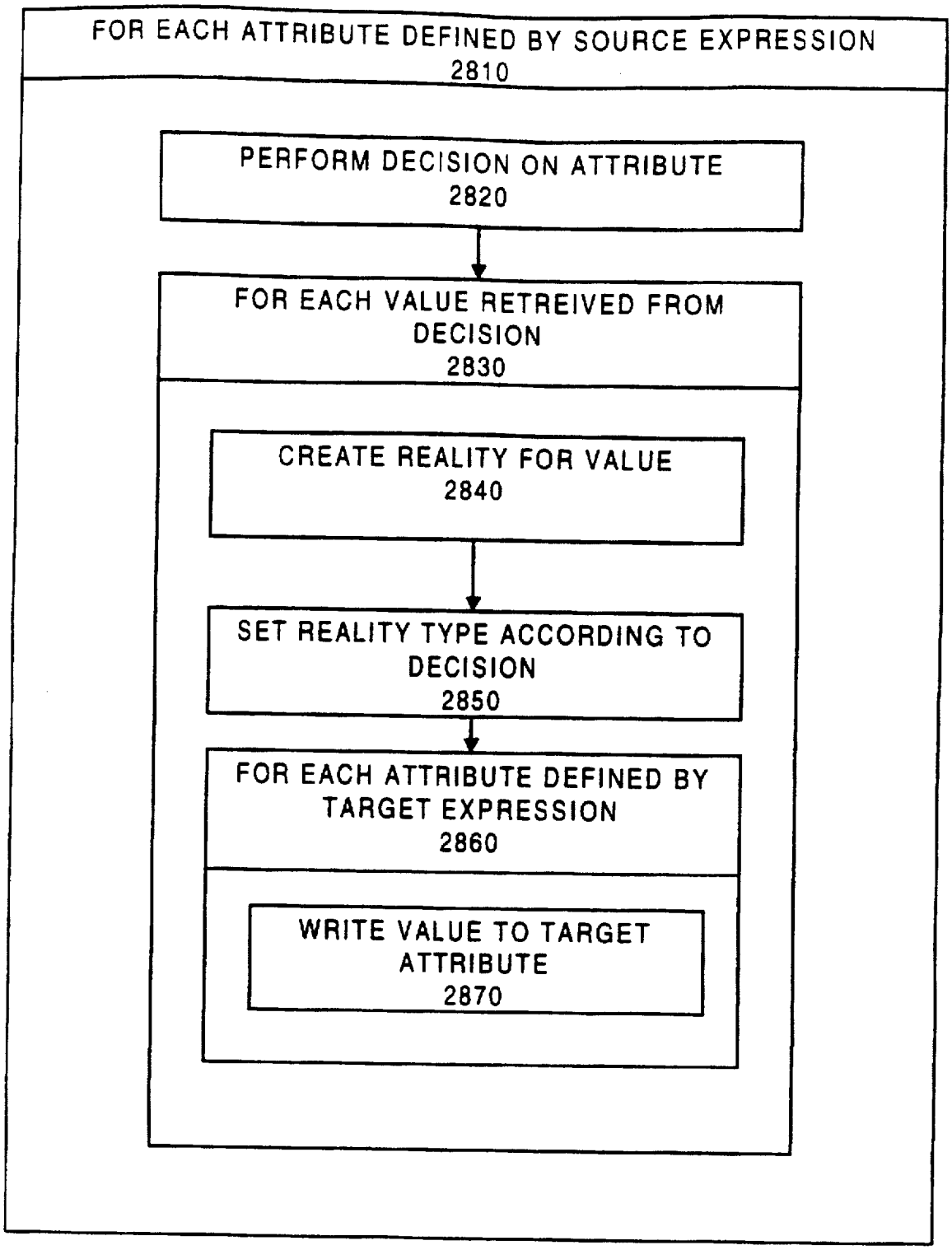
FIG. 28 is a flow diagram of one embodiment of AssignmentStatement base execution in the present invention.

FIG. 28 illustrates the process flow for an AssignmentStatement's 510 base execution 2742. AssignmentStatements 510 fetch values 470 from attributes 320 defined by a source-expression and write those values to knowledge base 160 attributes defined by a target-expression:

<TargetExpression>=<SourceExpression>

The source and target expressions can be defined by treewalks which traverse complex relationships amongst concepts 210 within the knowledge base 160.

For each attribute 320 defined by the source expression 2810, the interpreter 2100 performs 2820 the Decision process 150 on that attribute and notes the result (SUCCESS or CANT_DECIDE).

For each value 470 retrieved from the Decision process 2830, the interpreter 2100 creates 2840 a Reality 2310 for that value and sets 2850 the Reality's type 2330.

The RealityType 2330 is dependant on the Decision process 150 result: TRUE for a Decision SUCCESS and MULTIPLE for a Decision CANT_DECIDE.

For each attribute 320 defined by the target expression 2860, the interpreter 2100 writes 2870 the value 470 to the attribute.

Process Flow for Value 470 Writing 2870

Figure 29:
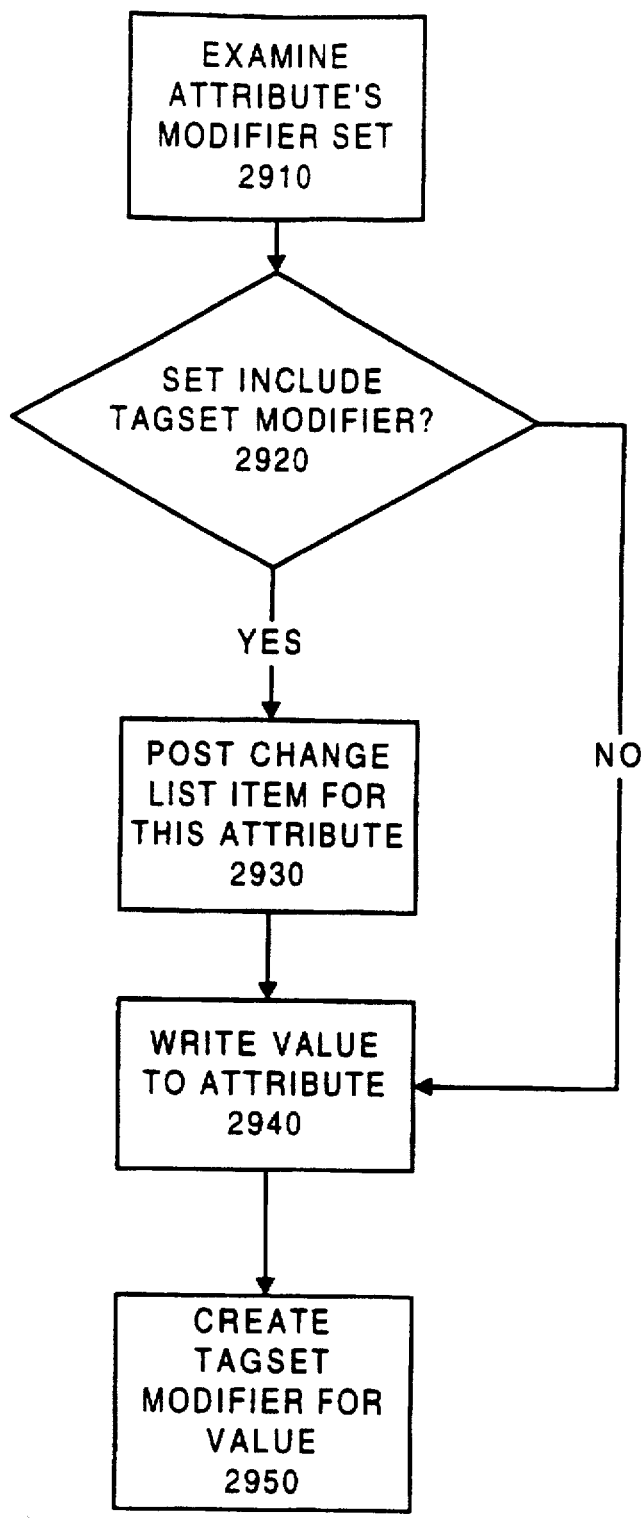
FIG. 29 is a flow diagram of one embodiment of value writing in the present invention.

FIG. 29 illustrates the process flow for value 470 writing and shows how it relates to the other reexecution 2150 elements. These steps are taken for substantially all writes—those performed for a base execution 2110 as well as for a reexecution 2150. The write-routine examines 2910 the target attribute's 320 modifier set 410. The process then determines 2920 if the set 410 includes any TagSet modifiers 2225 (indicating that there are statement 340 dependancies on this attribute 320). If the TagSet modifiers 2225 are included, the routine posts 2930 a ChangeList item 2520 citing the attribute.

If the process determines 2920 that no TagSet modifiers 2225 are included or after the ChangeList item 2520 is posted, the routine writes 2940 the value 470 to the target attribute 320. Additionally, the routine creates 2950 a new value-level modifier set 440 and writes a TagSet modifier 2225 (and possibly a Success modifier 460) to that new modifier set.

Process Flow for IfStatement 520 Base Execution 2744

Figure 30:
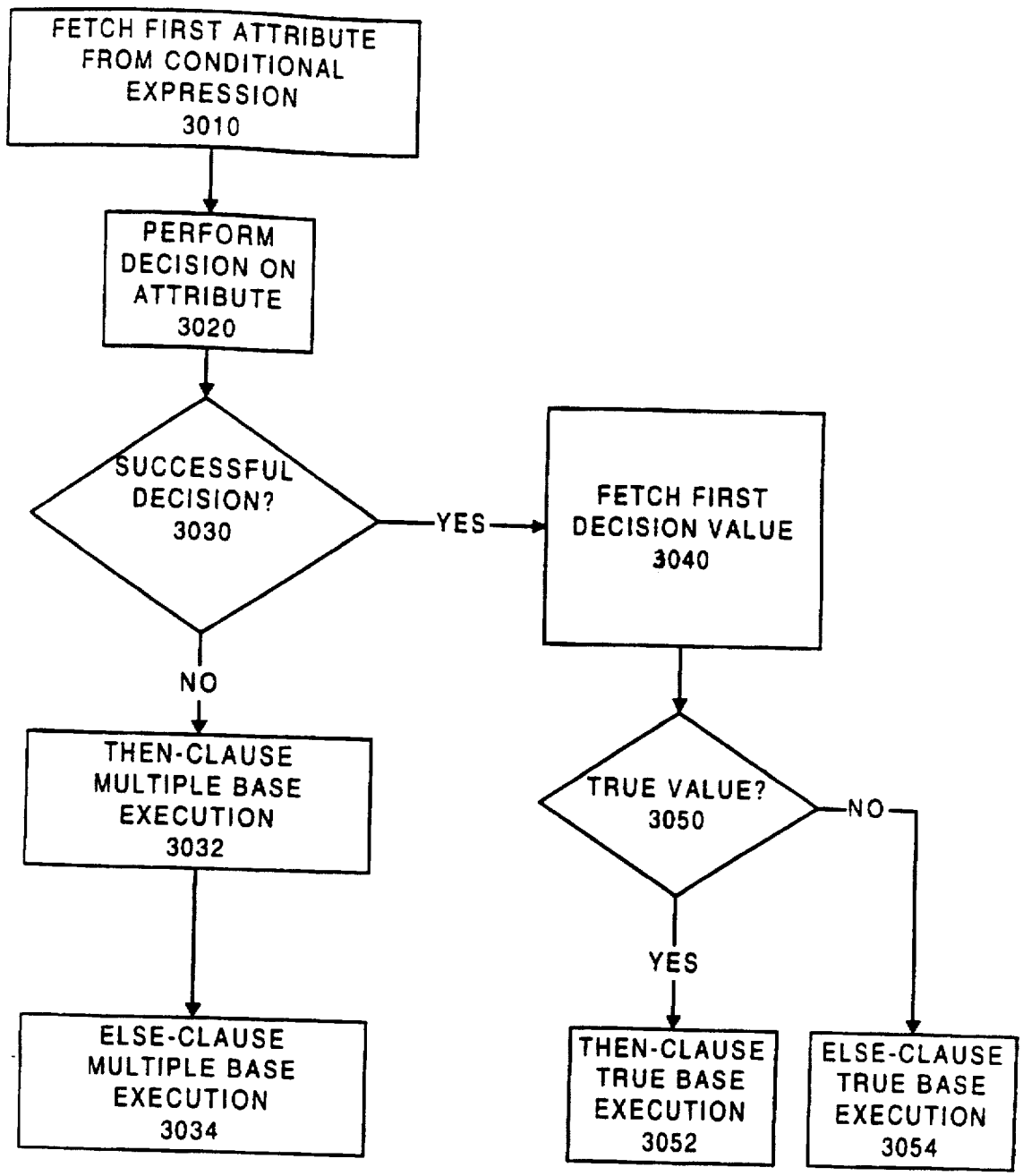
FIG. 30 is a flow diagram of one embodiment of IfStatement base execution in the present invention.

FIG. 30 illustrates the process flow for an IfStatement's 520 base execution 2744.

The IfStatement 520 fetches 3010 a value 470 from an attribute 320 defined by a conditional expression and performs 3020 a Decision process 150 on this value before executing the IfStatement's ThenClause, an ElseClause or both:

If <ConditionalExpression>
Then <ThenClause>
Else <ElseClause>

The conditional expression can be defined by a treewalk which traverses complex relationships amongst concepts 210 within the knowledge base 160.

Having fetched 3010 the first attribute 320 from a conditional expression, the interpreter 2100 performs 3020 the Decision process 150 on that attribute.

The interpreter 2100 then determines 3030 if the Decision process 150 result is SUCCESS. If the Decision process 150 is successful, the interpreter 2100 retrieves 3040 the first value 470 from the Decision process. Then the interpreter 2100 determines 3050 whether that value 470 evaluates as TRUE and, if so, the interpreter performs ThenClauseTrueBaseExecution 3052 as described in FIG. 31; otherwise, it performs ElseClauseTrueBaseExecution 3054 as described in FIG. 31.

Figure 31:
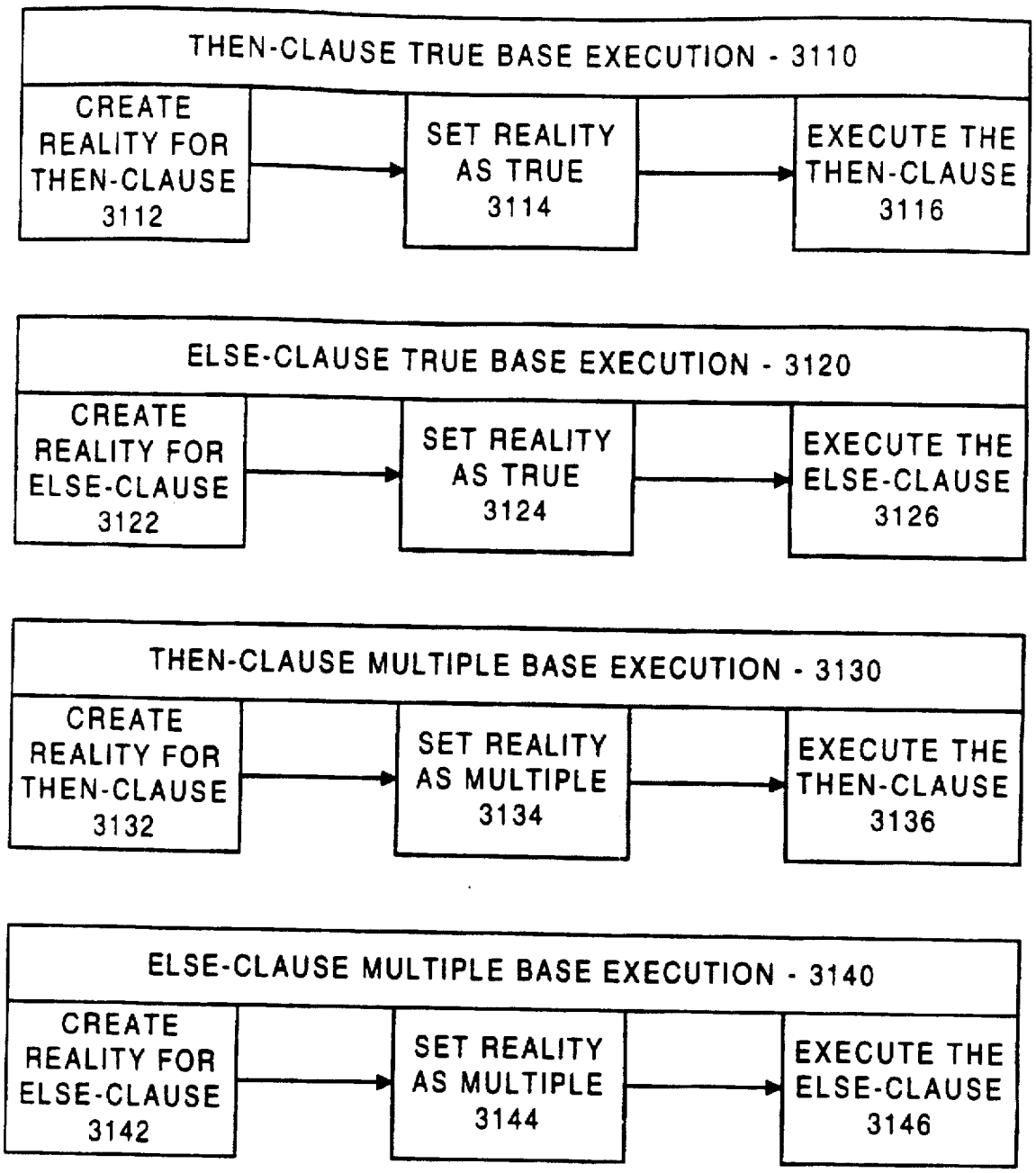
FIG. 31 is a flow diagram of one embodiment of IfStatement base execution outcome processing in the present invention.

If the interpreter 2100 determines 3030 that the Decision 150 result is CANT_DECIDE, the interpreter performs both ThenClauseMultipleBaseExecution 3032 and ElseClauseMultipleBaseExecution 3034 as further described in FIG. 31.

Process Flow for IfStatement 520 BaseExecution 2744 Outcomes

FIG. 31 illustrates the process flow for all of the IfStatement 520 base execution 2744 outcomes described in FIG. 30. For ThenClauseTrueBaseExecution 3110, the interpreter 2100 first creates 3112 a Reality 2310 for the ThenClause. It then sets 3114 the RealityType 2330 as TRUE. It then executes 3116 the logic statements 340 within the ThenClause. For ElseClauseTrueBaseExecution 3120, the interpreter 2100 first creates 3122 a Reality 2310 for the ElseClause. It then sets 3124 the RealityType 2330 as TRUE. It then executes 3126 the logic statements 340 within the ElseClause.

The flow for ThenClauseMultipleBaseExecution 3130 and ElseClauseMultipleBaseExecution 3140 are identical to their TrueBaseExecution counterparts (IMenClauseTrueBaseExecution 3110 and ElseclauseTrueBaseExecution 3120 respectively) except that the RealityType 2330 is set as MULTIPLE rather than as TRUE.

Process Flow for Initiating Statement ReExecution 2654

Figure 32:
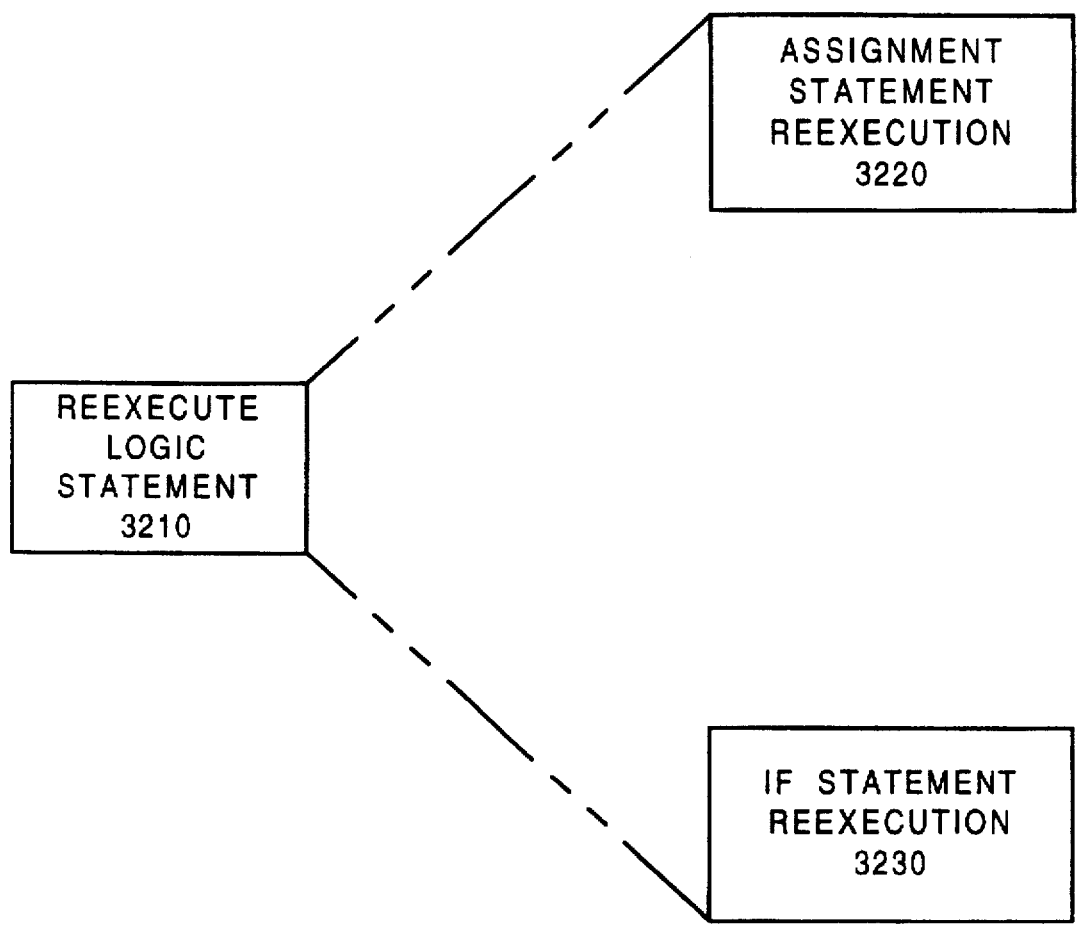
FIG. 32 is a flow diagram of one embodiment of initiating logic statement reexecution in the present invention.

FIG. 32 illustrates the process flow for initiating reexecution 2654 of any statement 340 type. The interpreter 2100 performs these steps when it determines that a statement 340 should be reexecuted 2654 as described in FIG. 26. The interpreter 2100 determines the statement's 340 type and reexecutes 3210 it accordingly. Currently, there are two types of reexecutable statements 340: AssignmentStatements 3220 and IfStatements 3230. These statements are described in FIGS. 33 and 35 respectively.

Process Flow for AssignmentStatement 510 ReExecution 3220

Figure 33:
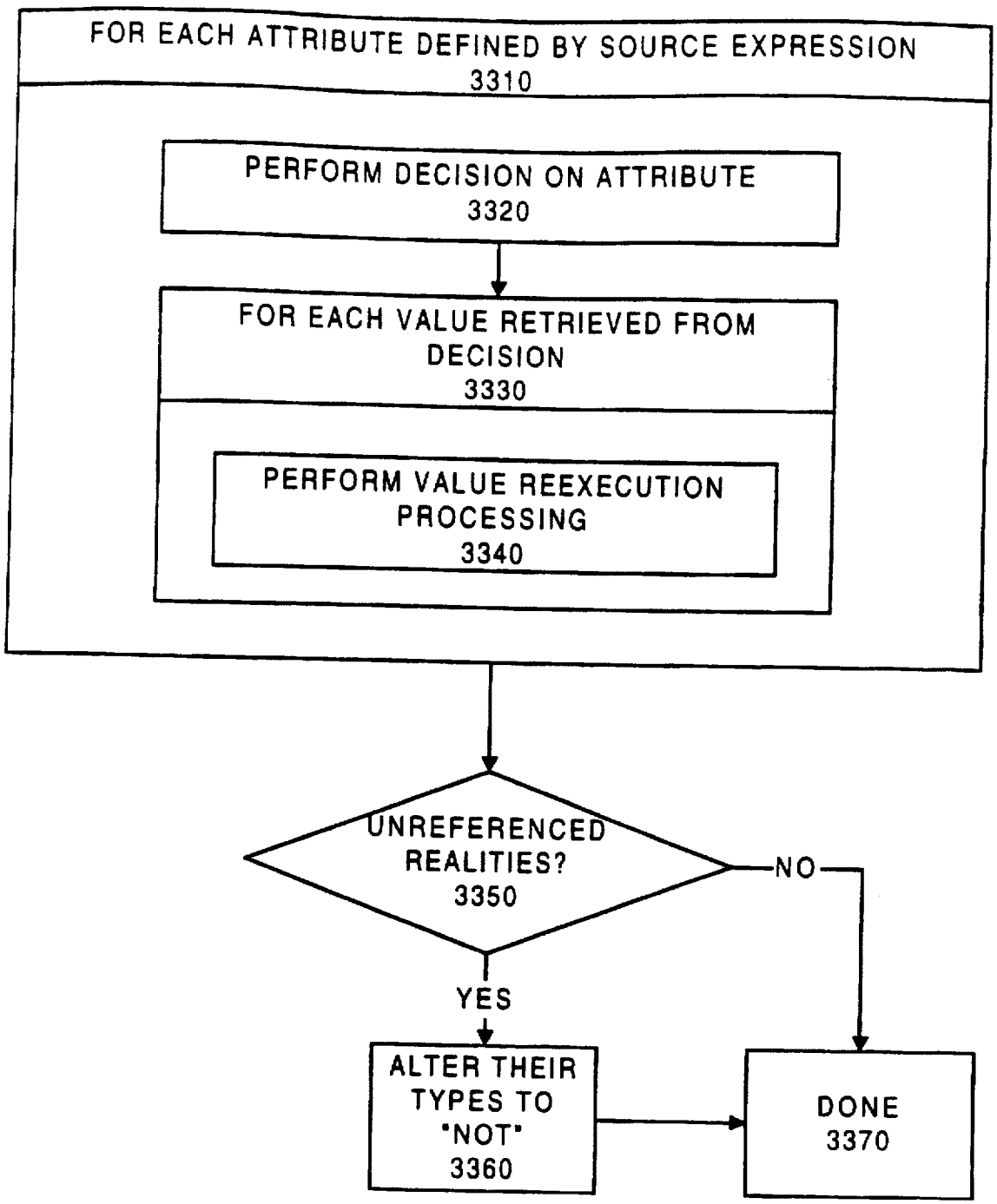
FIG. 33 is a flow diagram of one embodiment of AssignmentStatement reexecution in the present invention.

FIG. 33 illustrates the process flow for an AssignmentStatement's 510 reexecution 3220.

AssignmentStatements 510 fetch values 470 from attributes 320 defined by a source-expression and write those values to knowledge base 160 attributes defined by a target-expression:

<TargetExpression>=<SourceExpression>

For each attribute 320 defined by the source expression 3310, the interpreter 2100 performs 3320 the Decision process 150 on that attribute and notes the Decision result (SUCCESS or CANT_DECIDE).

Figure 34:
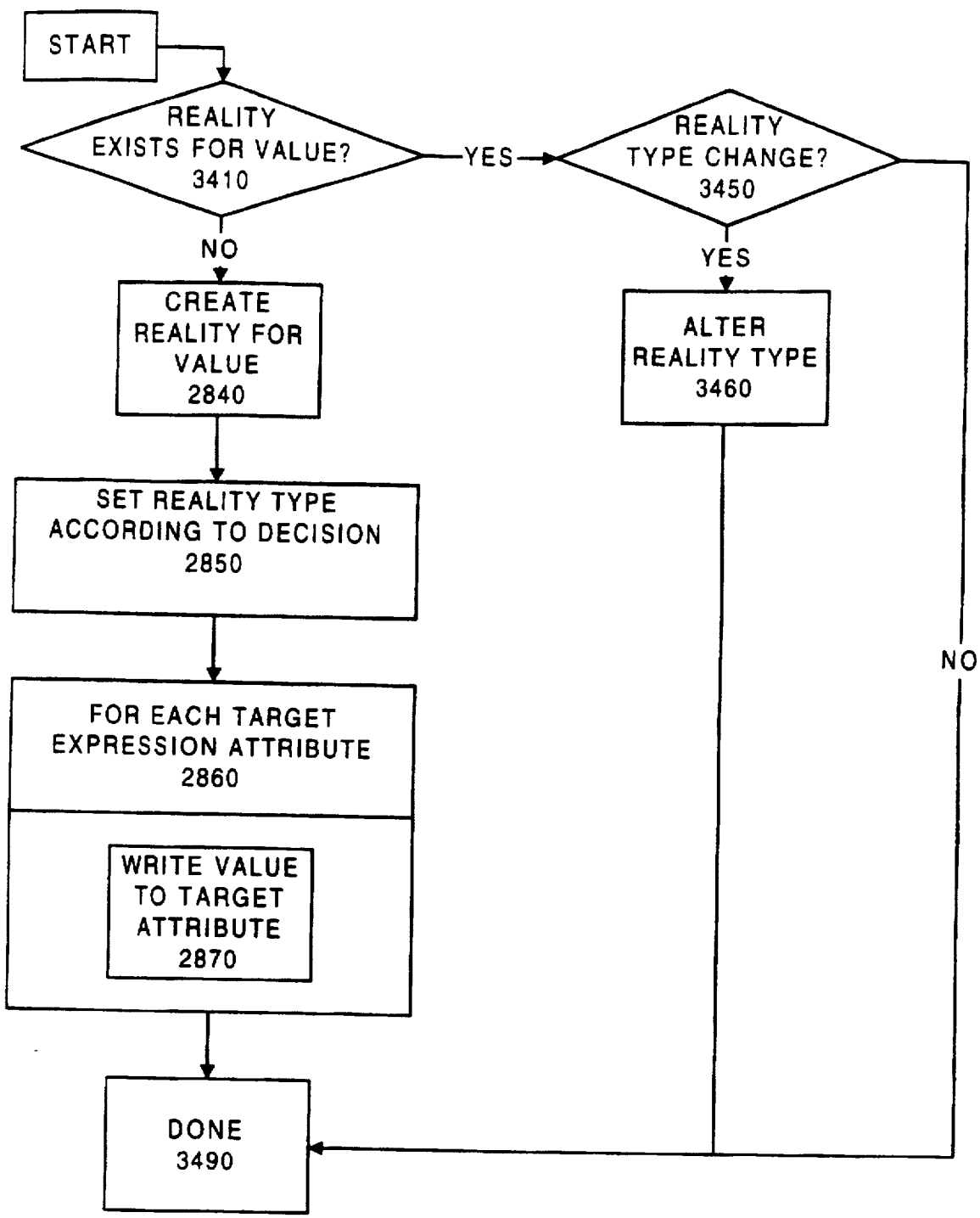
FIG. 34 is a flow diagram of one embodiment of value reexecution processing in the present invention.

For each value 470 retrieved from the Decision process 3330, the interpreter 2100 performs Value Reexecution Processing 3340 as described in FIG. 34. During this processing, the interpreter 2100 may associate additional Realities 2310 with the Assignthe AssignmentStatement's 510 Universe 2320.

After the interpreter 2100 has retrieved and processed all values 470, the interpreter determines if there are any "unreferenced" Realities 2310 associated with the AssignmentStatement's 510 Universe 2320. Since there is a one-to-one correspondence between AssignmentStatement 510 values 470 and Realities 2310, a Reality becomes unreferenced when its corresponding value 470 is no longer asserted. Thus, if in earlier statement 340 executions, a value V has been asserted but, in the latest reexecution 2150, V is no longer asserted, V's Reality 2310 becomes unreferenced.

The interpreter then determines 3350 if there are any unreferenced Realities 2310. If there are unreferenced Realities 2310, the interpreter 2100 alters 3360 their RealityTypes 2330 to NOT, else AssignmentStatement 510 reexecution 3220 is done 3370.

Process Flow for Value ReExecution Processing

FIG. 34 illustrates the process flow for determining how values 470 are asserted when an AssignmentStatement 510 reexecutes. The AssignmentStatement's 510 Universe 2320 defines all values 470 (i.e., Realities 2310) which have previously been asserted by this statement as described in FIG. 23. The interpreter 2100 has fetched a value 470 via Decision 150 processing of the AssignmentStatement's 510 source expression as described in FIG. 33. The interpreter 2100 is now preparing to process that value 470.

The interpreter 2100 determines 3410 if a Reality 2310 already exists for this value 470.

If no Reality 2310 exists for the value 470, the interpreter 2100 processes the value exactly as it does during base execution 2742 and as is discussed in FIG. 28. Otherwise, the interpreter 2100 determines 3450 whether the existing Reality's 2310 RealityType 2330 needs to be changed. The RealityType 2330 will need to change if the latest Decision process 150 result (SUCCESS or CANT_DECIDE) is different from the previous Decision process result for the AssignmentStatement's 510 source expression. If the interpreter 2100 determines 3450 that the RealityType 2330 needs to be changed, the interpreter alters 3460 it.

Process Flow for IfStatement 520 ReExecution 3230

Figure 35:
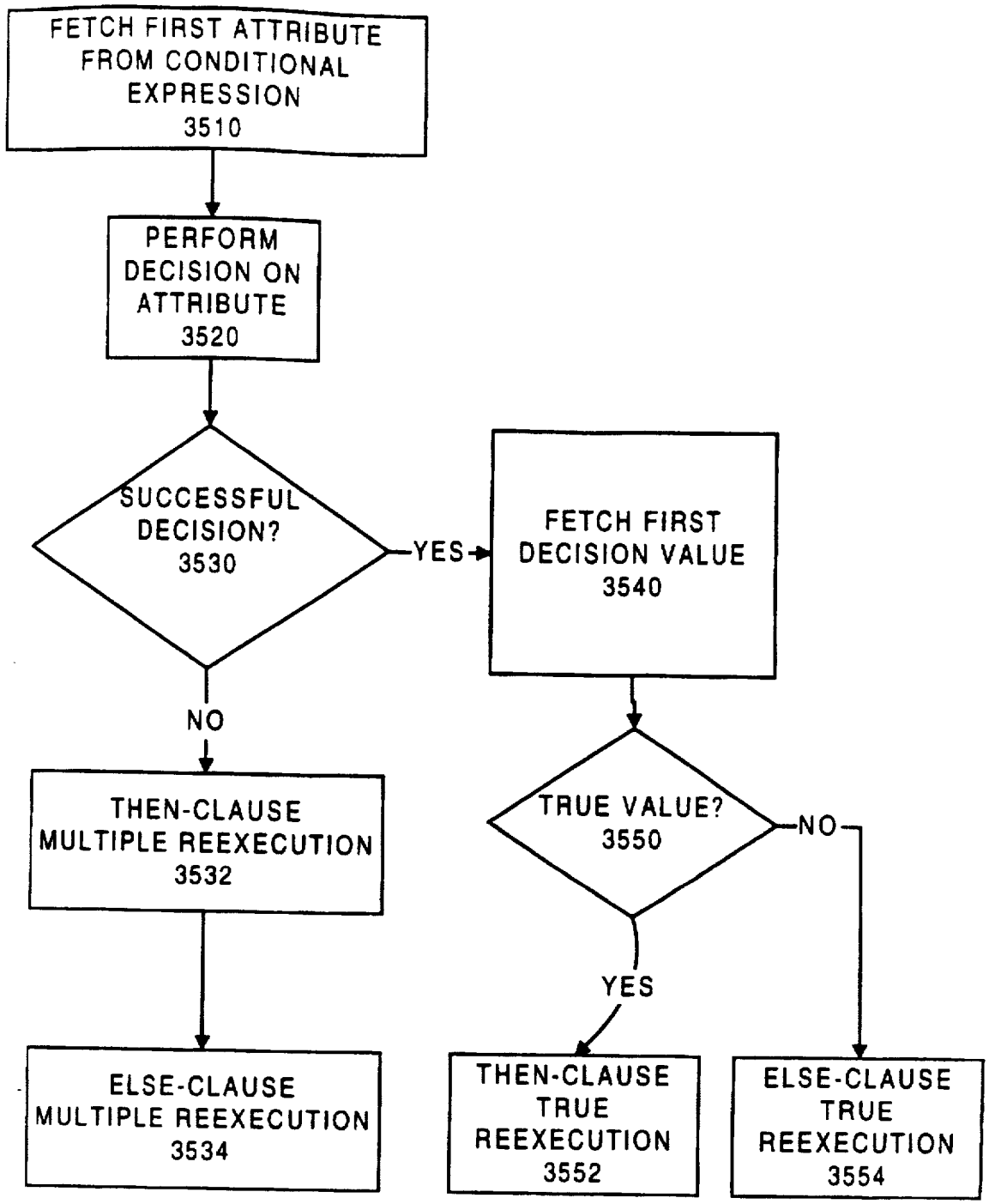
FIG. 35 is a flow diagram of one embodiment of IfStatement reexecution in the present invention.

FIG. 35 illustrates the process flow for an IfStatement's 520 reexecution 3230. IfStatements 520 fetch a value 470 from an attribute 320 defined by a conditional expression, make a Decision 150 on this value and then execute the IfStatement's ThenClause, an ElseClause or both or neither:

If <ConditionalExpression>

Then <ThenClause>

Else <ElseClause>

Having fetched 3510 the first attribute 320 from a conditional expression, the interpreter 2100 performs 3250 the Decision process 150 on that attribute. The interpreter 2100 then determines 3530 if the Decision process 150 is SUCCESS. If the Decision process 150 is successful, the interpreter 2100 retrieves 3540 the first value 470 from Decision. If the interpreter 2100 determines 3550 that the value 470 is TRUE, the interpreter performs ThenClauseTrueReExecution 3552 as described in FIG. 36; otherwise, it performs ElseClauseTrueReExecution 3554 as described in FIG. 37.

Figure 38:
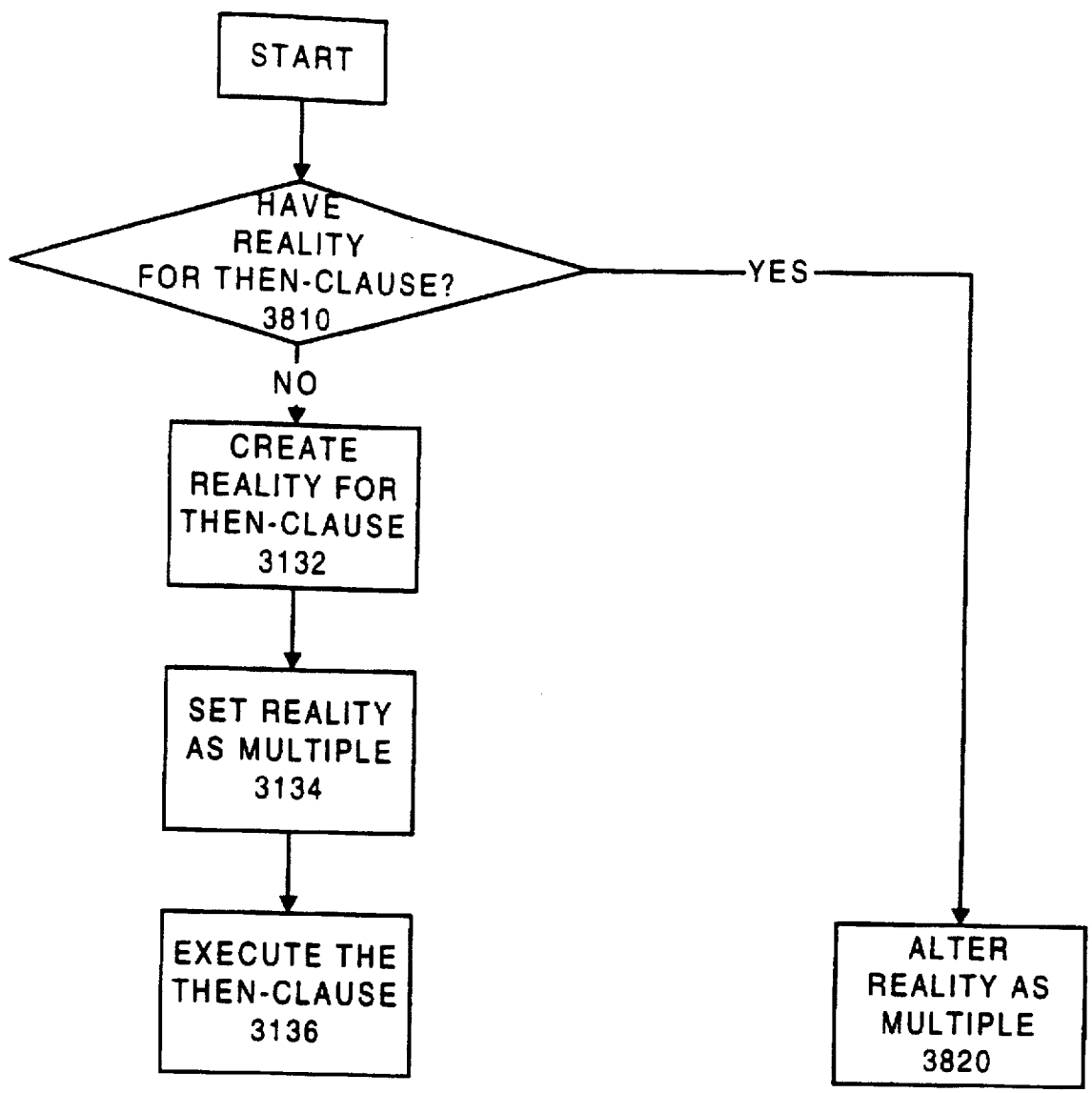
FIG. 38 is a flow diagram of one embodiment of IfStatement ThenClauseMultipleReExecution-outcome processing in the present invention.
Figure 39:
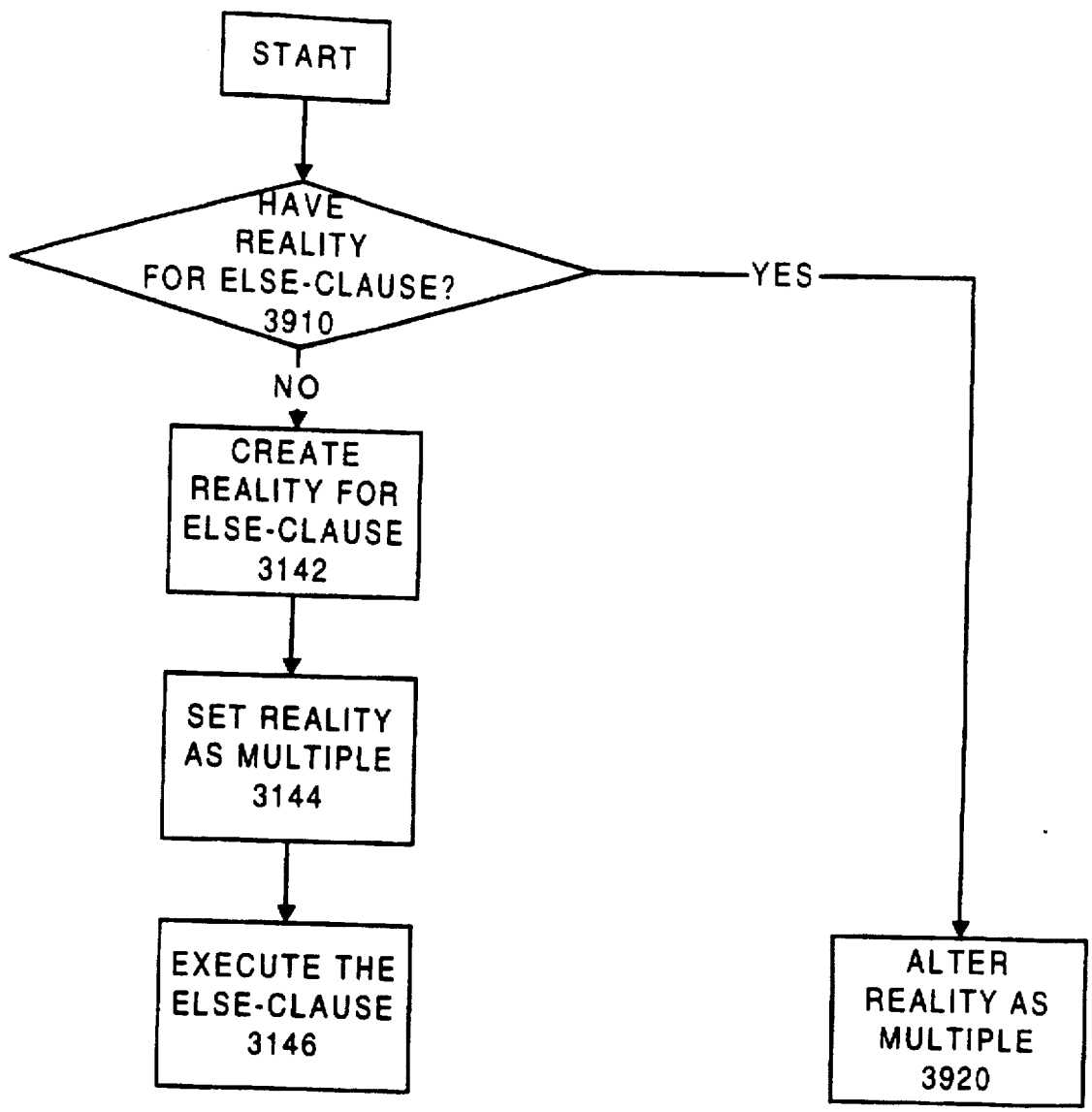
FIG. 39 is a flow diagram of one embodiment of IfStatement ElselauseMultipleReExecution-outcome processing in the present invention.

If the interpreter 2100 determines 3530 that the Decision 150 result is CANT_DECIDE, the interpreter performs both ThenClauseMultipleReExecution 3532 and ElseClauseMultipleReExecution 3534 as described in FIGS. 38 and 39 respectively.

Process Flow for ThenClauseTrueReExecution 3552 Outcome

Figure 36:
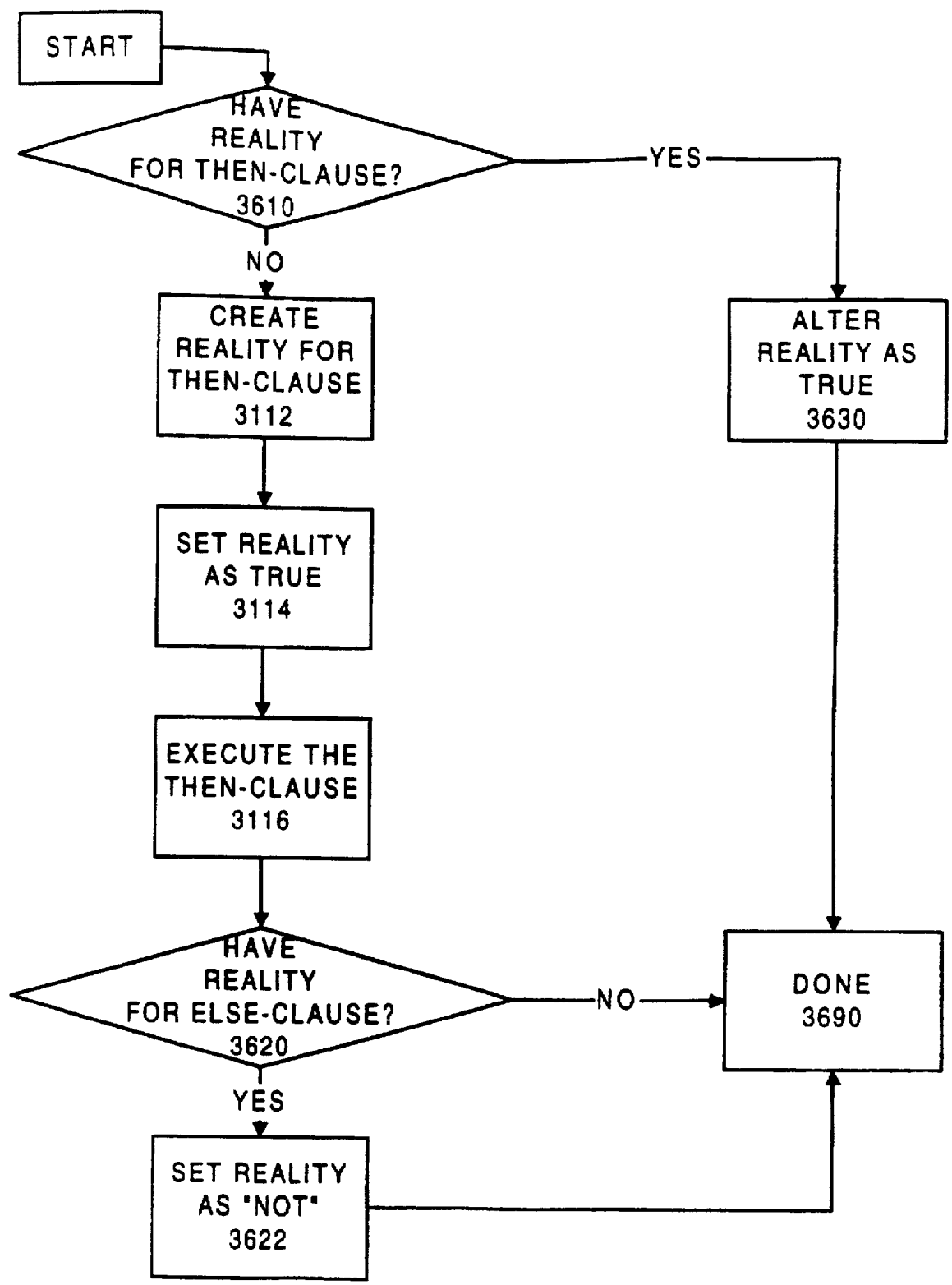
FIG. 36 is a flow diagram of one embodiment of IfStatement ThenClauseTrueReExecution-outcome processing in the present invention.

FIG. 36 illustrates the process flow for a successful Decision process 150 with a TRUE value 470 during the IfStatement 520 reexecution 3230. The IfStatement's 520 Universe 2320 defines the clauses (i.e., Realities 2310) which have previously been executed by this statement as described in FIG. 23.

The interpreter 2100 determines 3610 if a Reality 2310 already exists for the ThenClause.

If no Reality 2310 exists for the ThenClause, the process flow is exactly that as done during IfStatement 520 base execution 2744 for a successful Decision process 150 with a TRUE value 470 as described in FIGS. 30 and 31 and illustrated again in FIG. 36. The interpreter 2100 next determines 3620 if a Reality 2310 already exists for the ElseClause. If so, the interpreter 2100 alters 3622 that Reality's RealityType 2330 to NOT.

Otherwise, the interpreter 2100 alters 3630 the RealityType 2330 for the ThenClause to TRUE but the interpreter does not execute any ThenClause logic statements 340.

Process Flow for ElseClauseTrueReExecution 3554 Outcome

Figure 37:
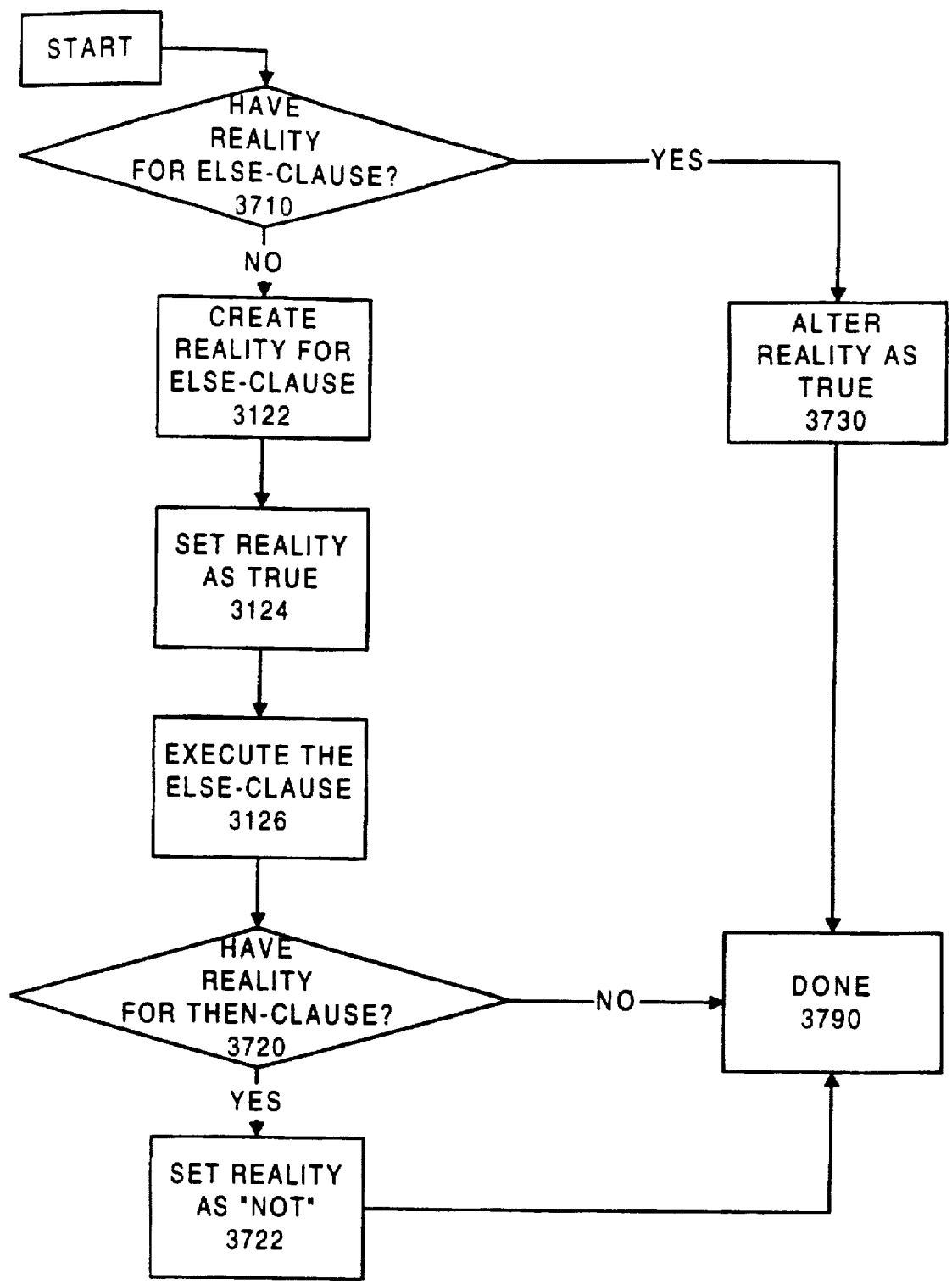
FIG. 37 is a flow diagram of one embodiment of IfStatement ElseClauseTrueReExecution-outcome processing in the present invention.

FIG. 37 illustrates the process flow for a successful Decision process 150 with a FALSE value 470 during the IfStatement 520 reexecution 3230. The IfStatement's 520 Universe 2320 defines the clauses (i.e., Realities 2310) which have previously been executed by this statement as described in FIG. 23.

The interpreter 2100 determines 3710 if a Reality 2310 already exists for the ElseClause.

If no Reality 2310 exists for the ElseClause, the process flow is exactly that as done during IfStatement 520 base execution 2744 for a successful Decision process 150 with a FALSE value 470 as described in FIGS. 30 and 31 and illustrated again in FIG. 37. The interpreter 2100 next determines 3720 if a Reality 2310 already exists for the ThenClause. If so, the interpreter 2100 alters 3722 that Reality's RealityType 2330 to NOT.

Otherwise, the interpreter 2100 alters 3730 the RealityType 2330 for the ElseClause to TRUE but the interpreter does not execute any ElseClause logic statements 340.

Process Flow for ThenClauseMultipleReExecution 3532 Outcome

FIG. 38 illustrates part of the process flow for an unsuccessful (CANT_DECIDE) Decision process 150 during IfStatement 520 reexecution 3230. This part concerns the IfStatement's 520 ThenClause. The IfStatement's 520 Universe 2320 defines the clauses (i.e., Realities 2310) which have previously been executed by this statement as described in FIG. 23.

The interpreter 2100 determines 3810 if a Reality 2310 already exists for the ThenClause.

If no Reality 2310 exists for the ThenClause, the process flow is exactly that as done for ThenClauses during ifStatement 520 base execution 2744 for an unsuccessful Decision 150 as described in FIGS. 30 and 31 and illustrated again in FIG. 38.

Otherwise, the interpreter 2100 alters 3820 the RealityType 2330 for the ThenClause to MULTIPLE but the interpreter does not execute any ThenClause logic statements 340.

Process Flow for ElseClauseMultipleReExecution 3534 Outcome

FIG. 39 illustrates part of the process flow for an unsuccessful (CANT_DECIDE) Decision process 150 during IfStatement 520 reexecution 3230. This part concerns the IfStatement's 520 ElseClause. The IfStatement's 520 Universe 2320 defines the clauses (i.e., Realities 2310) which have previously been executed by this statement as described in FIG. 23.

The interpreter 2100 determines 3910 if a Reality 2310 already exists for the ElseClause.

If no Reality 2310 exists for the ElseClause, the process flow is exactly that as done for ElseClauses during IfStatement 520 base execution 2744 for an unsuccessful Decision 150 as described in FIGS. 30 and 31 and illustrated again in FIG. 39.

Otherwise, the interpreter 2100 alters 3920 the RealityType 2330 for the ElseClause to MULTIPLE but the interpreter does not execute any ElseClause logic statements 340.

Altering RealityTypes

During statement reexecution 2150, there are numerous instances where the interpreter 2100 alters the RealityType 2330 for an existing Reality 2310. Specifically, refer to alter types to NOT 3360, alter Reality type 3460, set Reality as NOT 3622, alter Reality as TRUE 3630, set Reality as NOT 3722, alter Reality as TRUE 3730, alter Reality as MULTIPLE 3820 and alter Reality as MULTIPLE 3920.

Bearing in mind that Universes 2320 can be nested within Realities 2310 and vice-versa (as described in FIG. 23), altering a Reality's RealityType 2330 affects not only that Reality but also any subordinate Realities. For example, if the interpreter 2100 alters the type of a ThenClause Reality 2310 then Realities are also altered for any AssignmentStatements 510 which are included within the ThenClause. So modifying a single RealityType 2330 can have sweeping consequences on logic statement 340 execution.

There is special handling for RealityType 2330 NOT: When altering a RealityType 2330 to NOT, the interpreter 2100 propagates that type to subordinate Realities 2310 but it also retains the current status of each of the subordinate Realities. When or if the interpreter 2100 next unNOTs that Reality 2310, it will restore the Reality back to its preNOT type.

Logic statement reexecution 2150 automatically reexecutes logic statements 340 as required. Only the statements 340 requiring reexecution 2150 are reexecuted. Logic statement base execution 2110 and reexecution is managed by the logic language interpreter 2100.

Reexecution 2150 significantly extends the System's reasoning capabilities 170. As in the real world, decisions need to be reassessed in light of new, previously unknown facts 310. By doing so, decision-making by the Decision 150 process is improved and its conclusions have greater certainty.

Unlike this present invention, conventional systems do not automatically reexecute individual logic statements 340 under System control. If they support reexecution 2150 at all, they instead reexecute whole blocks (or "frames") of statements 340 as a unit and the reexecution requires greater developer involvement.

This present invention's reexecution 2150 has been designed as a separate process that can be attached to an independent thread of execution. On advanced multiprocessor hardware, such a design will allow for significant parallel processing efficiency. In contrast, the design of conventional systems precludes such a process separation and, therefore, conventional systems cannot take advantage of parallel processing efficiencies.

Unlike this present invention, some conventional systems interrupt a given statement's 340 execution for every dependancy updated by that execution. This present invention instead drives statement reexecution 2150 from a ChangeList 2140 and therefore executes statements 340 at "full speed". The result is not only higher performance but also greater opportunity for optimization.

What is claimed is:

1. An expert system for generating an output representation in response to at least one input, comprising:

a knowledge base that stores a plurality of linguistic and domain specific facts and statements from which are derived a plurality of associated concepts, each fact having at least one possible value;

an input module for receiving a plurality of user inputs:

a spreading activation module, coupled to the knowledge base and the input module to receive each input, and that generates at least one chain of the concepts to relate each input by selectively and iteratively associating each input with a plurality of facts and statements and applying constraints to the concepts associated with facts;

a decision module, coupled to the knowledge base and the input module for determining a value of fact from a plurality of possible values for a fact;

a natural language processing module, coupled to the knowledge base and spreading activation module, for evaluating linguistic statements relative to facts within the knowledge base as the facts have been constrained by the spreading activation module;

a reasoning module, coupled to the knowledge base and the decision module, for automatically executing the statements to update the facts in the knowledge base in response to changes in the value of other facts in the knowledge base; and an output module coupled to the spreading activation module to receive the chains of concepts, and coupled to the knowledge base, to select one or more of the chains of concepts related to each input, and to generate an output representation of each input by determining the value for facts associated with the selected chains of concepts.

2. A method for generating an output representation for controlling an output device from an input received in an expert system, comprising:

storing a plurality of facts and statements, each fact having at least one possible value;

iteratively receiving at an input module the input comprising a plurality of input symbols;

determining for each stored fact a plurality of related concepts;

associating the input symbols to the stored plurality of facts and statements to generate a chain of concepts related to the input symbols to create a minimum number of the related concepts for processing by a natural language processing module;

determining a value for each stored fact associated with a concept from among multiple alternative values, at least some facts having a change in value;

executing the logic statements associated with each stored fact; that has had a change in the value of the fact, until no additional statements are executed in response to changes in the value of the fact, and generating from the values of stored facts related to the input symbols an output representation for the input symbols.

3. A system for integrated natural language processing and expert system analysis, comprising:

an input module for receiving at least one input;

a knowledge base for storing a plurality of linguistic and domain specific facts and statements from which are derived a plurality of associated concepts, each fact having at least one possible value, and each statement having at least one logic statement;

a natural language processing module coupled to the input module to receive an input for processing and for generating the output and coupled to the knowledge base for evaluating the linguistic statements and facts;

a spreading activation module, coupled to receive the input and coupled to the knowledge base for generating a list of concepts and coupled to the natural language processor for inputting the list of concepts to the natural language processor; and a reasoning module, coupled to the knowledge base and operable in parallel with one or more modules of the expert system, for automatically executing logic statements to update the values of facts in the knowledge base in response to changes in the values of other facts in the knowledge base and coupled to produce an output responsive to the input.

4. The system in claim 3, comprising a decision module, coupled to the knowledge base and the reasoning module, for determining the value for a fact from a plurality of possible values for a fact, wherein the reasoning module automatically continuously executes logic statements in response to the change in the value of facts by the decision module.

5. The system in claim 3, wherein the list of concepts are coupled to form a chain for input into the natural language processing module.

* * * * *